US011125271B2

(12) United States Patent
Kosmicki et al.

(10) Patent No.: US 11,125,271 B2
(45) Date of Patent: *Sep. 21, 2021

(54) NON-CONTACT MAGNETIC STEERING

(71) Applicant: Novelis Inc., Atlanta, GA (US)

(72) Inventors: Michael Kosmicki, Spokane, WA (US); Michael Bommarito, Spokane, WA (US); David Gaensbauer, Atlanta, GA (US); Robert Bruce Wagstaff, Greenacres, WA (US); David Michael Custers, Inverary (CA)

(73) Assignee: NOVELIS INC., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,871

(22) Filed: Jun. 29, 2020

(65) Prior Publication Data

US 2020/0332834 A1 Oct. 22, 2020

Related U.S. Application Data

(62) Division of application No. 15/176,885, filed on Jun. 8, 2016, now Pat. No. 10,738,828.

(Continued)

(51) Int. Cl.
*F16C 32/04* (2006.01)
*H02K 7/09* (2006.01)
(Continued)

(52) U.S. Cl.
CPC ...... *F16C 32/0406* (2013.01); *B21C 47/3483* (2013.01); *H01F 7/0247* (2013.01); *H02K 7/09* (2013.01)

(58) Field of Classification Search
CPC ............. B21C 47/3483; F16C 32/0406; H01F 7/0247; H02K 7/09

(Continued)

(56) References Cited

U.S. PATENT DOCUMENTS 2,731,212 A 1/1956 Baker
3,272,956 A * 9/1966 Baermann ............... C21D 1/42
219/645

(Continued)

FOREIGN PATENT DOCUMENTS

CN 2821519 A 9/2006
CN 101003065 A 7/2007
(Continued)

OTHER PUBLICATIONS

Brazilian Patent Application No. 112017026362-9, Office Action, dated Jul. 28, 2020, 5 pages.
(Continued)

*Primary Examiner* — Scott R Kastler
*Assistant Examiner* — Michael Aboagye
(74) *Attorney, Agent, or Firm* — Kilpatrick Townsend & Stockton LLP

(57) ABSTRACT

A method of steering a moving metal strip by positioning one or more magnetic rotors near a metal strip. Each rotor includes one or more permanent magnets and rotates to impart a changing magnetic field on the metal strip passing nearby. The magnetic rotors can rotate around an axis of rotation that is parallel to the longitudinal direction of travel of the metal strip. The magnetic rotors can be positioned to impart forces on the strip in any combination of laterally, vertically, or longitudinally. A control mechanism can control the rotor speed, rotor direction, vertical position of the rotors, vertical spacing between rotors, and/or lateral position of the rotors. In some cases, the control mechanism can be coupled to sensors, such as a light curtain and a laser distance sensor, in order to provide closed loop feedback control of a metal strip passing through the non-contact magnetic rotor steering device.

16 Claims, 25 Drawing Sheets

Related U.S. Application Data

(60) Provisional application No. 62/173,097, filed on Jun. 9, 2015.

(51) Int. Cl.
  *B21C 47/34* (2006.01)
  *H01F 7/02* (2006.01)

(58) Field of Classification Search
  USPC ......... 266/87, 249, 250, 252, 103; 301/90.5; 148/516, 287, 307, 527, 529; 432/128, 432/152
  See application file for complete search history.

(56) References Cited

U.S. PATENT DOCUMENTS

| | | | |
|---|---|---|---|
| 4,407,438 | A | 10/1983 | Wiechmann |
| 5,964,114 | A | 10/1999 | Noe et al. |
| 6,019,200 | A * | 2/2000 | Janzen ................. B21C 47/003 188/163 |
| 6,585,140 | B2 | 7/2003 | Umlauf et al. |
| 7,786,693 | B2 | 8/2010 | Schmitz et al. |
| 10,738,828 | B2 * | 8/2020 | Kosmicki ........... B21C 47/3483 |
| 2014/0110890 | A1 | 4/2014 | Noe et al. |
| 2016/0363164 | A1 | 12/2016 | Kosmicki et al. |

FOREIGN PATENT DOCUMENTS

| | | | | |
|---|---|---|---|---|
| DE | 2952361 | A1 | 7/1981 | |
| DE | 102006054383 | A1 | 5/2008 | |
| FR | 2887707 | | 12/2006 | |
| JP | S57126999 | A | 8/1982 | |
| JP | S62130956 | A | 6/1987 | |
| JP | S62130957 | A | 6/1987 | |
| JP | H03297753 | A | 12/1991 | |
| JP | H04112485 | * | 4/1992 | ........... H01F 7/0247 |
| JP | H04112485 | A | 4/1992 | |
| JP | H06234445 | A | 8/1994 | |
| JP | H06269856 | A | 9/1994 | |
| KR | 20130046596 | A1 | 5/2013 | |

OTHER PUBLICATIONS

Canadian Patent Application No. 2,987,771 , Office Action, dated Jul. 27, 2020, 8 pages.
Korean Patent Application No. 10-2020-7008481 , Office Action, dated Jun. 22, 2020, 7 pages.
Canadian Patent Application No. 2,987,771 , "Office Action", dated Oct. 22, 2018, 10 pages.
Canadian Patent Application No. 2,987,771 , "Office Action", dated Jun. 18, 2019, 9 pages.
Canadian Patent Application No. 2,987,771 , "Office Action", dated Feb. 12, 2020, 6 pages.
Canadian Patent Application No. 3,041,268 , "Office Action", dated May 25, 2020, 8 pages.
Chinese Patent Application No. 201680033417.5 , "Office Action", dated Sep. 10, 2018, 20 pages.
Chinese Patent Application No. 201680033417.5 , "Office Action", dated May 30, 2019, 19 pages.
Chinese Patent Application No. 201680033417.5 , "Office Action", dated Nov. 27, 2019, 3 pages.
European Patent Application No. 16730656.2 , "Office Action", dated May 28, 2019, 8 pages.
European Patent Application No. 16730656.2 , "Notice of Decision to Grant", dated Feb. 27, 2020, 2 pages.
Indian Patent Application No. 201817000056 , "First Examination Report", dated Sep. 6, 2019, 7 pages.
Japanese Patent Application No. 2017-564019 , "Office Action", dated Jan. 22, 2019, 10 pages.
Japanese Patent Application No. 2019-079972 , "Office Action", dated Apr. 28, 2020, 8 pages.
Korean Patent Application No. 10-2018-7000751 , "Office Action", dated Jan. 18, 2019, 6 pages.
Korean Patent Application No. 10-2018-7000751 , "Office Action", dated Jul. 23, 2019, 13 pages.
Korean Patent Application No. 10-2018-7000751 , "Office Action", dated Nov. 8, 2019, 5 pages.
International Patent Application No. PCT/US2016/036420 , "Invitation to Pay Add'l Fees and Partial Search Report", dated Oct. 5, 2016, 14 pages.
International Patent Application No. PCT/US2016/036420 , "International Search Report and Written Opinion", dated Dec. 6, 2016, 31 pages.
International Patent Application No. PCT/US2016/036420 , "International Preliminary Report on Patentability", dated Dec. 21, 2017, 25 pages.
U.S. Appl. No. 15/176,885 , "Non-Final Office Action", dated Jul. 30, 2019, 15 pages.
U.S. Appl. No. 15/176,885 , "Final Office Action", dated Jan. 14, 2020, 7 pages.
U.S. Appl. No. 15/176,885 , "Notice of Allowance", dated Apr. 22, 2020, 10 pages.
U.S. Appl. No. 15/176,885 , "Corrected Notice of Allowability", dated May 28, 2020, 2 pages.
Canadian Patent Application No. 3,041,268 , Office Action dated Oct. 29, 2020, 7 pages.
Mexican Patent Application No. MX/a/2017/015931, Office Action dated Jan. 25, 2021, 7 pages.

* cited by examiner

1200

PASS METAL STRIP THROUGH PROCESSING EQUIPMENT HAVING A CENTERLINE TARGET
1202

ROTATE MAGNETIC ROTORS ON OPPOSITE SIDES OF A CENTERLINE TARGET TO INDUCE CHANGING MAGNETIC FIELDS
1204

ALLOW THE LATERAL CENTERLINE OF METAL STRIP TO DEVIATE FROM THE CENTERLINE TARGET TOWARDS AT LEAST ONE MAGNETIC ROTOR
1206

GENERATE FORCES IN THE METAL STRIP BY AT LEAST ONE OF THE CHANGING MAGNETIC FIELDS TO URGE THE LATERAL CENTERLINE OF THE METAL STRIP TOWARDS THE CENTERLINE TARGET
1208

FIG. 12

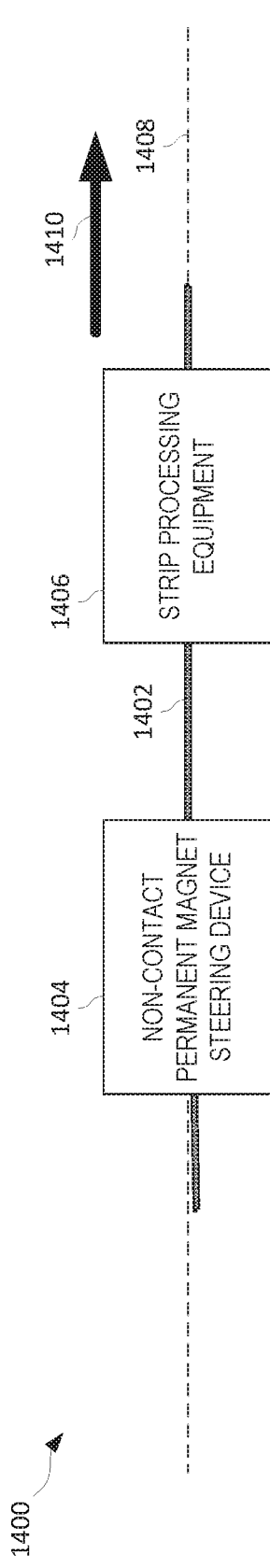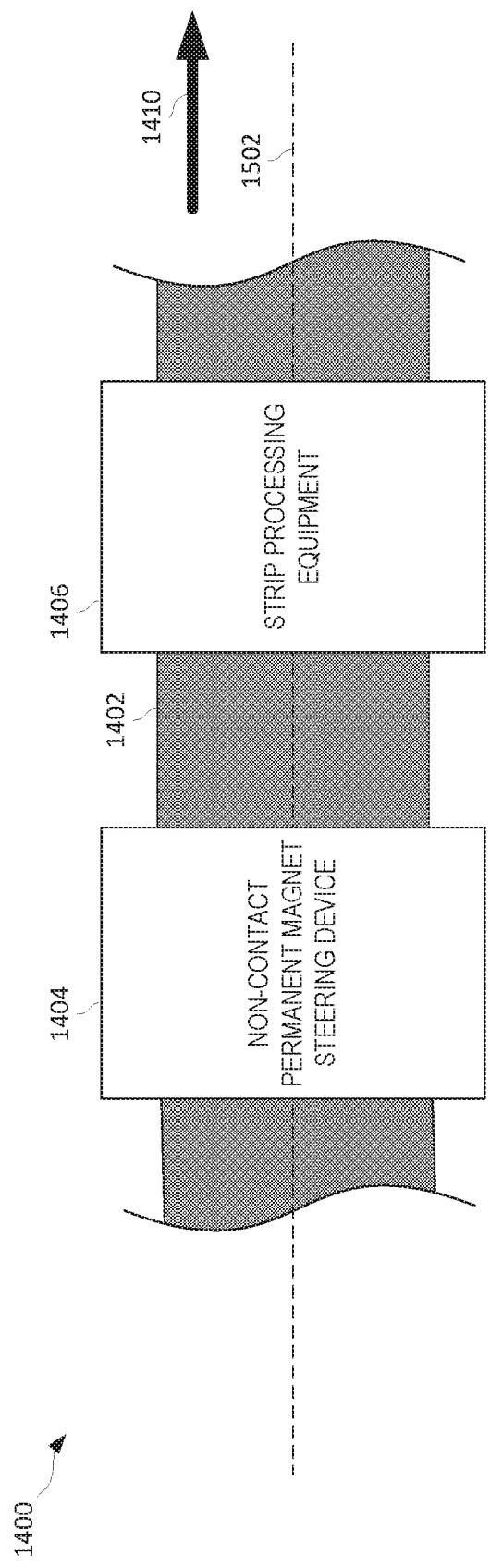

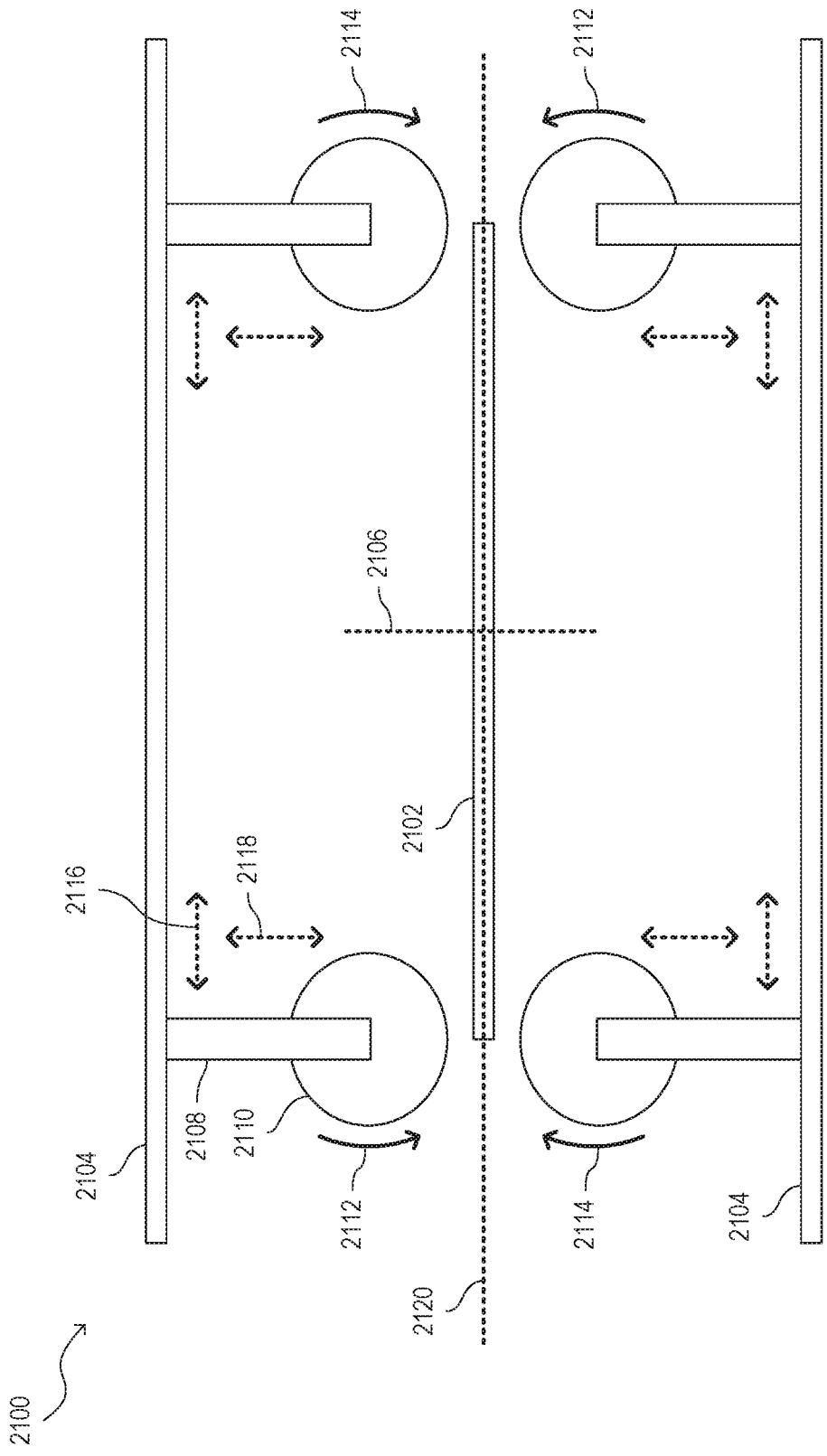

NON-CONTACT MAGNETIC STEERING

CROSS REFERENCE TO RELATED APPLICATIONS

This application claims the benefit of and priority to U.S. Pat. No. 10,738,828 issued on Aug. 11, 2020 and titled "NON-CONTACT MAGNETIC STEERING," which claims the benefit of and priority to U.S. Provisional Application No. 62/173,097 filed on Jun. 9, 2015 and titled "NON-CONTACT MAGNETIC STEERING," the contents of both of which are herein incorporated by reference in their entireties for all purposes.

TECHNICAL FIELD

The present disclosure relates to processing of metal strips generally and more specifically to steering or controlling of metal strips, in particular non-ferrous metal strips, during processing.

BACKGROUND

Many metalworking processes involve manipulating and processing of continuous metal strips. Processing metal as strips allows for long lengths of metal to be processed quickly, but requires that the metal strip remain centered within a certain variance from the desired passline of the processing equipment. If the strip wanders too far off the desired passline of the equipment, the strip may make undesired contact with edges of the equipment, the strip may not be processed correctly (e.g., not heated or cooled evenly), or other undesirable, dangerous, or costly effects may result. In certain equipment, the metal strip is being held in high tension, and active steering may not be necessary. However, the need for active steering or control can increase when the metal strip is not being held in high tension, such as when the strip is being first fed into a cold-rolling mill or when processing the metal strip in a continuous annealing line. Active steering can be useful in other circumstances as well.

Additionally, certain metals, such as aluminum, can be harmed by contact with equipment. The use of non-contact steering equipment can be desirable, especially when processing a metal when the metal is soft (e.g., due to heating). Additionally, certain metals can be harmed by localized hotspots in the metal.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Aspects of the present disclosure include systems and methods for magnetically steering or positioning metal. Systems and methods can steer moving metal strips or stationary metal pieces through the use of magnets that do not physically contact the metal, such as magnets mounted on a rotor positioned adjacent the metal. In some cases, stationary magnets can be placed adjacent a moving metal strip and electricity passed through the moving metal strip can induce movement in the metal strip.

A non-contact steering device can includes one or more magnetic rotors positioned near a metal strip. Each rotor can include one or more permanent magnets and can rotate to impart a changing magnetic field on the metal strip passing nearby. The magnetic rotors can rotate around an axis of rotation that is parallel to the longitudinal direction of travel of the metal strip. The magnetic rotors can be positioned to impart forces on the strip in any combination of laterally, vertically, or longitudinally. A control mechanism can control the rotor speed, rotor direction, vertical position of the rotors, vertical spacing between rotors, and/or lateral position of the rotors. In some cases, the control mechanism can be coupled to sensors, such as a light curtain and a laser distance sensor, in order to provide closed loop feedback control of a metal strip passing through the non-contact magnetic rotor steering device.

BRIEF DESCRIPTION OF THE DRAWINGS

The specification makes reference to the following appended figures, in which use of like reference numerals in different figures is intended to illustrate like or analogous components.

FIG. 12 is a flow chart depicting a process for steering a metal strip without feedback control according to certain aspects of the present disclosure.

FIG. 14 is a schematic, elevation diagram depicting a metal processing system including a magnetic rotor steering device used to steer a metal strip prior to entering strip processing equipment according to certain aspects of the present disclosure.

FIG. 15 is a schematic, top view diagram depicting the metal processing system of FIG. 14 according to certain aspects of the present disclosure.

FIG. 21 is a front view of a magnetic rotor steering device according to certain aspects of the present disclosure.

DETAILED DESCRIPTION

Figure 1:
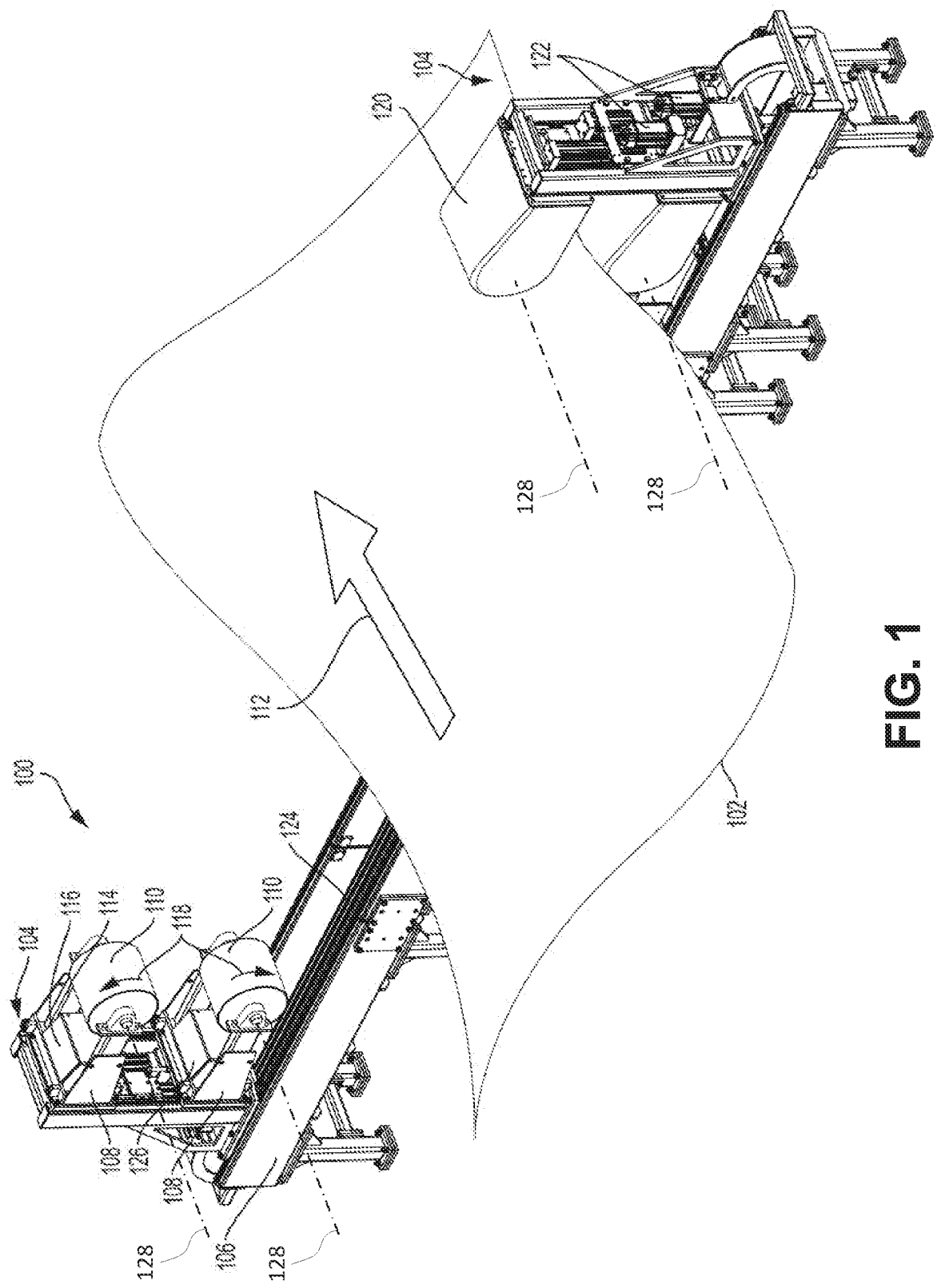
FIG. 1 is a depiction of a magnetic rotor steering device according to certain aspects of the present disclosure.

Certain aspects and features of the present disclosure relate to a non-contact magnetic rotor steering device and methods for use. The non-contact steering device includes one or more magnetic rotors positioned near a metal strip. Each magnetic rotor includes one or more permanent magnets (e.g., samarium cobalt, neodymium, or other magnets). As each magnetic rotor rotates, it imparts a changing magnetic field on the metal strip passing nearby. The magnetic rotors can each rotate around an axis of rotation that is parallel to the longitudinal direction of travel of the metal strip. In other aspects, the magnetic rotors can rotate around axes of rotation that are perpendicular to the longitudinal direction of travel of the metal strip. The magnetic rotors can be positioned to impart forces on the strip in any combination of laterally, vertically, or longitudinally. A control mechanism can control the rotor speed, rotor direction, vertical position of the rotors, lateral position of the rotors, horizontal spacing between the rotors, and/or vertical spacing between the rotors. In some cases, the control mechanism is coupled to sensors, such as a light curtain and a laser distance sensor, to provide closed loop feedback control of a metal strip passing through the non-contact magnetic rotor steering device. The steering device can be used on a non-ferrous, conducting metal strip, such as aluminum. Other conductive, nonferrous metals can be used.

The steering device can be used whenever adjustments to a metal strip's current passline (e.g., the current path the metal strip is traveling along through the processing equipment), position, direction, and/or shape are necessary. A steering device can be used to urge a moving metal strip towards a desired passline. A desired passline can be a desired path along which the metal strip travels through the processing equipment. A passline can include a lateral component (e.g., the lateral position of the metal strip within the equipment, such as from side walls of the equipment) and a vertical component (e.g., the vertical position of the metal strip within the equipment, such as from top and bottom walls of the equipment). A lateral centerline of a desired passline can be known as a centerline target, and can refer to a desired position of the lateral centerline of the metal strip when the metal strip is traveling along the desired passline. A vertical centerline of a desired passline can be known as a vertical target, and can refer to a desired position of a vertical centerline of the metal strip when the metal strip is traveling along the desired passline.

The steering device can include any number of rotors. Each rotor includes one or more permanent magnets. Suitable permanent magnets can be selected based on strength, temperature resistance, and/or other factors. Suitable permanent magnets can be selected from any permanent magnets known today or discovered in the future. Suitable permanent magnets may include samarium cobalt magnets. Permanent magnets can be arranged around the circumference of the rotor, within the circumference of the rotor, or can make up the rotor itself. Permanent magnets can be arranged to alternate direction around the circumference of the rotor. Permanent magnets can be arranged in many different configurations, such as in a Halbach array to concentrate the magnetic field on the outside of the rotor.

The rotors are supported proximate the metal strip in any suitable way. One such suitable way includes each rotor located on a rotor arm. The rotor arm can include equipment necessary to drive the rotor. In some cases, a rotor arm includes a driving motor coupled to the rotor through a belt. The driving motor controls the speed and direction of rotation of the rotor itself. The rotor arm can be mounted on a vertical support. In some cases, a single vertical support includes two rotor arms, a top rotor arm positioned above the metal strip or vertical centerline of the desired passline and a bottom rotor arm positioned below the metal strip or vertical centerline of the desired passline. Any number of rotor arms can be used on a single vertical support. In some cases, the steering device includes two vertical supports, a right vertical support positioned proximate the right edge of the strip and a left vertical support positioned proximate the left edge of the strip. Any number of vertical supports can be used on a steering device. Vertical positioning motors can be used to control the vertical position of one or more rotor arms on a vertical support. Sufficient vertical positioning motors can be used to provide vertical movement of all rotor arms on a single vertical support, as well as vertical separation between the rotor arms on a single vertical support. Each vertical support is positioned on a track for horizontal movement (e.g., towards and away from the centerline of the strip). Horizontal positioning motors can be used to control the horizontal movement of the vertical supports, and thus the attached rotor arms. In some cases, horizontal positioning motors can be positioned to control horizontal positioning of a single rotor with respect to its vertical support.

Through the various positioning motors and driving motors, a steering device can provide at least four ranges of motion: rotor speed, rotor direction, vertical positioning of the rotor, and horizontal positioning of the rotor. In some cases, the steering device can additionally provide at least a fifth range of motion: vertical gap between another rotor sharing the same vertical support. In some cases, a first rotor can be driven by a rotor motor as an adjacent rotor is driven due to magnetic coupling with the first rotating rotor.

Any suitable rotor speed can be used. In some cases, a rotor can be stationary (e.g., zero revolutions per minute) until it is needed, at which point it is driven at a desired speed. In some cases, a suitable rotational speed for a rotor can be from 0 revolutions per minute (RPM) up to 2000 RPM. In some cases, the speed can exceed 2000 RPM. It may be desirable to operate rotors with a speed in the ranges of 250-2000 RPM, 500-1750 RPM, 1000-1600 RPM, 1200-1500 RPM, 1300-1500 RPM, or any other ranges therein. In some cases, suitable rotational speeds can depend on various factors, such as vertical and/or lateral placement of the axes of rotation and strength of the magnets. In some cases, a controller coupled to a temperature sensor can be used to adjust the rotational speed of the rotors to compensate for fluctuations in the strength of the permanent magnets of the rotors if the temperature of the magnets fluctuates. For example, if cooling systems are unable to maintain the temperature of magnets at a desired level, the strength of the magnets may decrease, and a controller can cause the rotor supporting those magnets to increase in speed to compensate for the decreased magnetic strength of the magnets.

Each rotor can be encased in a rotor shield. The rotor shield can further encase the rotor arm and optionally portions or all of the vertical support. The rotor shield can be one or multiple parts. The rotor shield can be waterproof or can otherwise fluidly isolate the rotor from the surrounding environment. The rotor shield can be selected from a magnetically transparent material or a nearly magnetically transparent material. In other words, the rotor shield may be designed to not absorb any of the magnetic field being produced by the rotating rotor. The rotor shield can be thermally-insulating. A fluidly-isolating rotor shield can enable the steering device to be used in or near certain equipment where exposure to moisture and fluids may occur, such as within the quenching sections of a continuous annealing line. In various cases, the rotor shield can be any one of or a combination of fluid-shielding and/or thermally-insulating.

In some cases, coolant is circulated through or near the rotor to cool the permanent magnets of the rotor. Coolant can be a fluid, such as a cooling gas. In some cases, a heat pipe is incorporated into the rotor arm to extract heat from the rotor. In some cases, coolant is circulated within a space between an inner coolant shield and the rotor shield. The inner coolant shield can surround the rotor, allowing the rotor to move freely within the coolant shield. The coolant shield can protect the rotor from direct contact with the coolant, while allowing the coolant to flow past and remove heat from the rotor and rotor shield. In cases where it is not undesirable to have the rotor come in to direct contact with the coolant (e.g., if air is the coolant), coolant can be circulated within the volume of a rotor shield, such as with no inner coolant shield being used.

Since permanent magnets can operate at relatively high temperatures (e.g., up to around 550° C. for samarium cobalt magnets, or up to around 200° C. for neodymium magnets), only a moderate amount of cooling would need to be implemented if the steering device were to be used within a high-temperature zone, such as a furnace. In an example, a non-contact permanent magnet magnetic rotor steering device used in furnace operating at around 600° C. to 650° C. may only require approximately 100° C. to 150° C. of cooling. Additional cooling may be desirable to obtain strong magnetic fields from the desired permanent magnets. Some additional cooling may be required for other parts (e.g., bearings, motors, etc.) used in conjunction with permanent magnets in the non-contact permanent magnet magnetic rotor steering device. In some cases, samarium cobalt magnets may be desirable over neodymium magnets when high heat is expected, as samarium cobalt magnets drop in magnetic field strength slower with higher heats. However, in some cases, neodymium magnets may be desirable over samarium cobalt magnets when higher heats are not expected, as neodymium magnets have stronger field strengths at cooler temperatures.

Additionally, the use of permanent magnets requires less energy to induce steering movements as compared to electromagnets, especially as the operating temperatures increase. When operating temperatures increase too far, electromagnets no longer work properly and significant resources must be spent to sufficiently cool the electromagnets. By contrast, permanent magnets work at higher temperatures and require less cooling.

Moreover, rotating permanent magnets used to steer the metal strip impart minimal to no heat variations across the width of the strip. Using stationary electromagnets, or inductive steering, to vary inductive fields imparted across the width of the strip to steer the strip can generate localized hotspots in the strip. Varying inductive fields can be caused by the natural variance in the windings of the electromagnets. Variances in electromagnet windings can result in some lateral locations generating more heat than in adjacent lateral locations. Localized hotspots can unevenly deform the strip and can cause other manufacturing defects. By contrast, the inductive fields generated by the rotating permanent magnets do not occur across the entire width of the metal strip and do not occur at a sufficiently high frequency to induce such localized hotspots. While permanent magnets may include some level of inherent magnetic variance across dimensions or from one magnet to another, this variance is averaged out due to the rotation of the permanent magnets in the rotor. No single permanent magnet is being held at any laterally stationary position, and thus an average magnetic field is being applied by the rotating permanent magnets. Thus, the rotating magnetic rotor steering device is able to steer the metal strip with minimal to no induction of undesirable localized hotspots.

In some cases, electromagnets can be used advantageously by being included in a rotor. When placed in a rotor and rotated similarly to how a permanent magnet is rotated, electromagnets can provide changing magnetic fields without the same concern of localized hotspot formation that is present when stationary electromagnets are used, as described above. Rotating electromagnets in a rotor may include the use of brushes, slip rings, or similar electrical rotary joints, instead of commutators, to ensure the magnetic field applied to an adjacent metal strip is continuously changing despite rotation of the electromagnet within the rotor. In some cases, the steering device includes at least four rotors, with one rotor located at each of the top and bottom sides of the lateral edges of the strip (e.g., one at the top left, one at the bottom left, one at the top right, and one at the bottom right). This four-rotor configuration enables the steering device to impart lateral forces on the metal strip at or near the edges of the metal strip. If the metal strip begins to laterally wander too far away from the desired passline, the rotors near the edge in the direction of the deviation can spin with the proper direction and speed, as well as be positioned horizontally or vertically, as necessary, to steer or direct the metal strip back towards the desired passline. Likewise, the rotors on the opposite edge (e.g., away from the deviation) of the metal strip can apply forces to pull the metal strip back towards the desired passline. Additionally, even if the metal strip is running near the desired passline, the steering device can still rotate its rotors to impart tension or compression forces across the lateral width of the strip. Such tensile or compressive forces can help keep the metal strip centered on the desired passline and can help control sheet shape or flatness in the metal strip.

In some cases, pairs of rotors can be positioned longitudinally offset (e.g., further down the continuous length of the strip, rather than offset across the width of the strip) from one another in order to impart a sine-wave-shaped fluctuation in the metal strip. A first pair of rotors can be positioned at or near both edges of the metal strip and vertically offset from and below the metal strip or vertical centerline of the desired passline. The first pair of rotors can provide upwards steering to push the metal strip above a normalized passline (e.g., a standard passline without sinusoidal fluctuation). A second pair of rotors, longitudinally offset from the first pair of rotors, can be positioned at or near both edges of the metal strip and vertically offset from and above the metal strip or vertical centerline of the desired passline. The second pair of rotors can provide downwards steering to push the metal strip below the normalized passline. Additional pairs of rotors can be used in longitudinally offset positions from the first and second pairs of rotors to induce upwards or downwards movement of the metal strip. The upwards and downwards movement of the metal strip at subsequent longitudinally offset locations can induce a sine-wave-shaped fluctuation in the metal strip. This sine-wave-shaped fluctuation can help the metal strip travel through the processing equipment without lateral sagging (e.g., without the centerline of the strip sagging more than the edges of the strip) and can correct for shape/flatness conditions, such as crossbow and gullwing. The rotors may be positioned perpendicular or parallel to the longitudinal axis of the sheet (e.g., the axis that runs in the direction of sheet travel), or any combination thereof.

The rotors can be cylindrical or generally cylindrical in shape. In some cases, the rotors have a barrel-shaped profile (e.g., the center of the rotor has a larger diameter than the edges of the rotor). The barrel-shaped profile can be especially useful when inducing sine-wave-shaped fluctuations, as described herein. The barrel-shaped profile may help to avoid undesired contact between the strip and the rotors. Other shaped profiles can be used.

In some cases, at least one rotor is positioned with its axis of rotation parallel to the lateral width of the metal strip. In one aspect, a single rotor is positioned above or below the metal strip or vertical centerline of the desired passline to induce upwards or downwards movement of the metal strip. The single rotor can be positioned below the strip passline to induce lateral crossbowing of the strip (e.g., where the center of the strip is vertically offset to a higher position than the edges of the strip). In some cases, the single rotor can be located at or near the lateral centerline of a metal strip. Lateral crossbowing can be useful to keep liquids, such as water, from pooling in the center of the strip by allowing them to fall off the edges of the strip. In some cases, a single rotor is positioned with its axis of rotation parallel to the longitudinal axis of the metal strip.

The steering device may be especially useful for steering a metal strip that is not under high tension. For example, the steering device can be used when the metal strip is under longitudinal tension of approximately 40 MPa or less, 30 MPa or less, 20 MPa or less, 10 MPa or less, 5 MPa or less, 2 MPa or less, or 1 MPa or less. In some cases, the steering device may be useful for steering a metal strip that is under high tension. For example, the steering device can be useful when the metal strip is under longitudinal tension of approximately 1 MPa or more, 2 MPa or more, 5 MPa or more, 10 MPa or more, 20 MPa or more, 30 MPa or more, or 40 MPa or more. In some cases, larger diameter rotors (e.g., larger magnets with stronger magnetic fields) can be useful for steering metal strips under higher tensions. In some cases, an increased number of rotors can be useful for steering metal strips, such as the primary and secondary rotors described with reference to FIG. 27.

The steering device can induce concerted lateral forces on the strip to induce lateral movement of the strip, such as to align the strip to a desired passline of the processing equipment or to induce lateral forces in the metal strip towards a desired passline if the metal strip deviates too far from the desired passline. The desired passline may be any passline through the equipment, whether or not it follows the centerline of the equipment. For example, the desired passline may be centered at the vertical and lateral centerline of the equipment; optionally, the desired passline can be offset from either or both of the vertical and horizontal centerlines of the equipment. In some cases, the desired passline may be the natural passline of a strip through equipment (e.g., a path the strip travels through the equipment without steering mechanisms in place). However, optionally, the desired passline may be a passline other than the natural passline. The steering device can induce opposing lateral forces on the strip to induce lateral tension or compression on the strip. The steering device can induce vertical movement of the strip, such as to raise or lower the strip above or below its current passline. The steering device can further hold the position of the strip at a target vertical position (e.g., with respect to the top and bottom of a piece of processing equipment) and/or a target lateral position (e.g., with respect to the sidewalls of a piece of processing equipment). For example, the steering device can be used to hold a strip at the desired passline through a piece of equipment.

A control system can manage the position, speed, and/or direction of the rotors of the steering apparatus. The control system can be coupled to one or more sensors for feedback control (e.g., closed-loop feedback control) of the rotors. The one or more sensors can be positioned adjacent to the rotors of a magnetic rotor steering device or can be spaced a distance apart from the rotors in one or both of an upstream or downstream direction. Any suitable sensor can be used. In some cases, a lateral position sensor, such as a light curtain, is used to detect lateral deviation of the strip from a desired passline. The lateral position sensor can detect lateral deviation of the strip from center, such as when additional portions of a light curtain are occluded. The signal from the lateral position sensor can trigger the control system to manipulate the rotors to apply additional lateral force to push or pull the strip back towards the desired passline. In some cases, one or more vertical position sensors (e.g., a laser rangefinder) can be used to determine if the strip is deviating vertically from a desired passline. The vertical position sensor can detect vertical deviation of the strip from the desired passline. The signal from the vertical position sensor can trigger the control system to manipulate the rotors (e.g., move the rotors vertically) to apply additional vertical force to push the strip back towards the desired passline. An array of vertical position sensors can be used to determine the sheet shape or flatness. The control system can then manipulate the rotors to achieve the desired shape and/or flatness through application of a suitable force to the strip.

In some cases, sensors may be coupled to the rotors or rotor motors to measure changes in torque while the rotor motors are driving the rotors. The torque measurements can be used to determine information about the position of the moving metal strip, such as whether the metal strip is running higher or lower or is deviating laterally from the desired passline.

In some cases, a control system can operate without feedback control, such as without the use of lateral position sensors or vertical position sensors. In such cases, the control system can run the rotors constantly during operation. With properly positioned rotors (e.g., positioned at or just past the lateral edges of the metal strip), constant rotor operation without feedback can maintain the lateral position of the moving metal strip to a certain extent, which may be suitable for various operations. As the metal strip begins to stray laterally from center, the metal strip will move into the moving magnetic fields of one set of rotors while simultaneously moving away from the moving magnetic fields of another set of rotors located at the laterally opposite side of the metal strip. Since the metal strip is within more of the first set of moving magnetic fields than in the second set of moving magnetic fields, the first set of moving magnetic fields will push the metal strip towards the desired passline with much stronger force than the second set of moving magnetic fields, thus providing an automatically corrective action without the need for active feedback from sensors. However, in some cases, active feedback from sensors may be desirable for more active control.

In some cases, the axis of rotation of a rotor can fall on a vertical plane that is coplanar with an edge of the metal strip, that is within a rotor's radius of the edge of the metal strip, or that is distally (e.g., away from the lateral centerline of the desired passline) spaced apart from the edge of the metal strip (e.g., by a distance greater than a rotor's radius). In an example, processing of a metal strip that is one meter in width can include positioning rotors one meter laterally spaced apart from the lateral centerline of the desired passline, resulting in a 0.5 meter gap between the vertical planes containing the axes of rotation of the rotors and the edges of the metal strip when the metal strip is traveling along the desired passline.

In an example, a steering device is placed immediately before a cold-rolling mill in order to steer the strip as necessary to ensure the strip is centered as it is fed into the rolling mill. If the strip begins to deviate from center, the steering device can impart lateral forces to help return the strip to center. Therefore, inaccuracies in strip alignment as the strip is being fed into the steering device can be corrected, without contacting the metal strip, before the strip finally enters the rolling mill.

In another example, the steering device is used in or near various heating equipment, such as induction heaters. Since a heated strip can be soft, it can be desirable to not contact the metal strip until it has cooled sufficiently or been further processed. The non-contact steering device can ensure the strip remains centered and on an appropriate passline (e.g., a desired passline) without touching the heated strip. Furthermore, the use of permanent magnets instead of electromagnets can allow the non-contact steering device to operate in or near the high temperatures of the heating equipment as described herein. Additionally, less cooling is required of permanent magnets as opposed to electromagnets. The use of permanent magnets instead of electromagnets can also allow the non-contact steering device to steer the metal strip with minimal to no induction of localized hotspots therein.

In another example, the steering device is used when wrapping coils. When a metal strip is wrapped into coils, any misalignment of the strip from center can result in a faultily-wrapped coil, which may be difficult to handle, may cause damage to the metal, or may be otherwise undesirable. To ensure the strip is centered as the coils are being wrapped, the steering device can be used to keep the strip centered along the centerline of the coil.

In another example, the steering device can be used in a no-tension or low-tension section of a hot mill (e.g., between a reversing section and a tandem section).

In another example, the steering device can be used to stabilize separated strands of metal in a low-tension region of a looping pit slitter.

In another example, the steering device can be used to position a moving metal strip into a correct position within a piece of processing equipment, such as a blanking machine.

In some cases, a magnetic steering apparatus can be referred to as a magnetic positioning apparatus when used to move or position stationary metal pieces. For example, a magnetic positioning apparatus can include rotating magnets, such as those disclosed herein and with reference to the various figures, used to generate moving magnetic fields that induce forces in the stationary metal piece to move the stationary metal piece into a desired position. One or more rotating magnets can be placed proximate a desired position, such as around a periphery of a stamping machine, to urge the stationary metal piece into a desired position, such as a desired position within the stamping machine.

In all examples, the non-contact magnetic rotor steering device is able to control positioning of the metal strip without contacting the metal strip.

In an example, the non-contact magnetic rotor steering device can be used in a continuous annealing line. In a continuous annealing line, also known as a continuous annealing solution heat treat (CASH) line, metal must pass through numerous sections under low tension. Some CASH lines may be up to approximately 800 meters long or longer. In certain sections, such as the furnace and the cooling sections, the metal strip may be unsupported by rollers or other contacting devices. The metal strip may pass through unsupported sections of approximately 100 meters and longer. As future CASH lines are developed, these lengths may become longer. In the unsupported sections, the metal strip can be floated on cushions of fluid (e.g., a gas or air). Since the metal strip is unsupported for a substantial distance, the metal strip can tend to vary away from the desired passline of the processing equipment. Additionally, water quenching nozzles, air nozzles, or other process equipment can push or move the sheet in undesirable ways. If the strip wanders too far from the desired passline, the processing equipment may need to be shut down in order to fix the problem. If the strip contacts an edge of the processing equipment, such as an edge of a furnace, damage to the strip, furnace, and surrounding area may ensue, with significant losses of time and material. There may also be danger to personnel if a strip contacts an edge of the processing equipment. Every time a shutdown occurs, a substantial amount of the metal strip must be scrapped.

In some cases, the use of non-contact magnetic rotor steering devices as disclosed herein can aid in maintaining a proper position of a slow-moving metal strip in a CASH line or other line where the metal strip may be unsupported for a duration. Without the use of a non-contact magnetic rotor steering device, a slow-moving metal strip in a CASH line, such as during startup or shutdown of a CASH line, may need to be supported (e.g., by a physically contacting support, such as a roller or piece of wood) until it has reached a minimum speed for sustaining a suitable passline without physically contacting supports. A suitable passline can be a desired passline or can be a set of passlines (e.g., desired passlines, sub-optimal passlines, or any combination thereof) that allow a metal strip to pass through the processing equipment without undesired results, such as undesired crashes. However, when a non-contact magnetic rotor steering device is used, the minimum speed required until the moving metal strip no longer needs to be supported with a physically contacting support may be smaller. Any length of moving metal strip that is being supported by a physically contacting support within a CASH line may need to be scrapped. Thus, the use of one or more non-contact magnetic rotor steering devices may reduce the amount of scrap generated, as the moving metal strip would need to be supported by physically contacting supports for a shorter duration of time or for potentially no time, as the minimum speed for sustaining a suitable passline is lower. The ability for the CASH line to run at a lower minimum speed may provide additional benefits. For example, running at a lower minimum speed during startup can generate less scrap as the furnace temperature is increased to its desired operating temperature. Because the material passed through the furnace before the desired temperature is reached may need to be scrapped, lower available strip speeds during startup before the desired furnace temperature is reached can result in less material passing through the non-preheated furnace and therefore less material needing to be scrapped.

The non-contact magnetic rotor steering device can be placed in the furnace section, between the furnace and cooling sections, in the cooling sections, between cooling sections, or after cooling sections of a CASH line. In addition to providing steering capabilities as described herein, the non-contact magnetic rotor steering device can operate to float the metal strip in locations where air flotation is impractical or undesirable. Multiple steering devices can be used throughout the CASH line. For example, the use of multiple steering devices throughout a CASH line can include any of or any combination of: one or more steering devices placed in a furnace section; one or more steering devices placed in a cooling section; one or more steering devices placed immediately before a furnace section; one or more steering devices placed immediate after a furnace section; one or more steering devices placed immediately before a cooling section; and one or more steering devices placed immediate after a cooling section.

In another example, a steering device is used to apply lateral forces on the metal strip. These lateral forces can be used to create the desired sheet shape and/or flatness as the strip passes through the steering devices. Control of sheet shape and/or flatness can be useful on table rollers and in other equipment. In an example, sheet shape and/or flatness control enables more consistent cooling of the metal strip when the metal strip passes through quenching equipment. By helping maintain shape and/or flatness in the metal strip, the steering device can ensure that cooling fluids dispersed from various nozzles arranged laterally across the metal strip reach the metal strip at approximately the same time. Additionally, improved flatness or introduction of positive crossbow or a sine wave can keep cooling fluids from pooling in a bowed region of the metal strip. Furthermore, the steering device can keep the strip centered within the field of nozzles that disperse the cooling fluid. If the strip does not remain centered, the strip may be cooled unevenly. In some cases where the strip is cooled from the bottom only, such as by water, it may be undesirable to allow the fluid (e.g., water) to reach the top of the strip where it may damage the strip. In such cases, the coolant nozzles are often equipped with adjustable width covers which can block water being sprayed upwards such that the water does not reach the top of the strip. A steering device can be used to keep the strip centered in the field of nozzles such that the width covers do not need to be adjusted. Additionally, strip position measurement in combination with the steering unit can be used to ensure width covers are positioned at positions relative to the strip edge suitable for obtaining desired sheet shape and/or flatness. In some cases, quenching equipment using the steering device disclosed herein can operate without the need for adjustable width covers. In some cases, given a known input (e.g., width of the metal strip), a steering device without feedback as disclosed herein can operate in conjunction with quenching equipment with adjustable width covers.

The non-contacting magnetic rotor steering device can be relatively small in overall dimensions and can be easily incorporated into or near existing equipment. For example, the steering device can be attached to a piece of equipment (e.g., a looping pit slitter) to upgrade or improve that piece of equipment by giving it the ability to automatically correct misalignment as the sheet enters or exits the piece of equipment.

The steering device can manipulate the strip in many ways, including twisting the strip (e.g., by lowering the rotors on one side of the strip while raising the rotors on the other side of the strip). Not only can steering devices be used to maintain control of a strip's position and/or shape (e.g., correct slight deviations from a desired passline, such as lateral deviations from a lateral centerline of a desired passline), but steering devices can be used to actively steer a sheet without contacting the sheet (e.g., to turn, rotate, or otherwise guide the sheet, such as upwards or downwards from one piece of equipment to another piece of equipment).

In some cases, one or more rotors are supported with additional degrees of freedom (e.g., supported by a robotic arm), allowing the rotors to be positioned with more precision around the metal strip.

In some cases, a feedback control circuit controls the rotors of the steering device using a feedback control process. The feedback control circuit can be coupled to sensors for measuring one or both of a horizontal deviation and a vertical deviation of the metal strip. Based on the measurement(s), the feedback control circuit can determine a direction and strength of correction force necessary to return the metal strip back to a desired path. In some cases, only the direction of the correction force is determined. The direction and strength of correction force can be determined for each rotor individually. The feedback control circuit can then determine, for each rotor, what adjustments are necessary in order to apply the proper correction force. The determined adjustments can include adjustments to each rotor's speed, rotor's direction, rotor's vertical position, rotor's horizontal position, and/or rotor's vertical separation from another rotor on the same vertical support. In some cases, the determined adjustments include adjustments based on other degrees of freedom contemplated above. The feedback control circuit can then implement the determined adjustments by manipulating the rotors as necessary. Manipulating the rotors can include adjusting the rotation speed or direction of the permanent magnet rotors or adjusting the position of the permanent magnet rotors relative to the strip. The feedback control process can then repeat as the feedback control circuit measures one or more of a new horizontal deviation and a new vertical deviation.

In some cases, a more complicated or less complicated feedback control circuit can be used. For example, a feedback control circuit can be set up to simply turn on rotors on one side of the metal strip when the strip veers too far towards that side. In another example, a feedback control circuit can use additional sensors, such as full-vision cameras, to determine what adjustments may be necessary in order to return the strip to a desired path or to keep the strip on a desired path. In some cases, the steering device can be used at both edges of the strip to induce compressive or tensile stress in the sheet continuously. The continuous stress can achieve desired sheet shape and/or flatness, as well as hold the strip at the desired position. In other cases, no feedback loop may be needed. For example, the steering device can operate continuously (e.g., based on preset settings of rotor speed, direction, and position, without feedback control) to keep the strip on or near its desired passline or otherwise control the strip. In such cases, additional controls for vertical stability, such as but not limited to air nozzles, may be optionally included. In some cases, the operation settings for the steering device without feedback control can be based on a known or predicted width of the metal strip to be processed.

In some cases, a magnetic steering apparatus can include stationary magnets that, when positioned proximate a moving metal strip, induce forces in the moving metal strip to urge the moving metal strip towards a desired passline.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure. The elements included in the illustrations herein may be drawn not to scale.

FIG. 1 is a depiction of a magnetic rotor steering device 100 according to certain aspects of the present disclosure. A metal strip 102 to be controlled passes through rotors 110 of the steering device 100 in a longitudinal direction 112. The metal strip 102 is shown in partial cut-away for illustrative purposes. Each rotor 110 is made of one or more permanent magnets arranged to present a magnetic field surrounding its outer surface. As the rotors 110 rotate, changing magnetic fields are induced proximate the rotors 110. Through control of the position and rotation of the rotors 110 of the steering device 100, desirable forces can be induced on the metal strip 102 passing near the rotors 110.

The steering device 100 can include two vertical supports 104 movably positioned on a lateral track 106. In some cases, each vertical support 104 is supported by its own lateral track 106. Each vertical support 104 can be controlled individually to move along the lateral track 106, thus controlling the lateral movement of any rotors 110 coupled to that particular vertical support 104. In some cases, the vertical supports 104 are controlled jointly to move the same distance in the same direction (e.g., left or right) or opposite directions (e.g., together or apart) along the lateral track 106. Lateral movement of the vertical supports 104 can be accomplished by one or more linear actuators 124. Lateral movement of the vertical supports 104 can allow the steering device 100 to accommodate metal strips 102 of various widths, as well as allow for further control of the changing magnetic fields imparted by the rotors 110.

Each vertical support 104 can include one or more rotor arms 108. In some examples, such as that shown in FIG. 1, each vertical support 104 includes two rotor arms 108 such that one can be positioned below the strip 102 while the other is positioned above the strip 102. Each rotor arm 108 can be covered by a protective rotor shield 120, as described in further detail herein. As seen in FIG. 1, for illustrative purposes, the rotor arms 108 on the leftmost vertical support 104 are shown without their rotor shields 120, while the rotor arms 108 of the rightmost vertical support 104 are hidden from view by their rotor shields 120. Each rotor arm 108 supports one or more rotors 110. The vertical position of each rotor arm 108 on a vertical support 104 can be controlled individually, thus controlling the vertical movement of any rotor 110 coupled to that particular rotor arm 108. In some cases, the rotor arms 108 of a single vertical support 104 can be controlled jointly to move the same distance in the same direction (e.g., up or down) or opposite directions (e.g., together or apart) along the vertical support 104. Vertical control can be accomplished by one or more linear actuators 122.

Each rotor arm 108 can include one or more rotors 110. The rotor arm can house a rotor motor 116 for all or each rotor 110 on the rotor arm 108. The rotor motor 116 can be protected by magnetic shielding 126. For illustrative purposes, the magnetic shielding 126 surrounding the top left rotor motor 116 is hidden in FIG. 3. The rotor motor 116 can be coupled to a rotor 110 using a transfer belt 114 to control rotation of the rotor 110. The transfer belt 114 can be any suitable device for transferring rotation to the rotor 110, such as a chain or flat belt. In some cases, the rotor motor 116 can be located elsewhere. The rotor motor 116 may provide power to rotate any attached rotor 110 in an inward direction 118 (e.g., the side of the rotor closest the metal strip 102 moves towards the center of the metal strip 102) or an outward direction (e.g., rotation opposite the inward direction 118). The terms "inward direction" and "outward direction" are used herein for convenience to help describe the general direction of rotation of the rotors with reference to a sheet passing near the rotor. It should be apparent that when a first rotor 110 positioned above a metal strip 102 on a vertical support 104 is rotating in an inward direction (e.g., rotating counter-clockwise when viewed facing the steering device 100 in the longitudinal direction 112 of metal strip movement as depicted in FIG. 1), it will actually be rotating in an opposite direction from a second rotor 110 positioned below the metal strip 102 on the same vertical support 104 that is also spinning in an inward direction (e.g., the inwardly rotating rotor 110 below the metal strip 102 would be rotating clockwise when viewed facing the steering device 100 in the longitudinal direction 112 of metal strip movement as depicted in FIG. 1).

The direction and speed of rotation of each rotor 110 can be individually controlled. In some cases, rotors 110 on a single vertical support 104 are jointly controlled to rotate at the same speed and/or in the same direction relative to the strip 102.

In some cases, each rotor arm 108 and/or rotor 110 is individually controlled to adjust the lateral distance of the rotor 110 from the vertical support 104. In some cases, a rotor arm 108 may be anchored to the vertical support 104 to pivot with respect to the vertical support 104 (e.g., pivoting about an axis of rotation that is perpendicular to the vertical support 104).

As shown in FIG. 1, the rotors 110 are positioned adjacent the edges of the strip 102 and oriented such that each rotor's 110 axis of rotation 128 is parallel to the longitudinal direction 112 of the strip 102. In other configurations, the axis of rotation 128 of each rotor 110 can be non-parallel to the longitudinal direction 112 of the strip 102. Furthermore, each rotor's 110 axis of rotation 128 can be adjustable with reference to the strip 102, such as by rotation of its vertical support 104 along a vertical axis of rotation extending from the bottom of the vertical support 104 through its top. In some configurations, the rotors 110 can be positioned above or below the metal strip 102 (e.g., not directly adjacent an edge); can be positioned directly above or below an edge of the metal strip 102; or can be near an edge of the metal strip 102, without being directly above or below the metal strip or the edge of the metal strip. When the steering device 100 includes at least two rotors 110 positioned laterally opposite one another across the center of the metal strip, the distance between the axis of rotation 128 of the two rotors 110 can be less than, equal to, or greater than the width of the metal strip 102.

The steering device 100 can include shielding (not shown), as described in further detail herein. The use of shielding can be desirable to protect equipment from damage from an errant metal strip, to control temperature of components within the shielding, or for other purposes. In some cases, rotors 110 can be used without any shielding (e.g., without rotor shields 120).

Figure 2:
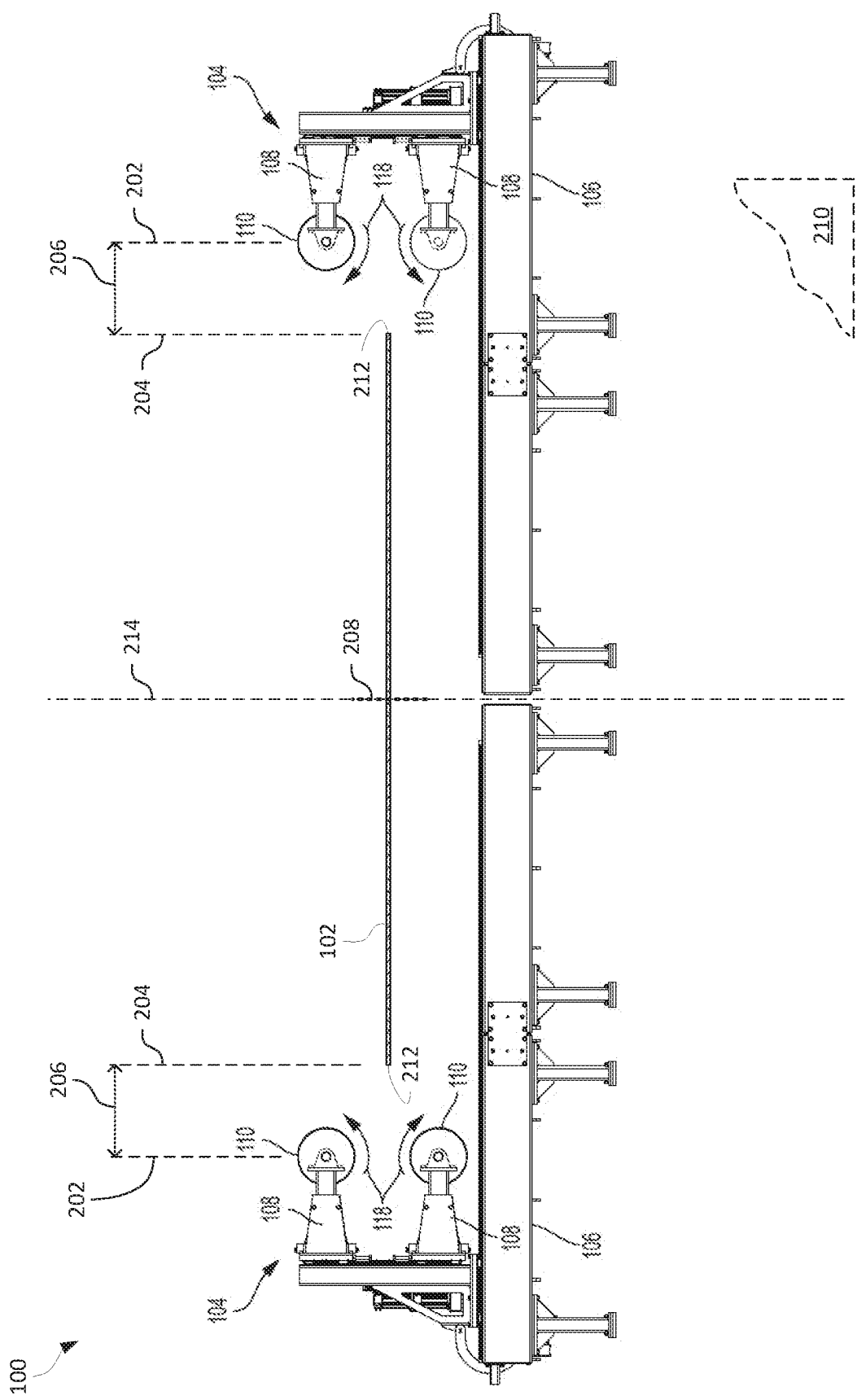
FIG. 2 is a front view of the magnetic rotor steering device of FIG. 1 according to certain aspects of the present disclosure.

FIG. 2 is a front view of the magnetic rotor steering device 100 of FIG. 1 according to certain aspects of the present disclosure. For illustrative purposes, the rotor shields 120 are not shown in FIG. 2. The steering device 100 includes two vertical supports 104 on respective lateral tracks 106. Each vertical support 104 carries two rotor arms 108, which each carries a rotor 110. The four rotors 110 can be controllably positionable around the metal strip 102 as described herein. As seen in FIG. 2, all of the rotors 110 are spinning in an inward direction (e.g., the top right and bottom left rotors 110 are rotating in a clockwise direction as seen in FIG. 2 while the top left and bottom right rotors 110 rotate in a counter-clockwise direction). Such inward rotation of all rotors 110 can result in compressive forces being applied laterally across the metal strip 102. The rotors 110 can rotate in directions opposite to those shown in FIG. 2 to apply tensile forces laterally across the metal strip 102.

The position of rotors 110 can be described with reference to each rotor's 110 axis of rotation 128 or with reference to planes on which the axes of rotation lie. A rotor plane 202 can be defined by the axis of rotation of one or more rotors 110 on one side of a lateral centerline 208 of the metal strip 102 or of a lateral centerline 214 of a desired passline. The rotor plane 202 can extend vertically from the axis of rotation. As seen in FIG. 2, the rotor plane 202 is laterally spaced apart from the edge 212 of the metal strip 102 (e.g., a vertical line 204 coplanar with an edge 212 of the metal strip 102) by a distance 206. In some cases, the rotor plane 202 can be vertically aligned with the edge 212 of the metal strip 102 (e.g., distance 206 is zero or approximately zero). In some cases, the rotor plane 202 can be laterally spaced apart from the edge 212 of the metal strip 102 away from a centerline 208 of the metal strip 102 (e.g., the distance between the centerline 208 of the metal strip and the rotor plane 202 is greater than half the width of the metal strip 102). In some cases, the rotor plane 202 can be laterally spaced apart from the edge 212 of the metal strip 102 between the centerline 208 of the metal strip 102 and the edge 212 of the metal strip 102 (e.g., the distance between the centerline 208 of the metal strip 102 and the rotor plane 202 is less than half the width of the metal strip 102).

In some cases, rotor placement can be described based on the distance between the rotor planes 202, assuming the rotor planes 202 are centered around the lateral centerline 208 of the metal strip 102 or a lateral centerline 214 of a desired passline. For rotors placed at the edges of the metal strip 102, the rotor planes 202 can be separated by a distance that is approximately equal to the width of the metal strip 102, such as within a deviation at or less than 10%, 9%, 8%, 7%, 6%, 5%, 4%, 3%, 2%, or 1%. For rotors placed within the edges or outside of the edges of the metal strip 102, the rotor planes 202 can be separated by a distance that is less than or greater than, respectively, the width of the metal strip 102. In some cases, the distance can be greater than the width of the metal strip 102 by at least a sum of the radii of opposing rotors in each of the rotor planes 202, such that the rotors are not directly over the metal strip 102 when the metal strip 102 is centered on the desired passline. In some cases, the distance can be greater than the width of the metal strip 102 by at least 20%, 30%, 40%, 50%, 60%, 70%, 80%, 90%, or 100% or more of the width of the metal strip 102.

In cases where the distance between the rotor planes 202 is greater than the width of the metal strip, the rotor planes 202 can each be positioned between an edge 212 of the metal strip 102 and an obstruction, such as a wall of the equipment, an adjacent piece of equipment, a wall of a building, an operator walkway, or other such obstacles that may be in danger of contacting the moving metal strip 102 if the metal strip 102 deviates too far from the desired passline. The rotor planes 202 can be positioned anywhere between the obstruction and the metal strip 102 to ensure the metal strip 102 is steered towards the desired passline before contacting the obstruction.

Additionally, the axis of rotation of each rotor 110 intersects a common longitudinal plane 210. As depicted in FIG. 2, the common longitudinal plane 210 is a plane that is coplanar with the page of FIG. 2 and intersects each of the rotors 110 of the magnetic rotor steering device 100.

Figure 3:
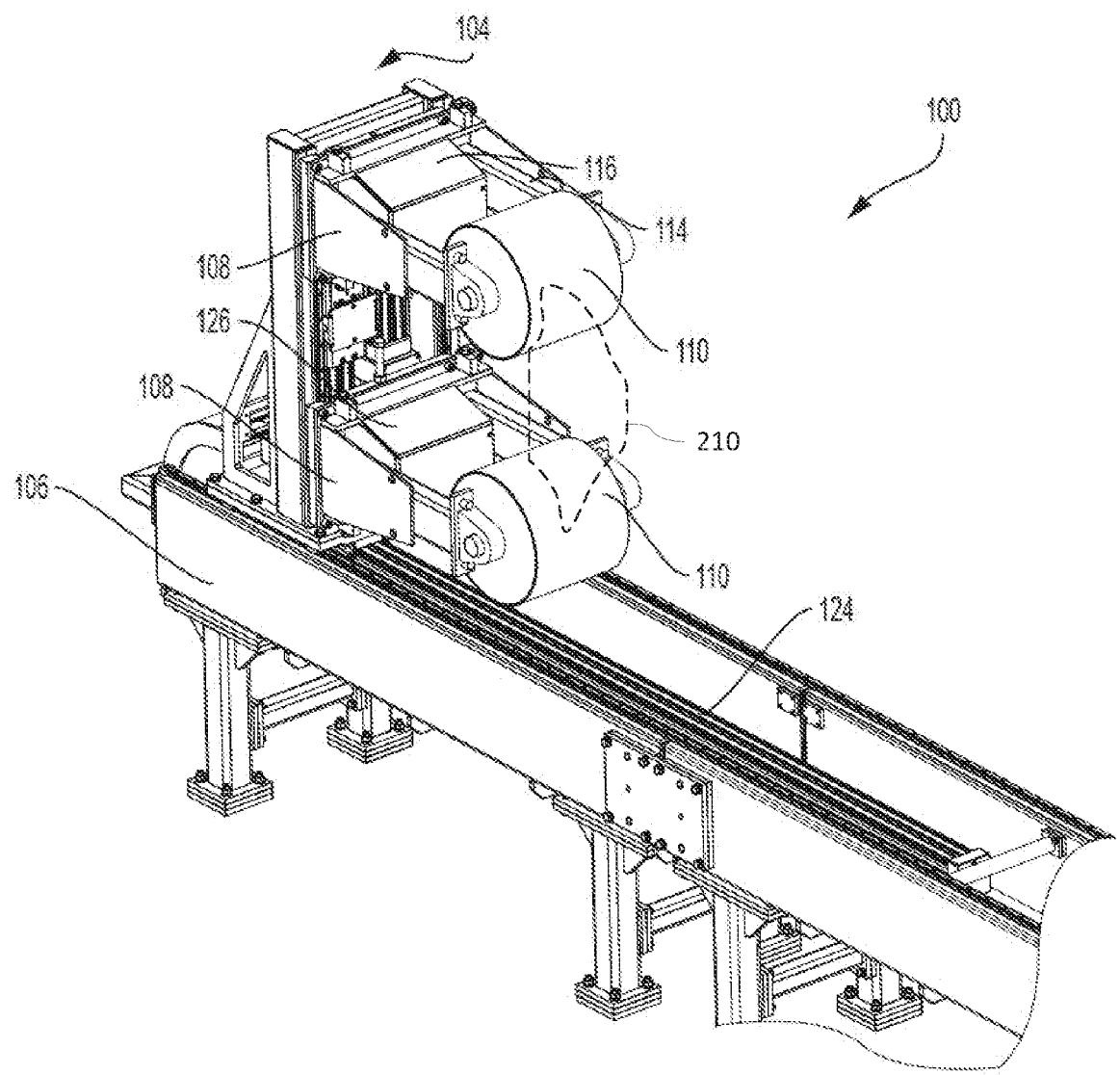
FIG. 3 is a close-up view of a vertical support and two rotors of the magnetic rotor steering device of FIG. 1 according to certain aspects of the present disclosure.

FIG. 3 is a close-up view of a vertical support 104 and two rotors 110 of the magnetic rotor steering device 100 of FIG. 1 according to certain aspects of the present disclosure. For illustrative purposes, the rotor shields 120 and metal strip 102 are not shown in FIG. 3. The vertical support 104 is shown supporting two rotor arms 108, each of which supports a rotor 110. Each rotor arm 108 includes a rotor motor 116 coupled to a respective rotor 110 by a respective transfer belt 114. The linear actuator 124 for laterally moving the vertical support 104 along the lateral track 106 can be seen. In some cases, the rotor motor 116 includes magnetic shielding 126 capable of attenuating the changing magnetic fields created by the spinning rotor 110. In such cases, a magnetic-based motor (e.g., as opposed to a pneumatic- or hydraulic-based motor) can be used. For illustrative purposes, the magnetic shielding 126 of the top rotor motor 116 is not shown in FIG. 3. A segment of the common longitudinal plane 210 is depicted in FIG. 3.

Figure 4:
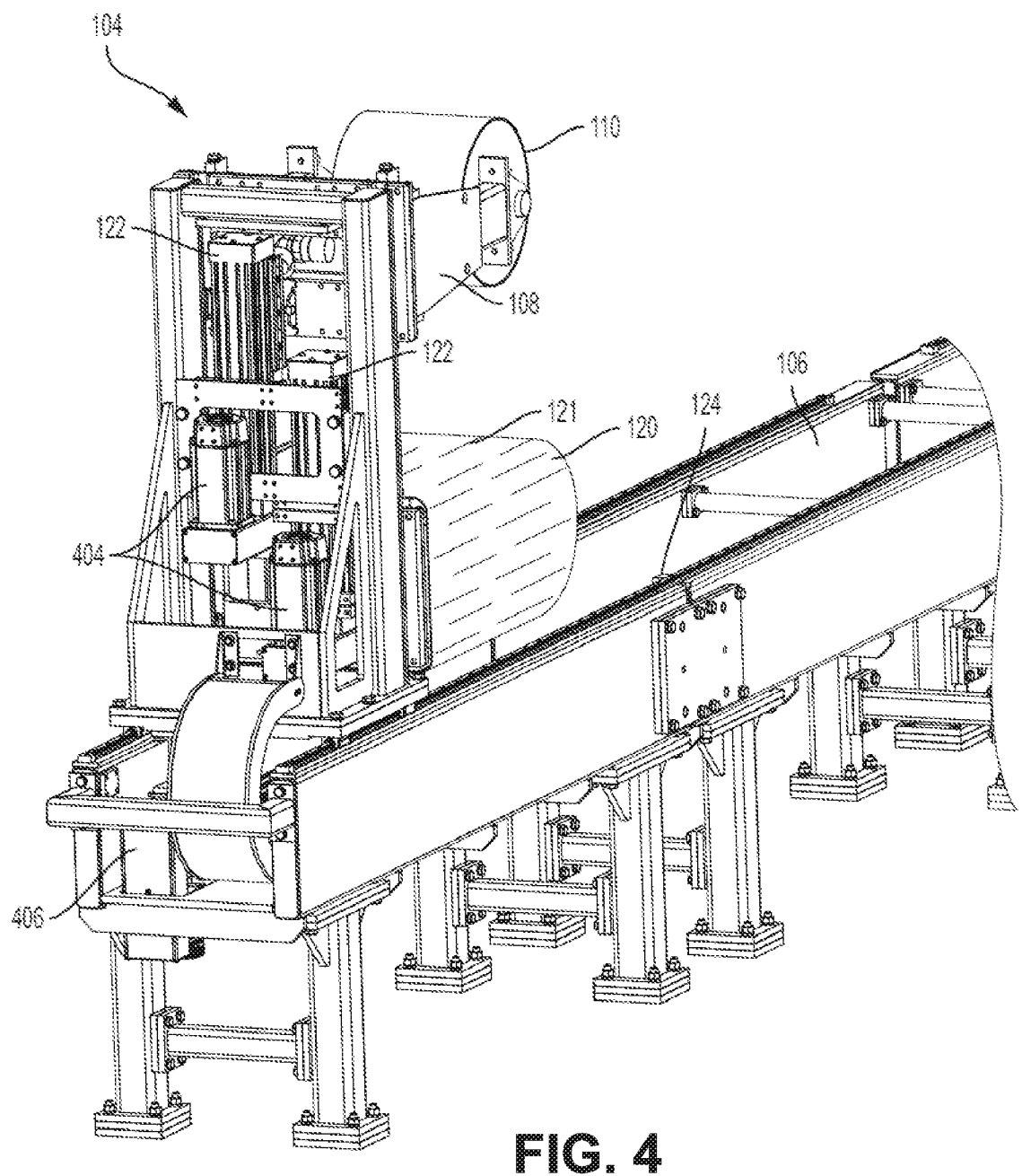
FIG. 4 is a close-up rear view of a vertical support and two rotors of the magnetic rotor steering device of FIG. 1 according to certain aspects of the present disclosure.

FIG. 4 is a close-up rear view of a vertical support 104 and two rotors 110 of the magnetic rotor steering device 100 of FIG. 1 according to certain aspects of the present disclosure. For illustrative purposes, the top rotor shield 120 and the metal strip 102 are not shown in FIG. 4, however the bottom rotor shield 120 is shown with slits 121. The vertical support 104 is shown supporting two rotor arms 108, each of which supports a rotor 110. A linear actuator 402 controls the vertical movement of each rotor arm 108 along the vertical support 104. Other mechanisms can be used to control vertical movement of each rotor arm 108, including any suitable linear actuator such as those described herein. In some cases, linear actuators 402 are powered by motors 404.

Linear actuator 124 for controlling lateral movement of the vertical support 104 along the lateral track 106 can be seen. In some cases, linear actuator 124 can be powered by a motor 406.

Figure 5:
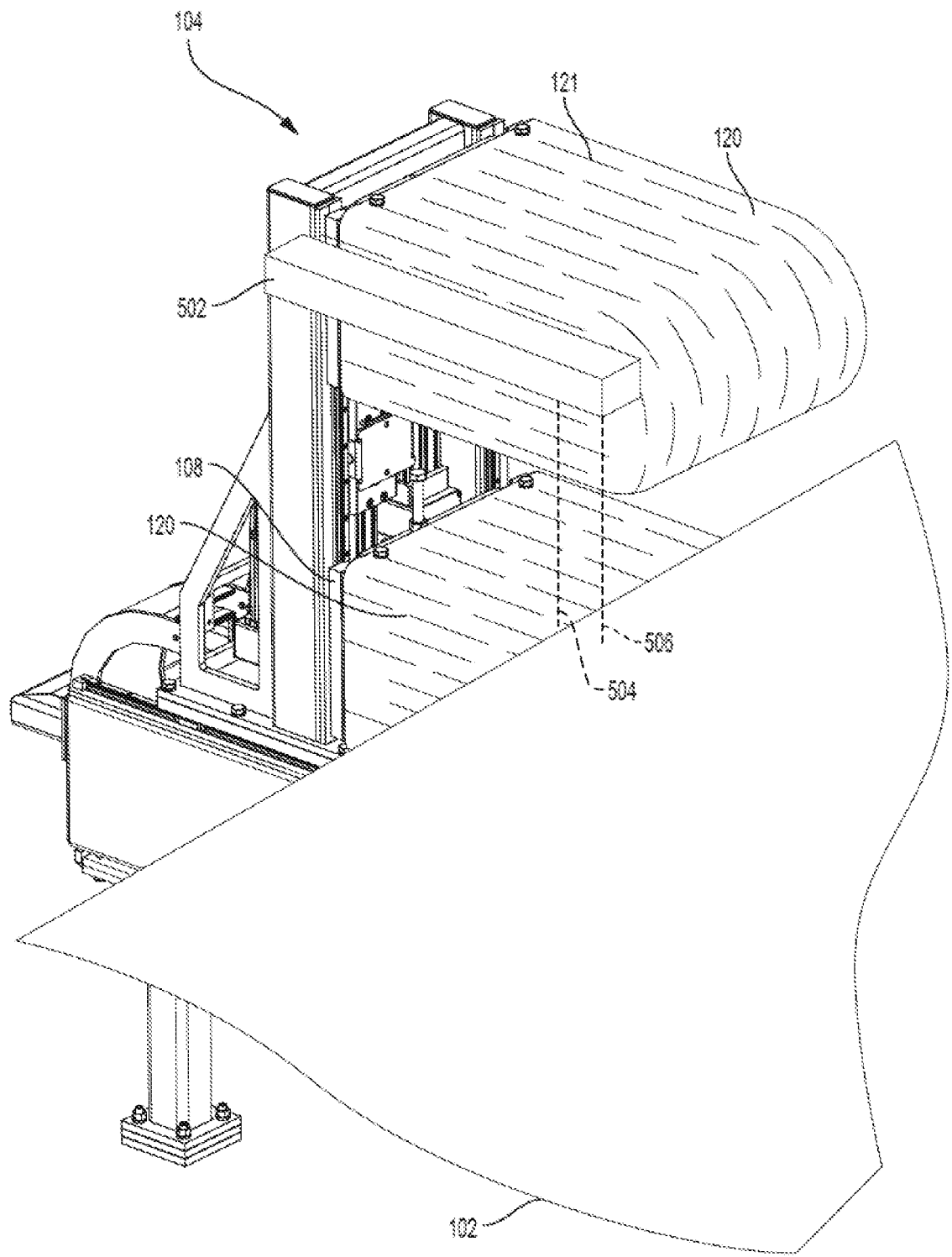
FIG. 5 is a close-up view of a vertical support and two rotors of the magnetic rotor steering device of FIG. 1, with rotor shields in place, according to certain aspects of the present disclosure.

FIG. 5 is a close-up view of a vertical support 104 and two rotors 110 of the magnetic rotor steering device 100 of FIG. 1, with rotor shields 120 in place, according to certain aspects of the present disclosure. The metal strip 102 passes between the rotor shields 120 so that the changing magnetic field induced by rotation of the rotors 110 within the rotor shields 120 passes through the metal strip 102. The vertical support 104 is shown supporting two rotor arms 108, each of which supports a rotor 110, and each of which is encapsulated by a rotor shield 120.

As described in further detail herein, the rotor shield 120 can be single-layered or multi-layered and can protect the rotor 110 and other equipment within the rotor shield 120 from dust, debris, fluid, or other contaminants. The rotor shield 120 can also be thermally-insulating, thus decreasing the amount of heat transferred across the rotor shield 120.

The rotor shield 120 can be of any suitable profile or shape. In some cases, additional shielding is included on or around the vertical support 104. The additional shielding can be coupled to or continuous with the rotor shields 120 of the vertical support 104. The additional shielding can help protect and cool any motors and actuators associated with the rotor 110 or vertical support 104.

In some cases, such as when a rotor shield 120 is made from a metal, the rotor shield 120 can include slits 121 or other openings for reducing eddy currents in the rotor shield 120. Without such slits 121 or other openings, the moving magnetic fields created by the rotor 110 may induce substantial heat buildup in electrically conductive rotor shields 120. The slits 121 or other openings can be any suitable shape or pattern for reducing eddy currents. In some cases, the slits 121 or other openings are subsequently filled with or covered with an electrically insulating material. In some cases, the rotor shield 120 includes an outer layer or covering of a non-conductive material, such as Polytetrafluoroethylene (PTFE). In some cases, the rotor shield 120 is made from a non-electrically conducting material and does not include slits 121 or other openings. In some cases, lamination is used to reduce the effect of eddy currents.

In some cases, a rotor shield 120 is made from a metal, such as stainless steel, to protect the rotor 110 in the event of contact by a moving metal strip. In some cases, a rotor shield 120 includes a layer of PTFE (e.g., Teflon™) or other low-friction coating to reduce damage to the metal strip or rotor shield 120 in the event the moving metal strip contacts the rotor shield 120.

An optional displacement sensor 502 is additionally shown in FIG. 5. The displacement sensor 502 can be coupled to a vertical support 104, rotor arm 108, rotor shield 120, or any other suitable equipment. The displacement sensor 502 can be coupled to remain laterally stationary with respect to a rotor 110. The displacement sensor 502 can be coupled to remain vertically stationary with respect to a rotor arm 108. In some cases, the displacement sensor 502 can measure vertical displacement of the metal strip 102 with respect to a rotor 110. In some cases, the displacement sensor 502 can measure lateral displacement of the metal strip 102 with respect to a rotor 110.

In an example, the displacement sensor 502 is a laser sensor providing a first beam 504 and a second beam 506. The first beam 504 can be aligned with a desired edge location of the metal strip 102, whereas the second beam 506 can be laterally spaced apart from the desired edge location of the metal strip 102 (e.g., towards a desired passline, as depicted in FIG. 5, or away from a desired passline). Each beam 504, 506 can measure the presence of the metal strip 102 underneath or measure a distance from the displacement sensor 502 to the metal strip 102. These measurements can be used to approximate or otherwise determine the location of the edge of the metal strip 102 with respect to the rotors 110. The displacement sensor 502 can be used as a feedback sensor to provide of the location of the metal strip 102 as described in further detail herein.

Figure 6:
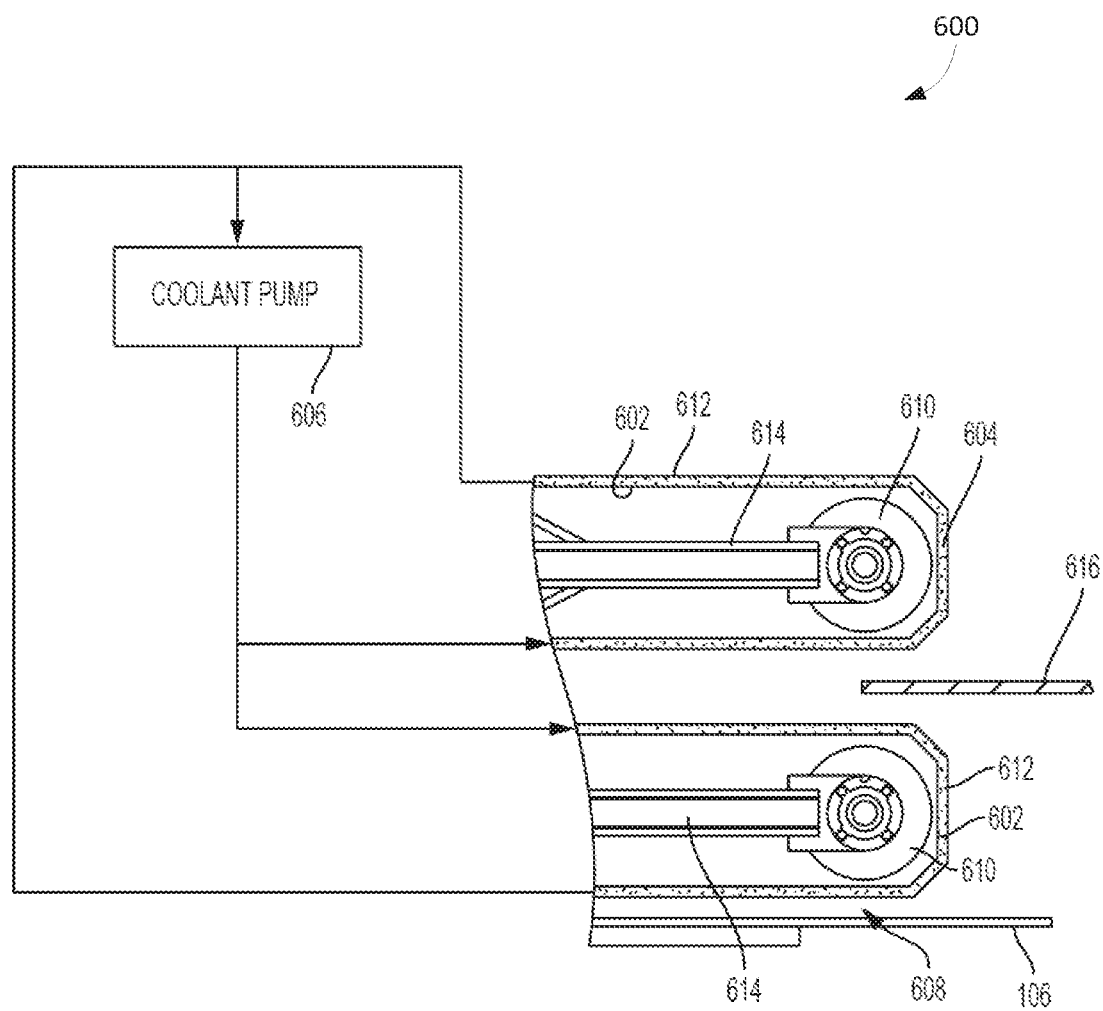
FIG. 6 is a close-up, front, cutaway view of two rotors of a magnetic rotor steering device, with coolant shields and rotor shields in place, according to certain aspects of the present disclosure.

FIG. 6 is a close-up, front, cutaway view of two rotors 610 of a magnetic rotor steering device 600, with coolant shields 602 and rotor shields 612 in place, according to certain aspects of the present disclosure. Each rotor arm 614 can support a rotor 610. A shield surrounding the rotor 610 and rotor arm 614 can include a rotor shield 612 (e.g., an outer layer) and a coolant shield 602 (e.g., an inner layer). The rotor shield 612 and coolant shield 602 can act together to form a protective shield 608 around the rotor 610 and any other surrounded parts. In some cases, coolant 604 can be circulated through space between the coolant shield 602 and rotor shield 612. In some cases, coolant 604 is circulated through pathways or tubes located between the coolant shield 602 and rotor shield 612. Coolant 604 can be circulated using a coolant pump 606.

In an example, the coolant pump 606 pumps coolant 604 into the space between the coolant shield 602 and rotor shield 612 at a side of the protective shield 608 closest the metal strip 616. Coolant 604 can circulate within the protective shield 608 and be pulled out at sides of the protective shield 608 furthest from the metal strip 102. However, coolant 604 can be circulated in other fashions. Coolant 604 circulated through the protective shields 608 can extract heat from the rotor 610 and release the extracted heat (e.g., be cooled) before being pumped through the protective shields again 608. Other parts (e.g., bearings, motors, actuators) can be cooled in the same manner.

In some cases, a coolant pump pumps coolant into the entire volume of the coolant shield 602 or rotor shield 612 (e.g., if no separate coolant shield 602 is used). The coolant can be circulated around the parts within the coolant shield 602 or rotor shield 612. Movement of the rotor 610 can assist in moving the coolant throughout the entire volume of the coolant shield 602 or rotor shield 612. In some cases, ducting or other features can be used to direct the flow of coolant near or past the rotors 610.

Coolant 604 can be any suitable coolant, including fluids such as air, water, or refrigerants.

Figure 7:
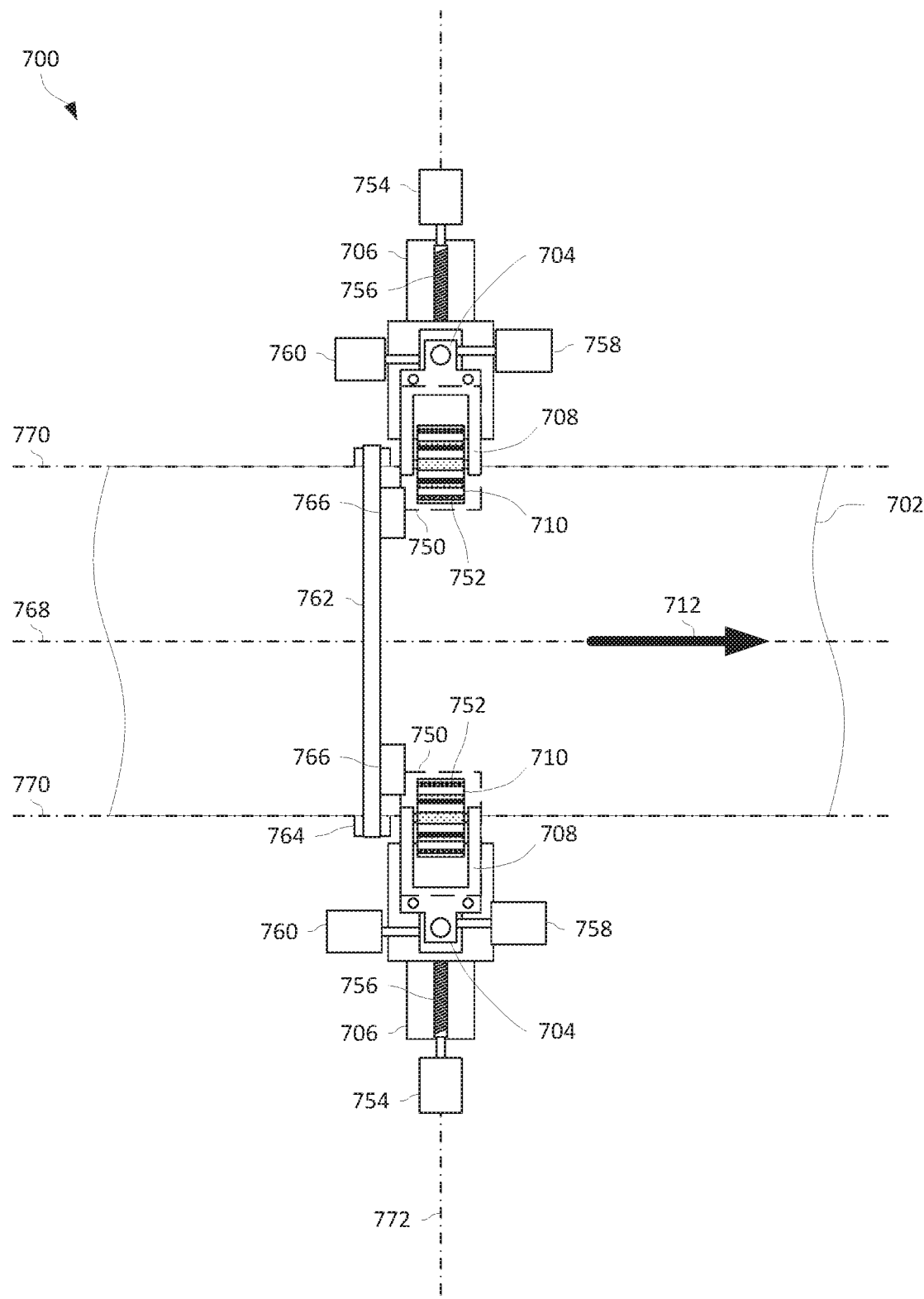
FIG. 7 is a top view depicting a permanent-magnet magnetic rotor steering device in place around a metal strip according to certain aspects of the present disclosure.

FIG. 7 is a top view depicting a permanent-magnet magnetic rotor steering device 700 in place around a metal strip 702 according to certain aspects of the present disclosure. A metal strip 702 to be controlled passes through rotors 710 of the steering device 700 in a longitudinal direction 712. Each rotor 710 is made of one or more permanent magnets 752 arranged to present a magnetic field surrounding its outer surface. As the rotors 710 rotate, changing magnetic fields are induced proximate the rotors 710. Through control of the position and rotation of the rotors 710 of the steering device 700, desirable forces can be induced on the metal strip 702 passing near the rotors 710. Each rotor 710 can rotate about its own axis of rotation 770. Each rotor 710 can intersect a common plane 772 that is perpendicular to the longitudinal direction 712 (e.g., direction of travel) of the metal strip 702. The axes of rotation 770 of each rotor 710 can be parallel the longitudinal direction 712 or not parallel the longitudinal direction 712. The metal strip 702 can pass through the common plane 772. Regardless of the orientation of the axes of rotation 770 of each rotor 710 with respect to the longitudinal direction 712, the rotors 710 can be spaced apart from one another at the common plane 772.

The steering device 700 can include two vertical supports 704 movably positioned on a lateral track 706. Each vertical support 704 can be controlled individually to move along the lateral track 706, thus controlling the lateral movement of any rotors 710 coupled to that particular vertical support 704. In some cases, the vertical supports 704 are controlled jointly to move the same distance in the same direction (e.g., left or right) or opposite directions (e.g., together or apart) along the lateral track 706. Lateral movement of the vertical supports 704 can be controlled by motor 754. Motor 754 can drive a linear screw 756 that moves the vertical supports 704 along the lateral track 706.

Each vertical support 704 can include one or more rotor arms 708. Each rotor arm 708 supports one or more rotors 710. The vertical position of each rotor arm 708 on a vertical support 704 can be controlled individually, thus controlling the vertical movement of any rotors 710 coupled to that particular rotor arm 708. Positioning motors 760 can control the vertical movement of respective rotor arms 708. In some cases, a sufficient number of positioning motors 760 are used to individually control vertical movement of each rotor arm 708 (e.g., one positioning motor 760 per rotor arm 708). In some cases, a single positioning motor 760 can jointly control the vertical movement of all rotor arms 708 on a particular vertical support 704.

Each rotor arm 708 and associated rotor 710 can be enclosed in a protective shield 750, as described in further detail herein.

In some cases, a light curtain sensor (e.g., a light curtain transmitter 762 and a light curtain receiver 764) can be positioned near the rotors 710 in order to detect lateral displacement of the metal strip 702. Lateral displacement can be detected based on displacement away from a lateral centerline 768 of a desired passline. If the metal strip 702 begins deviating too far laterally in one direction or another, a controller can alter the position, rotation speed, and/or rotation direction of one or more rotors 710 in order to impart forces on the metal strip 702 to correct the deviation.

In some cases, one or more vertical position sensors 766 are positioned near the rotors 710 to measure vertical deviation of the metal strip 702 from a desired passline. If the metal strip 702 begins deviating too far vertically in one direction or another, a controller can alter the position, rotation speed, and/or rotation direction of one or more rotors 710 in order to impart forces on the metal strip 702 to correct the deviation.

The one or more vertical position sensors 766 can also be used to make initial measurements (e.g., an initial passline elevation measurement) prior to moving the rotors 710 into an operating position (e.g., adjacent the metal strip 702). The rotors 710 can be held at a non-operating position (e.g., distant from a desired or expected passline of the metal strip 702) until an initial passline elevation measurement is taken, after which time each rotor 710 can be moved to an operating position.

Rotor motors 758 can be located on each rotor arm 708 to power the rotational movement of the rotor 710. Rotor motors 758 are shown as being located external to the rotor arm 708 and the protective shield 750, however in some cases, the rotor motors 758 are located within the rotor arm 708 and/or the protective shield 750.

Figure 8:
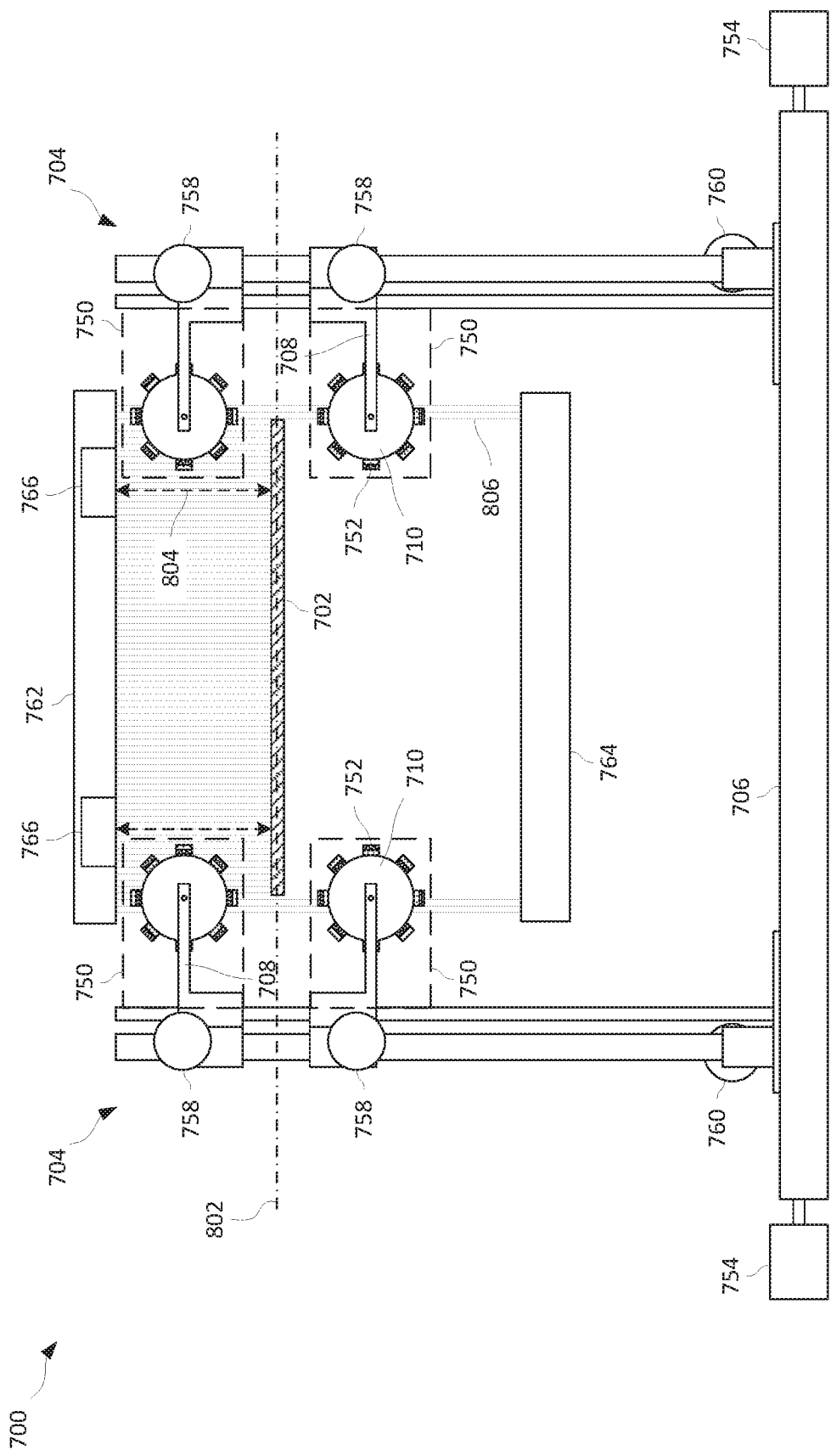
FIG. 8 is a front view depicting the permanent-magnet magnetic rotor steering device of FIG. 7 according to certain aspects of the present disclosure.

FIG. 8 is a front view depicting the permanent-magnet magnetic rotor steering device 700 of FIG. 7 according to certain aspects of the present disclosure. The metal strip 702 is seen between the rotors 710. As seen in FIG. 8, each rotor 710 includes several permanent magnets 752 coupled to an external surface. Adjacent permanent magnets 752 on a single rotor 710 can be arranged to present a different magnetic pole (e.g., alternating north and south poles facing radially outward). Optionally, adjacent permanent magnets 752 on a single rotor 710 can be arranged according to other configurations, such as but not limited to a Halbach array configuration or other configuration. Permanent magnets 752 of a rotor 710 can be coupled to an exterior surface of the rotor 710 or encapsulated in a casing of the rotor 710. While a single configuration of magnets is depicted in FIGS. 7-8, other configurations of magnets can be used with respect to a rotor 710. For example, several permanent magnets can be arranged across the width of the rotor (e.g., in the space occupied by permanent magnet 752 depicted in FIG. 7) and/or the circumference of the rotor in any suitable arrangement, such as a Halbach array, designed to output a desired magnetic field surrounding the rotor 710 when the rotor 710 rotates. In one example, each of the permanent magnets 752 depicted in FIGS. 7-8 can instead be replaced by a Halbach array of several magnets coupled together in the shape of permanent magnet 752.

Vertical supports 704 are shown and are each movably positionable along the lateral track 706 through actuation of respective motors 754.

Rotor arms 708 are shown supporting respective rotors 710 and enclosed in respective protective shields 750. Vertical positioning of the rotors 710 of a vertical support 704 individually and jointly can be accomplished through positioning motors 760, respectively.

Rotor motors 758 can be located on each rotor arm 708 to power the rotational movement of the rotor 710. Rotor motors 758 are shown as being located external to the rotor arm 708 and the protective shield 750, however in some cases, the rotor motors 758 are located within the rotor arm 708 and/or the protective shield 750.

A light curtain sensor (e.g., a light curtain transmitter 762 and a light curtain receiver 764) is shown adjacent rotors 710. Light 806 emitted from the light curtain transmitter 762 is received by the light curtain receiver 764. By tracking where the emitted light 806 does and does not reach the light curtain receiver 764, the light curtain sensor can detect the lateral displacement of the metal strip 702.

Vertical position sensors 766 are shown adjacent rotors 710. In some cases, laser light 804 is bounced off the surface of the metal strip 702 by the vertical position sensors 766 to measure vertical deviation of the metal strip 702 from a vertical centerline 802 of a desired passline. The thickness of the metal strip can be known or calculated to account for the distance between the surface of the metal strip and the center of the metal strip. If the metal strip 702 begins deviating too far vertically in one direction or another, a controller can alter the position, rotation speed, and/or rotation direction of one or more rotors 710 in order to impart forces on the metal strip 702 to correct the deviation.

Figure 9:
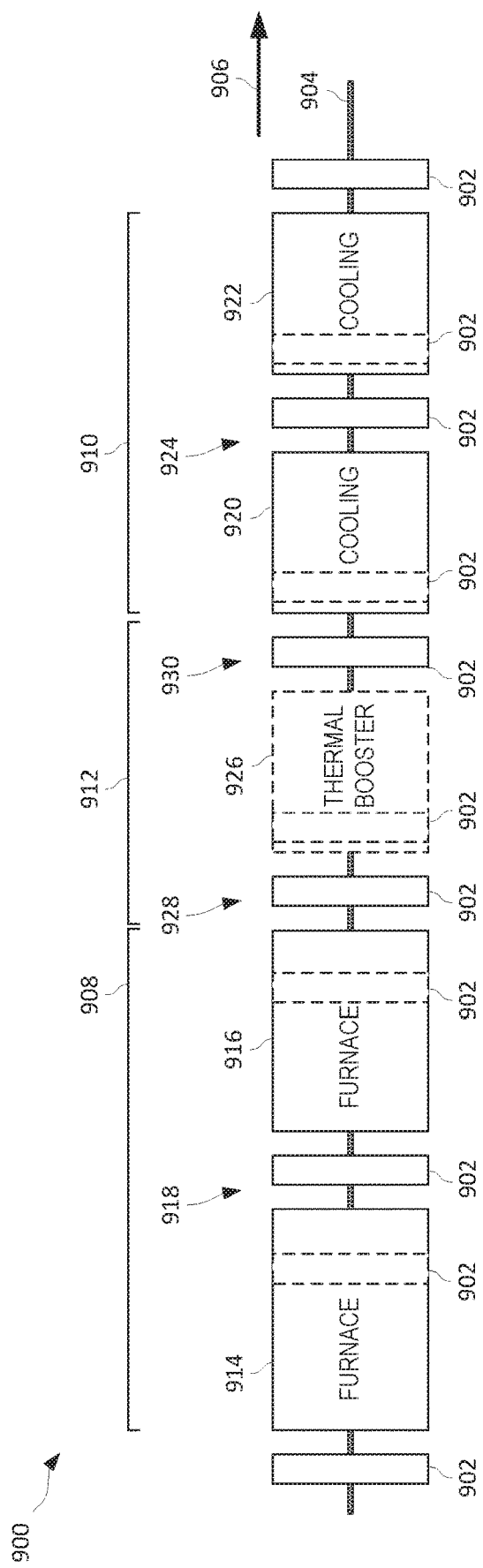
FIG. 9 is a schematic diagram depicting magnetic rotor steering devices positioned at various locations in a continuous annealing line according to certain aspects of the present disclosure.

FIG. 9 is a schematic diagram depicting magnetic rotor steering devices 902 positioned at various locations in a continuous annealing line 900 according to certain aspects of the present disclosure. A portion of a continuous annealing line 900 is shown, including a furnace section 908 and a cooling section 910 separated by a gap 912. A metal strip 904 can pass through the continuous annealing line 900 in direction 906.

The furnace section 908 can include a first furnace zone 914 and a second furnace zone 916 separated by a gap 918. The cooling section 910 can include a first cooling zone 920 and a second cooling zone 922 separated by a gap 924. As shown, an optional thermal booster zone 926 is located between the furnace section 908 and the cooling section 910. A gap 928 is located between the furnace section 908 and the thermal booster zone 926 and a gap 930 is located between the thermal booster zone 926 and the cooling section 910. In the thermal booster zone 926, the temperature of the metal strip 904 can be maintained, rather than heated or cooled. In some cases, no thermal booster zone 926 is used, and the gap 912 is relatively small, with the furnace section 908 ending adjacent to the beginning of the cooling section 910. In some cases, the thermal booster zone 926 is simply one of the cooling zones of the cooling section 910 operated in a thermal booster mode.

In some cases, the furnace section 908, cooling section 910, and/or thermal booster zone 926 can have fewer or more zones than shown in FIG. 9. Each zone of a particular section (e.g., the first furnace zone 914 and second furnace zone 916 of the furnace section 908) can include its own housing (e.g., the first furnace zone 914 is in a separate housing from the second furnace zone 916). A steering device 902 placed within a zone can be placed within the housing for that particular zone, whereas a steering device 902 placed in a gap (e.g., gap 918) may be placed outside the housing of either surrounding zone. In some cases, one or more zones of a particular section (e.g., the first furnace zone 914 and the second furnace zone 916 of the furnace section 908) or even of adjacent sections (e.g., the second furnace zone 916 and the thermal booster zone 926 or first cooling zone 920), are located in a shared, common housing (e.g., the first furnace zone 914 and the second furnace zone 916 are located in a single furnace housing). In such cases, a steering device 902 placed within a zone can be located in the same common housing as, but at a different location than, a steering device 902 placed in a gap (e.g., gap 918).

For example, a steering device 902 placed within a first furnace zone 914 can be located within the same overall housing as a steering device 902 placed in gap 918, however the steering device 902 placed within the first furnace zone 914 may be adjacent temperature control elements of the first furnace zone 914. A single continuous annealing line 900 can include one or many housings, with one or more sections (e.g., furnace section 908 and cooling section 910) and/or zones (e.g., first furnace zone 914 and thermal booster zone 926) having individual or shared housings. In other words, the term "gap," as used below, reflects a general space between adjacent elements, but may or may not reflect a space between the physical housings of adjacent elements.

While shown with eleven steering devices 902 (e.g., such as steering device 100 from FIG. 1 or steering device 700 from FIG. 7) in FIG. 9, a continuous annealing line 900 can have fewer or more steering devices 902, in any combination of locations. A steering device 902 can be located prior to the furnace section 908 (e.g., adjacent the entrance of the furnace section 908). A steering device 902 can be located within the furnace section 908, such as within the first furnace zone 914, within the gap 918, and/or within the second furnace zone 916. A steering device 902 can be located in the gap 912 between the furnace section 908 and the cooling section 910. When a thermal booster zone 926 is used, a steering device 902 can be located within the gap 928, within the thermal booster zone 926, and/or within the gap 930. A steering device 902 can be located within the cooling section 910, such as within the first cooling zone 920 (e.g., within and adjacent the entrance to the first cooling zone 920), within the gap 924, and/or within the second cooling zone 922. A steering device 902 can be located after the cooling section 910 (e.g., adjacent the exit of the cooling section 910). A steering device 902 can be located in other locations in a continuous annealing line 900.

Figure 10:
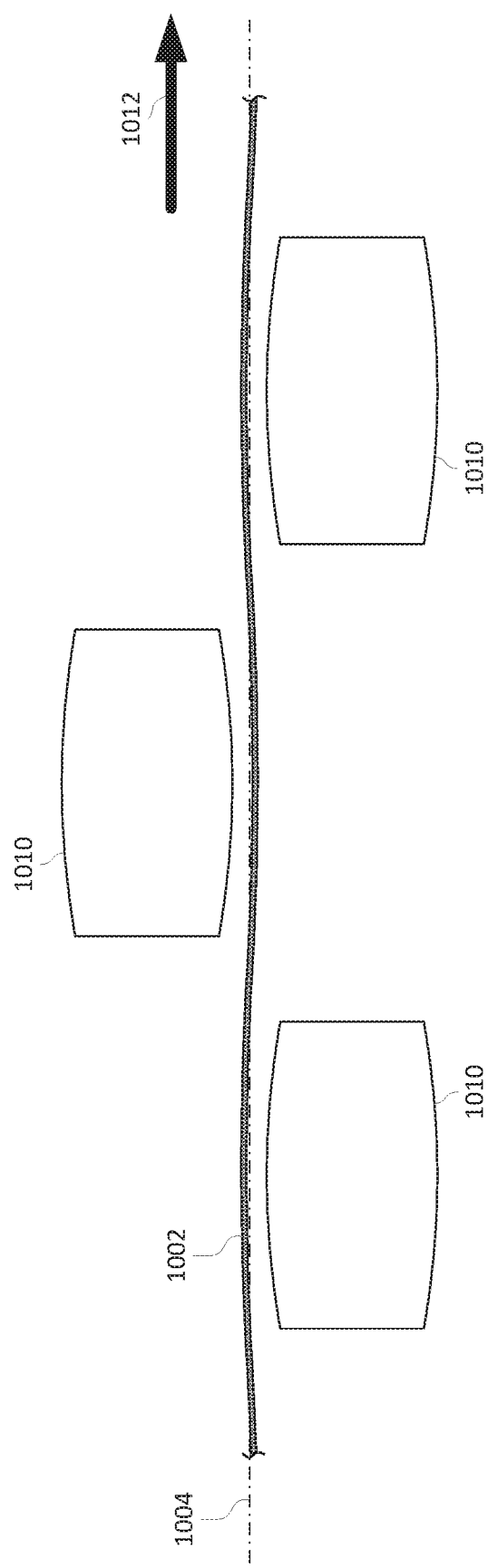
FIG. 10 is a schematic side view depicting offset rotors used to induce a sine-wave-type fluctuation in a metal strip according to certain aspects of the present disclosure.

FIG. 10 is a schematic side view depicting offset rotors 1010 used to induce a sine-wave-type fluctuation in a metal strip 1002 according to certain aspects of the present disclosure. The strip 1002 is shown travelling in direction 1012. Three rotors 1010 are shown in longitudinally offset positions. Rotors 1010 can be aligned such that each rotor's axis of rotation is parallel the longitudinal direction of the strip, as shown. In some cases, rotors 1010 can be aligned such that each rotor's axis of rotation is parallel the lateral width of the strip (not shown).

Each rotor 1010 can impart forces on the metal strip 1002 to vertically displace the metal strip 1002 from a vertical path 1004 of a neutral passline (e.g., a generally flat passline or an expected passline). When adjacent rotors 1010 are longitudinally offset and alternatingly positioned on opposite sides of the metal strip 1002 (e.g., alternating between above the passline and below the passline), the vertical displacements from the rotors 1010 cause a sine-wave-type fluctuation in the metal strip 1002, as seen in FIG. 10. In some cases, the rotors 1010 can have profiles that match the general sine-wave-type shape of the metal strip 1002, allowing the rotors 1010 to be positioned near the metal strip 1002 without danger of contacting the metal strip 1002. For example, the rotors 1010 can be barrel-shaped, although other shaped profiles can be used.

Figure 11:
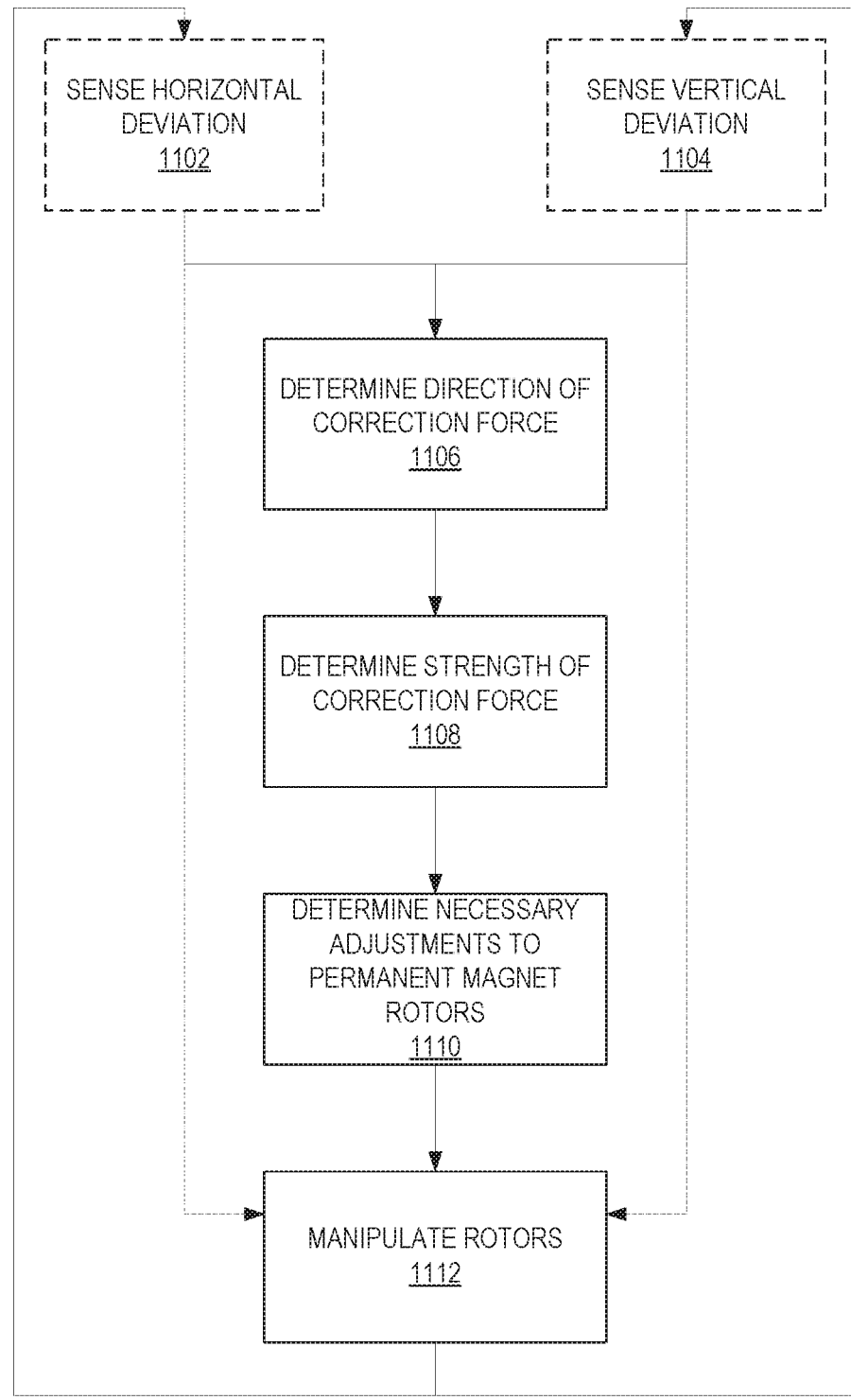
FIG. 11 is a flowchart depicting a feedback control process according to certain aspects of the present disclosure.

FIG. 11 is a flowchart depicting a feedback control process 1100 according to certain aspects of the present disclosure. The feedback control process 1100 can be performed by a controller (e.g., one or more application specific integrated circuits (ASICs), digital signal processors (DSPs), digital signal processing devices (DSPDs), programmable logic devices (PLDs), field programmable gate arrays (FPGAs), processors, micro-controllers, microprocessors, other electronic units designed to perform the functions described herein, and/or a combination thereof) coupled to any combination of the sensors, positioning motors, and driving motors disclosed herein.

At block 1102, a horizontal deviation can be sensed, such as by a light curtain. Sensing the horizontal deviation can include measuring the amount of horizontal deviation. At block 1104, a vertical deviation can be sensed, such as by a vertical position sensor. Sensing the vertical deviation can include measuring the amount of vertical deviation. In certain feedback control processes 1100, either or both of block 1102 and block 1104 can be performed.

At block 1106, a direction of correction force can be determined based on the horizontal deviation measurement and/or vertical deviation measurement from respective blocks 1102 and 1104. At block 1108, a strength of correction force can be determined based on the horizontal deviation measurement and/or vertical deviation measurement from respective blocks 1102 and 1104.

At block 1110, the adjustments to the permanent magnet rotors can be determined. The determined adjustments can be based on the direction of correction force determined at block 1106 and/or the strength of correction force determined at block 1108.

At block 1112, the rotors are manipulated. The rotors can be manipulated at block 1112 based on the adjustments determined at block 1110. Manipulation of the rotors can include adjusting the position, speed of rotation, and/or direction of rotation of one or more rotors of a magnetic rotor steering device.

In some cases, blocks 1106, 1108, and 1110 are not performed, and instead the rotors are directly manipulated based on detections of horizontal deviation at block 1102 and/or detections of vertical deviation at block 1104. For example, a light gate can be positioned at a desired edge point such that if the metal sheet deviates laterally beyond the desired edge point, the light gate sends a signal to a controller that manipulates the rotors, such as turning on rotors near the triggered light gate. Such a system would provide simple on/off feedback control, rather than calculated feedback control (e.g., using blocks 1106, 1108, and 1110).

The process 1100 can operate continuously and repeatedly.

FIG. 12 is a flow chart depicting a process 1200 for steering a metal strip without feedback control according to certain aspects of the present disclosure. At block 1202, a metal strip is passed through processing equipment having a desired passline. At block 1204, magnetic rotors on opposite sides of a lateral centerline of a desired passline or on opposite sides of a lateral centerline of a metal strip are rotated to induce changing magnetic fields proximate the magnetic rotors. At block 1206, the lateral centerline of the metal strip is allowed to deviate away from the lateral centerline of the desired passline of the processing equipment towards at least one of the rotating magnetic rotors. At block 1208, forces are generated in the metal strip by at least one of the changing magnetic fields (e.g., the changing magnetic field proximate the magnetic rotor towards which the metal strip has moved). The forces generated at block 1208 can urge the lateral centerline of the metal strip towards the lateral centerline of the desired passline of the processing equipment. In some cases, the process 1200 can continue to repeat block 1206 and 1208 to keep the metal strip centered on the desired passline of the processing equipment.

Figure 13A:
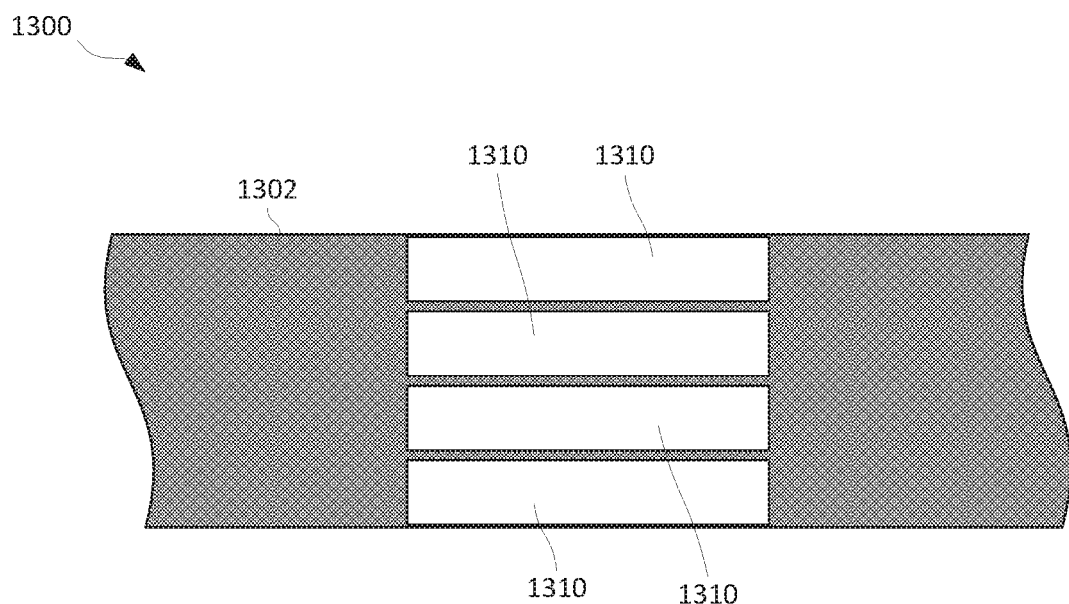
FIG. 13A is an overhead view of a magnetic rotor steering device including rotors longitudinally positionable above a metal strip according to certain aspects of the present disclosure.

FIG. 13A is an overhead view of a magnetic rotor steering device 1300 including rotors 1310 longitudinally positionable above a metal strip 1302 according to certain aspects of the present disclosure. Rotors 1310 can be oriented such that its axis of rotation is parallel to the longitudinal direction of travel of the strip 1302. The rotors 1310 can span a portion of the lateral width of the strip 1302.

Figure 13B:
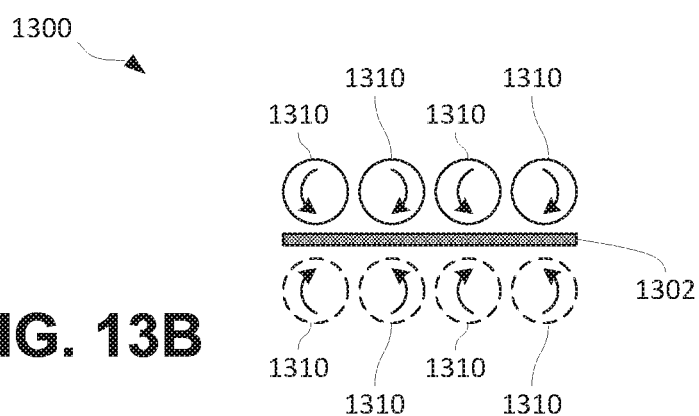
FIG. 13B is a front view of the magnetic rotor steering device of FIG. 13A including rotors longitudinally positionable above a metal strip according to certain aspects of the present disclosure.
Figure 13C:
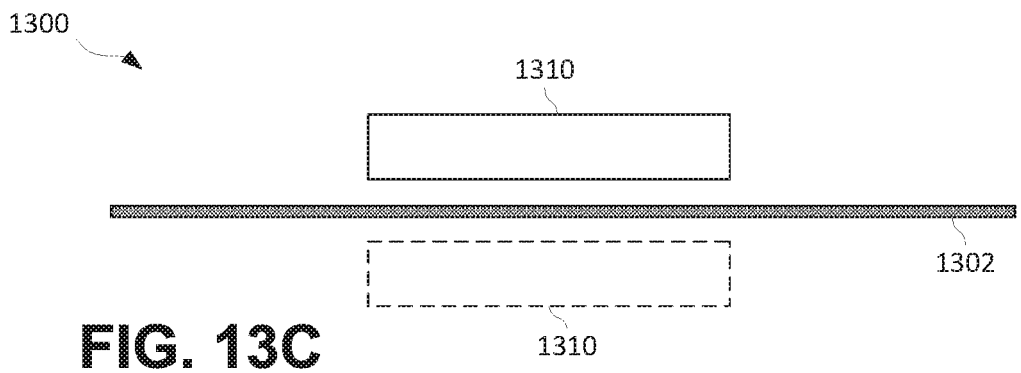
FIG. 13C is a side view of the magnetic rotor steering device of FIG. 13A including rotors longitudinally positionable above a metal strip according to certain aspects of the present disclosure.

Various numbers of rotors 1310 can be used. In some cases, a single rotor can be positioned approximately at the lateral centerline of a desired passline or at a lateral centerline of a metal strip and can rotate in either a clockwise or counter-clockwise direction depending on detected deviation of the lateral centerline of the metal strip from the lateral centerline of the desired passline (e.g., lateral deviation from the desired passline). In some cases, the number of rotors 1310 can be an even number, as depicted in FIGS. 13A-13C. The multiple rotors 1310 can be positioned with parallel axes of rotation. In some cases, no rotor is positioned below the strip 1302 opposite rotors 1310. In some cases, one or more rotors is positioned below the strip 1302 opposite rotors 1310.

It can be desirable to cover more lateral width of the strip 1302 with rotors 1310 in order to provide increased vertical control of the strip 1302 at that position.

FIG. 13B is a front view of the magnetic rotor steering device 1300 of FIG. 13A including rotors 1310 longitudinally positionable above a metal strip 1302 (optional rotors 1310 below the metal strip 1302 shown in dashed lines) according to certain aspects of the present disclosure. The rotors 1310 above the metal strip 1302 are centered around the lateral centerline of a desired passline. The rotors 1310 below the metal strip 1302 are centered around the lateral centerline of the desired passline. Laterally adjacent rotors 1310 may rotate in opposing directions (e.g., clockwise or counter-clockwise as seen in FIG. 13B). Since the number of rotors 1310 is even, the net lateral forces generated in the metal strip 1302 by the changing magnetic fields induced by the rotors 1310 is zero when the metal strip 1302 is centered on the desired passline.

FIG. 13C is a side view of the magnetic rotor steering device 1300 of FIG. 13A including rotors 1310 longitudinally positionable above a metal strip 1302 (with optional rotors 1310 shown in dashed lines below the metal strip 1302) according to certain aspects of the present disclosure.

FIG. 14 is a schematic, elevation diagram depicting a metal processing system 1400 including a magnetic rotor steering device 1404 used to steer a metal strip 1402 prior to entering strip processing equipment 1406 according to certain aspects of the present disclosure. The strip 1402 can pass through the strip processing equipment 1406 in direction 1410. Before entering the steering device 1404, the strip 1402 can be vertically offset from a vertical path 1408 (e.g., set of vertical centerlines) of a desired passline. The steering device 1404 can correct the vertical deviation, resulting in the strip 1402 entering the strip processing equipment 1406 in vertical alignment with the vertical path 1408 of the desired passline. The steering device 1404 can be any steering device as described herein.

FIG. 15 is a schematic, top view diagram depicting the metal processing system 1400 of FIG. 14 according to certain aspects of the present disclosure. The strip 1402 can pass through the strip processing equipment 1406 in direction 1410. Before entering the steering device 1404, the strip 1402 can be horizontally offset from a desired lateral centerline 1502 of a desired passline. The steering device 1404 can correct the horizontal deviation, resulting in the strip 1402 entering the strip processing equipment 1406 in horizontal alignment with the desired lateral centerline 1502 of the desired passline. The steering device 1404 can be any steering device as described herein.

Figure 16:
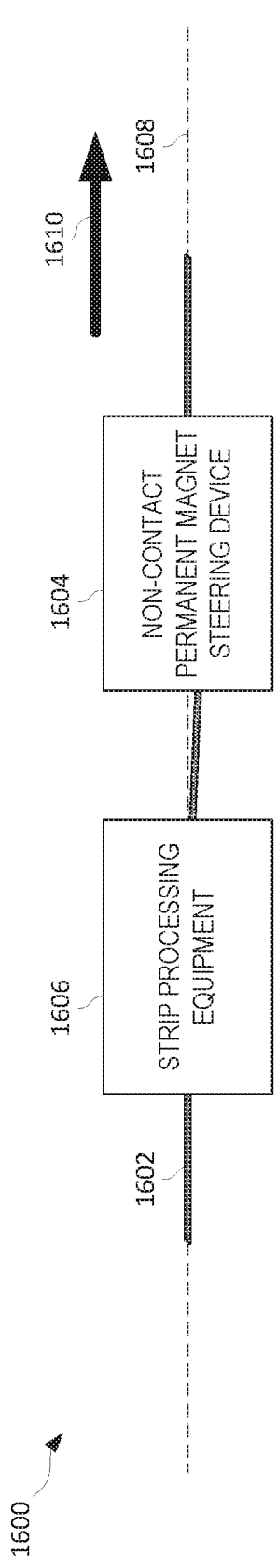
FIG. 16 is a schematic, elevation diagram depicting a metal processing system including a magnetic rotor steering device used to steer a metal strip after exiting strip processing equipment according to certain aspects of the present disclosure.

FIG. 16 is a schematic, elevation diagram depicting a metal processing system 1600 including a magnetic rotor steering device 1604 used to steer a metal strip 1602 after exiting strip processing equipment 1606 according to certain aspects of the present disclosure. The strip 1602 can pass through the strip processing equipment 1606 in direction 1610. After exiting the strip processing equipment 1606, the strip 1602 can be vertically offset from a vertical path 1608 of a desired passline. The steering device 1604 can correct the vertical deviation, resulting in the strip 1602 becoming vertically aligned with the vertical path 1608 of the desired passline despite problems imposed by or before the strip processing equipment 1606. The steering device 1604 can be any steering device as described herein.

Figure 17:
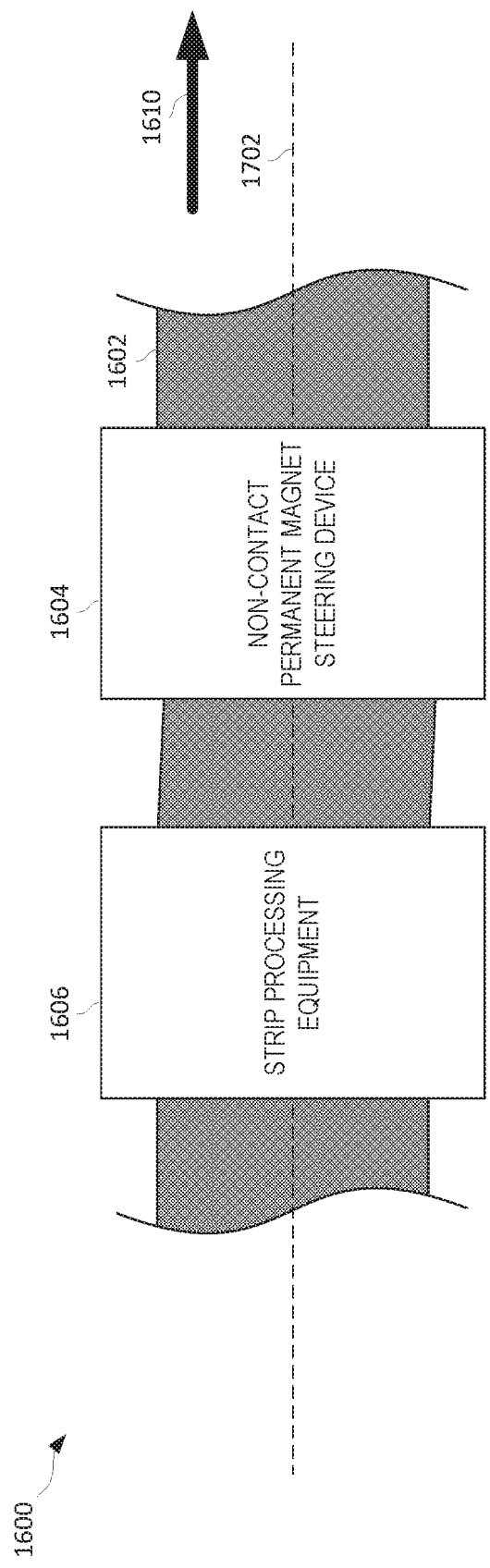
FIG. 17 is a schematic, top view diagram depicting the metal processing system of FIG. 16 according to certain aspects of the present disclosure.

FIG. 17 is a schematic, top view diagram depicting the metal processing system 1600 of FIG. 16 according to certain aspects of the present disclosure. The strip 1602 can pass through the strip processing equipment 1606 in direction 1610. After exiting the strip processing equipment 1606, the strip 1602 can be horizontally offset from a desired lateral centerline 1702 of a desired passline. The steering device 1604 can correct the horizontal deviation, resulting in the strip 1602 becoming horizontally aligned with the desired lateral centerline 1702 of the desired passline. The steering device 1604 can be any steering device as described herein.

Figure 18:
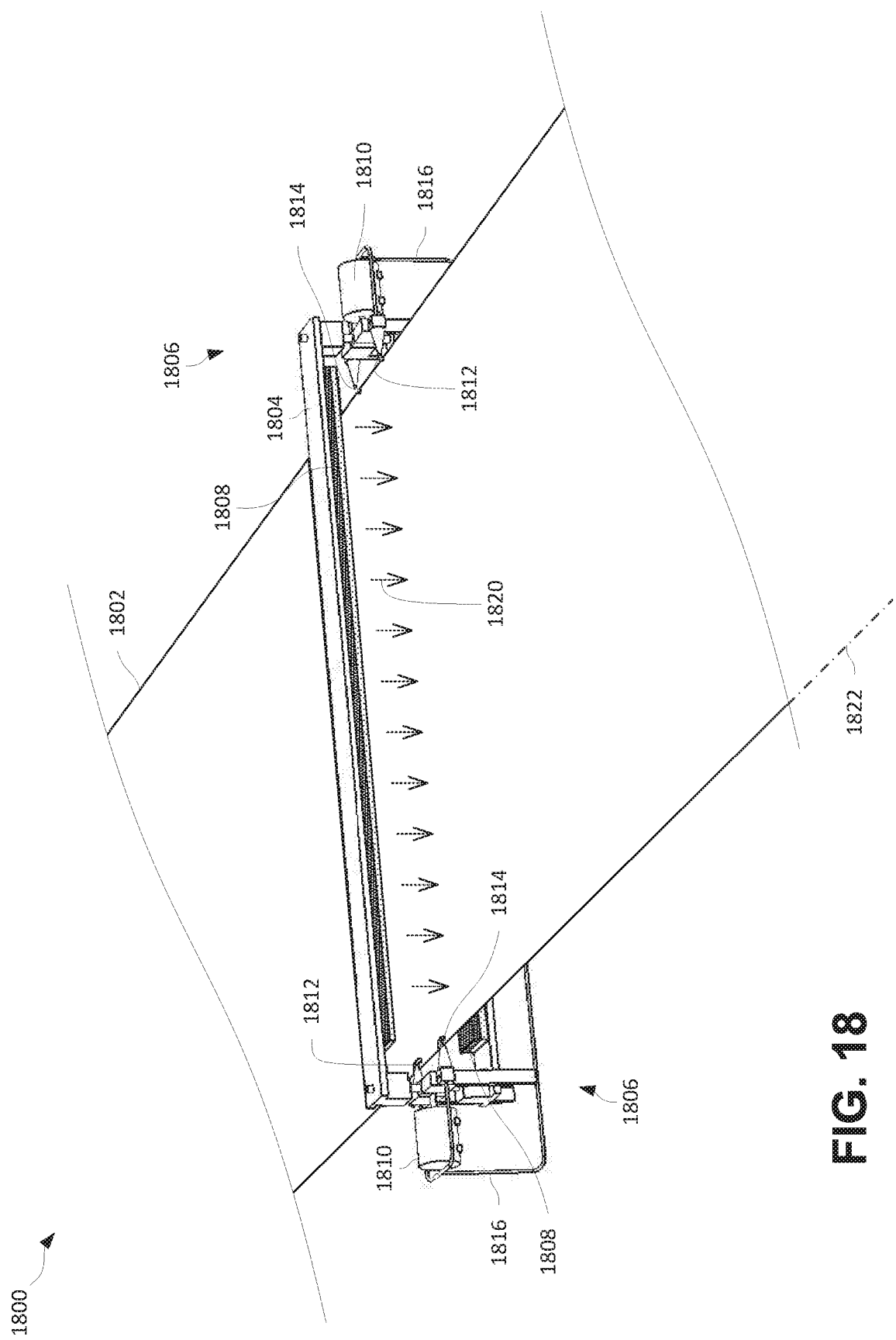
FIG. 18 is an axonometric depiction of an applied-current magnetic steering apparatus according to certain aspects of the present disclosure.

FIG. 18 is an axonometric depiction of an applied-current magnetic steering apparatus 1800 according to certain aspects of the present disclosure. The applied-current magnetic steering apparatus 1800 passes a metal strip 1802 through a magnetic field and applies an electrical current to at least a portion of the metal strip 1802 in order to induce force perpendicular to the magnetic field and direction of the electric current. The magnetic field can be generated by any suitable technique, such as electromagnets or permanent magnets. The direct current (DC) electrical current can be applied to the metal strip 1802 by any suitable technique, such as graphite brushes, conductive rollers, or other techniques.

The applied-current magnetic steering apparatus 1800 can include a pair of permanent magnets 1808 that are held stationary on pair of lateral supports 1804 (e.g., a top frame above the vertical centerline 1822 of a desired passline of the metal strip 1802 and a bottom frame below the vertical centerline 1822 of the desired passline). The permanent magnets 1808 can present opposite magnetic poles to the vertical centerline 1822 of the desired passline, thus generating a magnetic field 1820 through the vertical centerline 1822 of the desired passline. In some cases, the frame can be positioned with respect to a vertical centerline of the metal strip 1802 instead of a vertical centerline 1822 of a desired passline. The magnetic field 1820 can be a uniform magnetic field across the width of the metal strip 1802, although a non-uniform magnetic field can be used in some cases. In some cases, magnets 1808 are placed to only generate a magnetic field near the edges of the metal strip 1802. In some cases, one or more permanent magnets 1808 are placed near the metal strip 1802 on only one side of the metal strip 1802 (e.g., only the top or only the bottom).

The lateral supports 1804 can be supported by a pair of vertical supports 1806. Linear actuators 1810 on the vertical supports 1806 can control the vertical distance of one or both vertical supports 1806 from the metal strip 1802. Linear actuators 1810 can control the vertical positioning of each lateral support 1804 (e.g., top support and bottom support) separately or together. In some cases, some linear actuators 1810 can control the gap between the lateral supports 1804, while other linear actuators 1810 can control the vertical displacement of a centerline between the top and bottom lateral supports 1804. Any suitable number of linear actuators 1810 can be used. Any suitable linear actuators 1810 can be used, such as motor-and-screw combinations or hydraulic actuators.

Each vertical support 1806 can support one or more electrodes 1812, 1814, although the one or more electrodes 1812, 1814 can be supported by other equipment. The one or more electrodes 1812, 1814 can apply a current through the metal strip 1802. Electrodes 1812, 1814 can be positioned to apply a current through the metal strip 1802 along the edges of the metal strip 1802 within the magnetic field 1820, across the width of the metal strip 1802 within the magnetic field 1820, or any combination thereof. In some cases, each vertical support 1806 can support one positive electrode 1812 and one negative electrode 1814. The positive electrode 1812 and the negative electrode 1814 can be positioned on opposite sides of a plane formed between the lateral supports 1804. In some cases, a positive electrode 1812 of one vertical support 1806 can be positioned laterally across the metal strip 1802 from a negative electrode 1814 of another vertical support 1806, although it can be positioned laterally across the metal strip 1802 from a positive electrode 1812 of another vertical support 1806 in other cases.

In some cases, electrodes 1812, 1814 are located elsewhere, such as on equipment other than vertical supports 1806 or lateral supports 1804, including at any distance from the other elements (e.g., permanent magnets 1808) of the applied-current magnetic steering apparatus 1800. Electrodes 1812, 1814 can be placed anywhere in contact with the metal strip 1802 as long as current flows through the magnetic field 1820 generated by the applied-current magnetic steering apparatus 1800. For example, a positive electrode 1812 can be placed near the beginning of one or more pieces of metal strip processing equipment, while a negative electrode 1814 is placed near the end of the one or more pieces of metal strip processing equipment, with the permanent magnets 1808 generating a magnetic field 1820 at a location anywhere between the electrodes 1812, 1814. In some cases, electrodes 1812, 1814 can be placed at locations where the metal strip 1802 is under greater tension than and/or is cooler than where the metal strip 1802 is being steered (e.g., where the magnetic field 1820 intersects the metal strip 1802). Contacting the metal strip 1802 with electrodes 1812, 1814 when the metal strip is under high tension and/or at a relatively cold temperature (e.g., at or near room temperature, after being cooled in a cooling section of a continuous annealing line, and/or before being heated in a furnace section of a continuous annealing line) may avoid contact-based damage to the metal strip 1802. The permanent magnets 1808 may be placed anywhere that steering is desired.

Each electrode 1812, 1814 can include any suitable mechanism for transmitting current to the metal strip 1802. In some cases, the electrodes 1812, 1814 include graphite brushes, although other mechanisms can be used to transmit current to the metal strip 1802. In some cases, a roller is positioned to contact the metal strip 1802 at or adjacent the electrodes 1812, 1814 to maintain contact between the metal strip 1802 and the electrodes 1812, 1814 to minimize arcing. The roller can be biased (e.g., with a spring) to ensure contact with the metal strip 1802 prior to application of electrical current. The applied-current magnetic steering apparatus 1800 can be useful for preventing over-travel of the metal strip (e.g., movement of the lateral centerline of the metal strip beyond a desired distance from the lateral centerline of the desired passline), as the electrodes 1812, 1814 can be positioned to contact the metal strip 1802, and thus produce a corrective force, only when the metal strip 1802 has deviated from the desired passline by more than a preset tolerance.

The current applied through the metal strip 1802 can be DC. Electrodes 1812, 1814 can be connected to a power source through cables 1816. In some cases, no current would be applied to the metal strip 1802 until it is determined that steering is needed (e.g., correction is needed). The applied-current magnetic steering apparatus 1800 can include any of the sensing equipment disclosed herein with regards to the magnetic rotor steering devices (e.g., permanent-magnet magnetic rotor steering device 700 of FIG. 7) to determine when steering is needed.

In some cases, multiple sets of permanent magnets 1808 are used at longitudinally offset locations to generate multiple magnetic fields 1820 at longitudinally offset locations. In such cases, electrodes 1812, 1814 can be located before the first set of permanent magnets 1808 and after the last set of permanent magnets 1808, such that the current flowing through the metal strip 1802 passes through each of the multiple magnetic fields 1820. In such cases, steering of the metal strip 1802 can be controlled at various locations by controlling the magnetic field 1820 at each particular location. The magnetic field 1820 at a particular location can be controlled by adjusting the vertical distance between the permanent magnets 1808 and the metal strip 1802 at that particular location. For example, to apply more steering force at a first set of magnets and less steering force at a second set of magnets, the same current can be applied through the metal strip 1802 and the first set of magnets can be moved vertically closer to the metal strip than the second set of magnets. Current can be held constant or controlled simultaneously. Each set of magnets can be associated with its own set of sensing equipment to control the vertical distance of that particular set of magnets with respect to the metal strip.

In some cases, an applied-current magnetic steering apparatus 1800 includes permanent magnets 1808 oriented in a direction other than laterally with respect to the metal strip 1802. For example, an applied-current magnetic steering apparatus 1800 can include permanent magnets 1808 oriented longitudinally with respect to the metal strip 1802, above and below the edges of the metal strip 1802, to generate magnetic fields 1820 through the edges of the metal strip 1802. Such cases can be used, for example, to apply steering force at the edges of a metal strip 1802 for a longitudinal distance (e.g., the length of the permanent magnets 1808 or longitudinal length of the resultant magnetic fields 1820).

Figure 19:
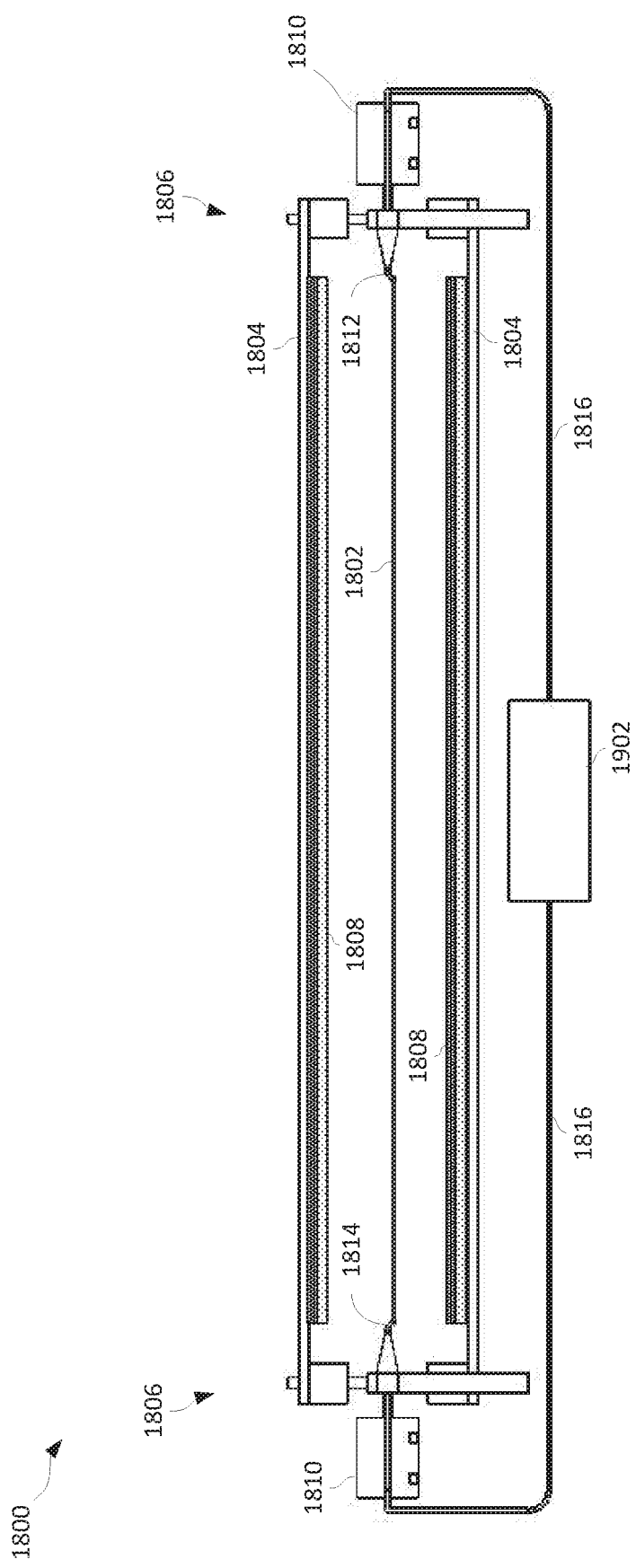
FIG. 19 is a front view of the applied-current magnetic steering apparatus of FIG. 18 according to certain aspects of the present disclosure.

FIG. 19 is a front view of the applied-current magnetic steering apparatus 1800 of FIG. 18 according to certain aspects of the present disclosure. The applied-current magnetic steering apparatus 1800 is shown with two vertical supports 1806 supporting two lateral supports 1804. Permanent magnets 1808 are supported by the lateral supports 1804 above and below the metal strip 1802. Electrodes 1812, 1814 contact the metal strip 1802 at or near the edges of the metal strip 1802. Linear actuators 1810 can adjust the vertical positioning of the lateral supports 1804 as described above.

Cables 1816 couple the electrodes 1814 to a power supply 1902. The power supply 1902 can be any power supply suitable for providing electric current to through the metal strip 1802.

Figure 20A:
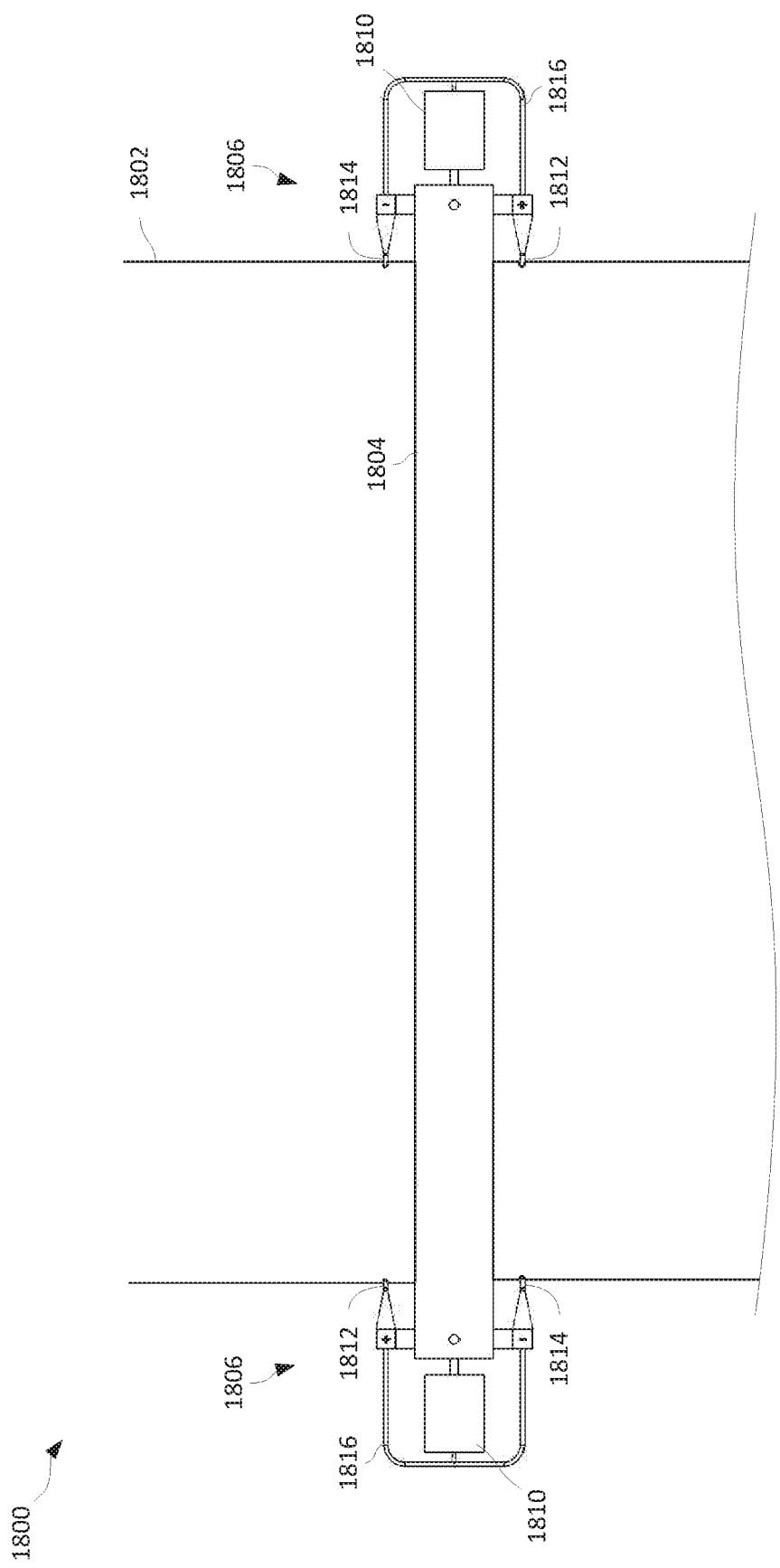
FIG. 20A is a top view of the applied-current magnetic steering apparatus of FIG. 18 according to certain aspects of the present disclosure.

FIG. 20A is a top view of the applied-current magnetic steering apparatus 1800 of FIG. 18 according to certain aspects of the present disclosure. The applied-current magnetic steering apparatus 1800 is shown with two vertical supports 1806 supporting lateral supports 1804. Electrodes 1812, 1814 contact the metal strip 1802 at or near the edges of the metal strip 1802. Linear actuators 1810 can adjust the vertical positioning of the lateral supports 1804 as described above. Cables 1816 provide power to the electrodes 1814 for applying an electrical current to the metal strip 1802.

In some cases, an applied-current magnetic steering apparatus includes safety equipment to ensure that when a break occurs in the metal strip 1802, the current being applied by any electrode would not be able to find a path through ground that can damage other equipment or pose a hazard. In some cases, grounding equipment (e.g., conducting rollers) can be located before and/or after the applied-current magnetic steering apparatus in order to ensure a path through ground exists that would not damage other equipment or pose a hazard. In some cases, circuit breaker equipment (e.g., ground-fault interrupt circuit breakers) can be used to ensure the safety of the apparatus in the event of an unexpected load. In some cases, strip break detection equipment (e.g., visual or conducting) can be placed before the applied-current magnetic steering apparatus such that if a break is detected, the applied-current magnetic steering apparatus can be shut down or disabled before the break reaches the applied-current magnetic steering apparatus. Other types of safety equipment can be used.

The applied-current magnetic steering apparatus as described herein can be used wherever steering is needed, such as in place of the non-contact magnetic rotor steering device 1604 of FIGS. 14-17. The applied-current magnetic steering apparatus can also be used with detection equipment as described above with reference to the various steering devices, such as in the feedback control process 1100 of FIG. 11. When applying the applied-current magnetic steering apparatus to the feedback control process 1100 of FIG. 11, determining adjustments to the permanent magnet rotors at block 1110 and manipulating of the rotors at block 1112 would be replaced with determining adjustments to the applied current and/or magnetic field (e.g., through vertical adjustments to the lateral supports supporting the permanent magnets) and manipulating the applied current and/or magnetic field, respectively. The applied-current magnetic steering apparatus can also be used at any suitable location in a continuous annealing line, such as the continuous annealing line 900 of FIG. 9, wherein each or any of the magnetic rotor steering devices 902 could be an applied-current magnetic steering apparatus.

Figure 20B:
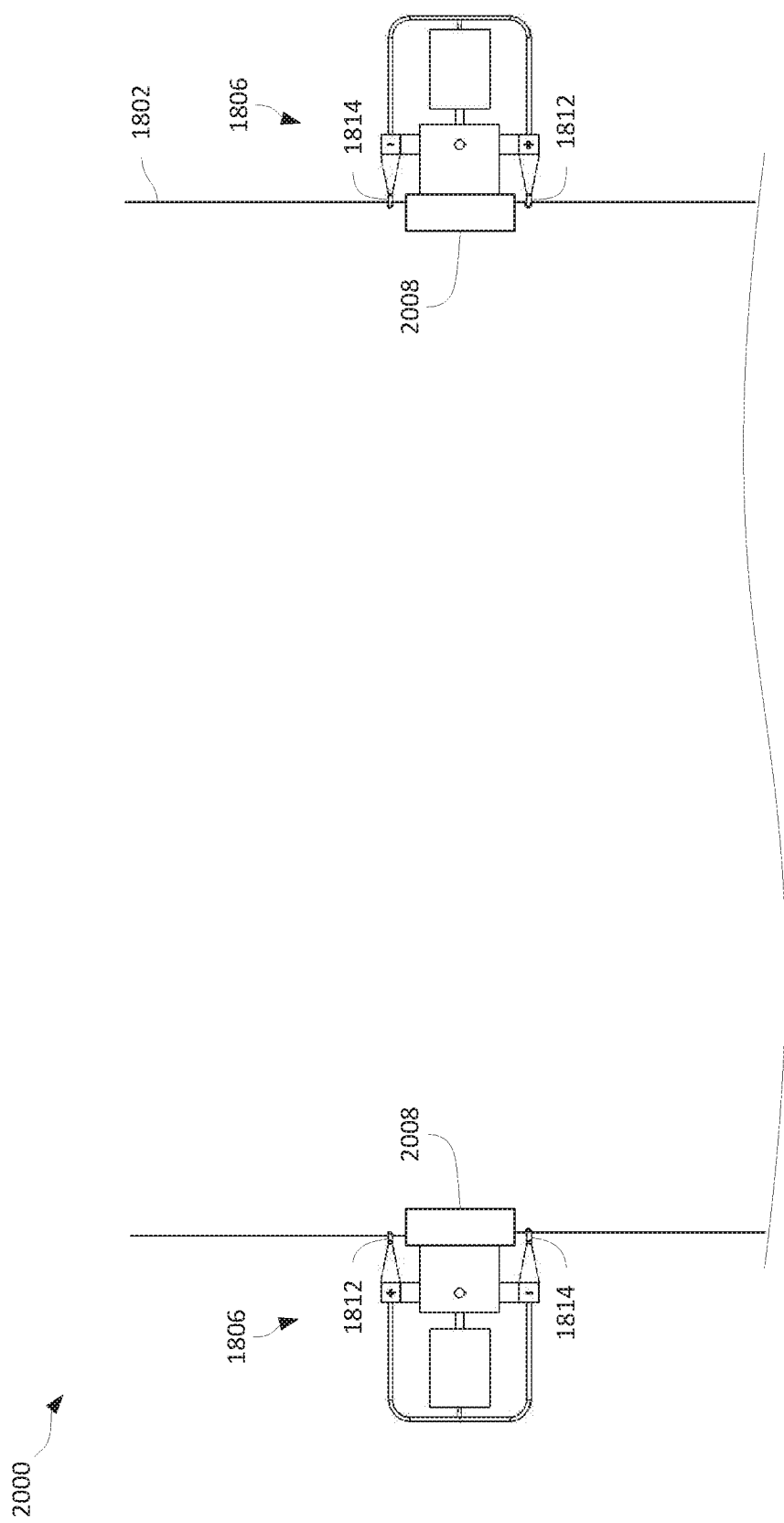
FIG. 20B is a top view of an applied-current magnetic steering apparatus according to certain aspects of the present disclosure.

FIG. 20B is a top view of an applied-current magnetic steering apparatus 2000 according to certain aspects of the present disclosure. The applied-current magnetic steering apparatus 2000 is similar to the applied-current magnetic steering apparatus 1800 of FIGS. 18-20, however with edge-located magnets 2008 instead of the magnets 1808 of FIG. 18.

The applied-current magnetic steering apparatus 1800 can include a pair of vertical supports 1806 supporting electrodes 1812, 1814. Each vertical support 1806 can support a set of permanent magnets 2008 above and below the metal strip 1802 along the edge of the metal strip 1802 between electrodes 1812, 1814.

FIG. 21 is a front view of a magnetic rotor steering device 2100 according to certain aspects of the present disclosure. The magnetic rotor steering device 2100 can include a set of rotors 2110 coupled to horizontal supports 2104. Each rotor 2110 can be a permanent magnet or electromagnet rotor, as disclosed herein. The magnetic rotor steering device 2100 can be similar to the magnetic rotor steering device 100 of FIG. 1, however with rotors 2110 mounted from above and below the metal strip 2102 such that no structure remains between vertically adjacent rollers (e.g., the two leftmost or two rightmost rollers as seen in FIG. 21) for the metal strip 2102 to crash into should the metal strip stray far enough from the lateral centerline 2106 of a desired passline. The rotors 2110 can be supported from the horizontal supports 2104 by rotor arms 2108.

In some cases, rotor arms 2108 are adjusted to manipulate the rotor 2110 in a vertical direction 2118 (e.g., upwards or downwards). In some cases, rotor arms 2108 are movable along the horizontal support 2104 to manipulate the rotor in a horizontal direction 2116 (e.g., away from or towards the lateral centerline 2106 of the desired passline). In some cases, feedback from a control system or feedback sensors can adjust the position of the rotor 2110. In some cases, however, the rotor arms 2108 may hold the rotor 2110 stationary (e.g., horizontally and vertically stationary) with respect to the horizontal support 2104.

In some cases, a motor or other driver rotates each rotor 2110 in a clockwise 2114 or counterclockwise 2112 direction. The motors or other drivers used to rotate the rotors of the steering device 2100 or other steering devices disclosed herein can be or can include a variable speed driver for providing adjustment to the rotational speed of the rotor. For example, a variable frequency driver can be used to adjust speed of an alternating current (AC) motor. Rotational speed may be controlled using preset values or through feedback from feedback sensors. In some cases, the motor or other driver may provide a steady force to rotate the rotor, without the need for any variable speed controls or sensor feedback.

In some cases, a motor or other driver can rotate rotors 2110 in an appropriate direction such that the surface of each rotor nearest the vertical centerline 2120 of the desired passline moves towards the lateral centerline 2106 of the desired passline. In other words, starting at the top left and continuing clockwise as depicted in FIG. 21, the first and third rotors 2110 can spin in a counterclockwise direction 2112, while the second and fourth rotors 2110 spin in a clockwise direction 2114.

Figure 22:
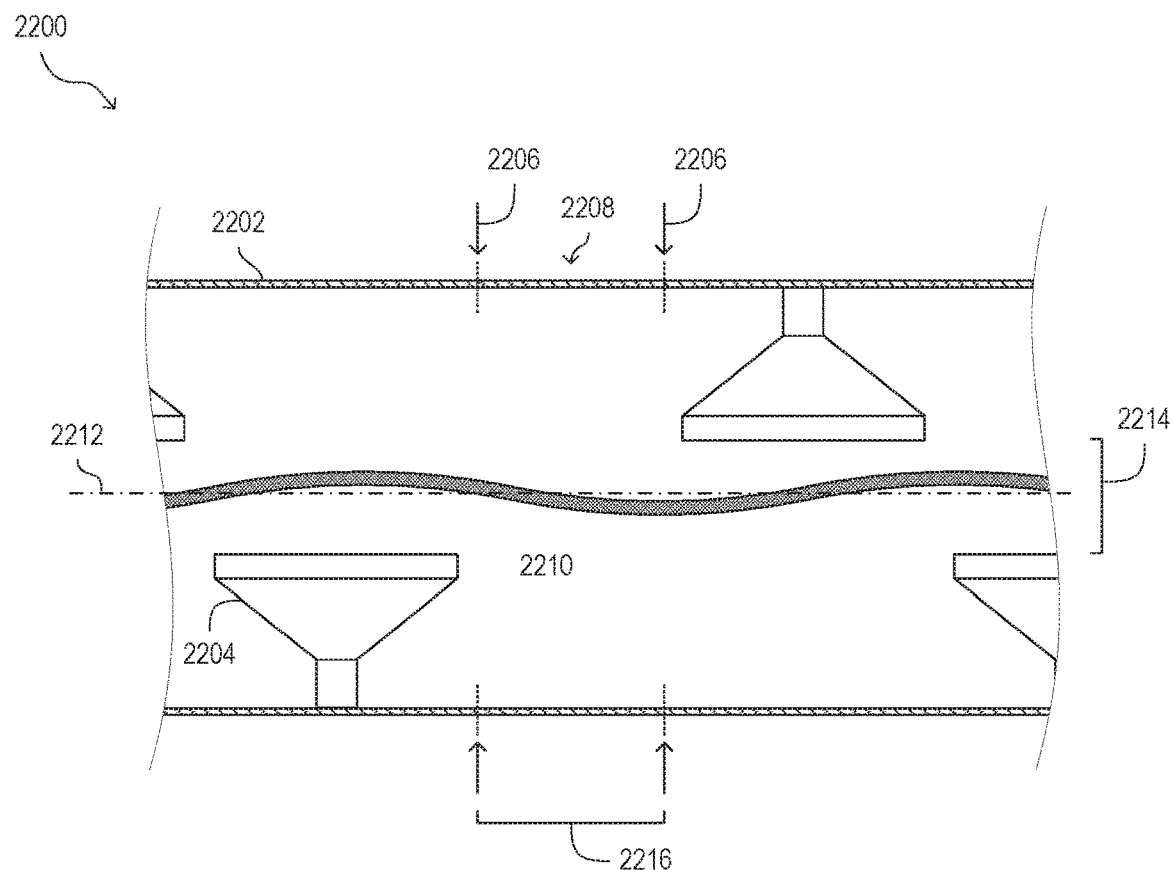
FIG. 22 is a cutaway side view of a furnace into which a magnetic rotor steering apparatus can be fit according to certain aspects of the present disclosure.

FIG. 22 is a cutaway side view of a furnace 2200 into which a magnetic rotor steering apparatus can be fit according to certain aspects of the present disclosure. In some cases, it can be desirable to locate the magnetic rotor steering apparatus in a furnace zone or cooling zone, such as described above with reference to FIG. 9. In some cases, it can be desirable to locate the magnetic rotor steering apparatus outside of the housing or outer walls 2202 of the furnace 2200 of the furnace zone, but sufficiently adjacent the metal strip 2210 to steer the metal strip 2210.

A furnace 2200 in a furnace zone can include an outer wall 2202 enclosing several air nozzles 2204. A passline gap 2214 exists between upper and lower air nozzles 2204, through which the metal strip 2210 passes. The air nozzles 2204 can provide sufficient airflow to maintain the metal strip 2210 at or near a vertical path 2212 of the desired passline. The metal strip 2210 may take a sinusoidal shape when passing through the furnace 2200.

A gap 2216 may exist between adjacent air nozzles 2204 of an existing furnace 2200. Cuts can be made into the outer walls 2202 at points 2206 to remove a section 2208 of the outer wall 2202. Once the section 2208 has been removed, a recessed section can be installed in the outer walls 2202, as seen in FIGS. 23 and 24.

Figure 23:
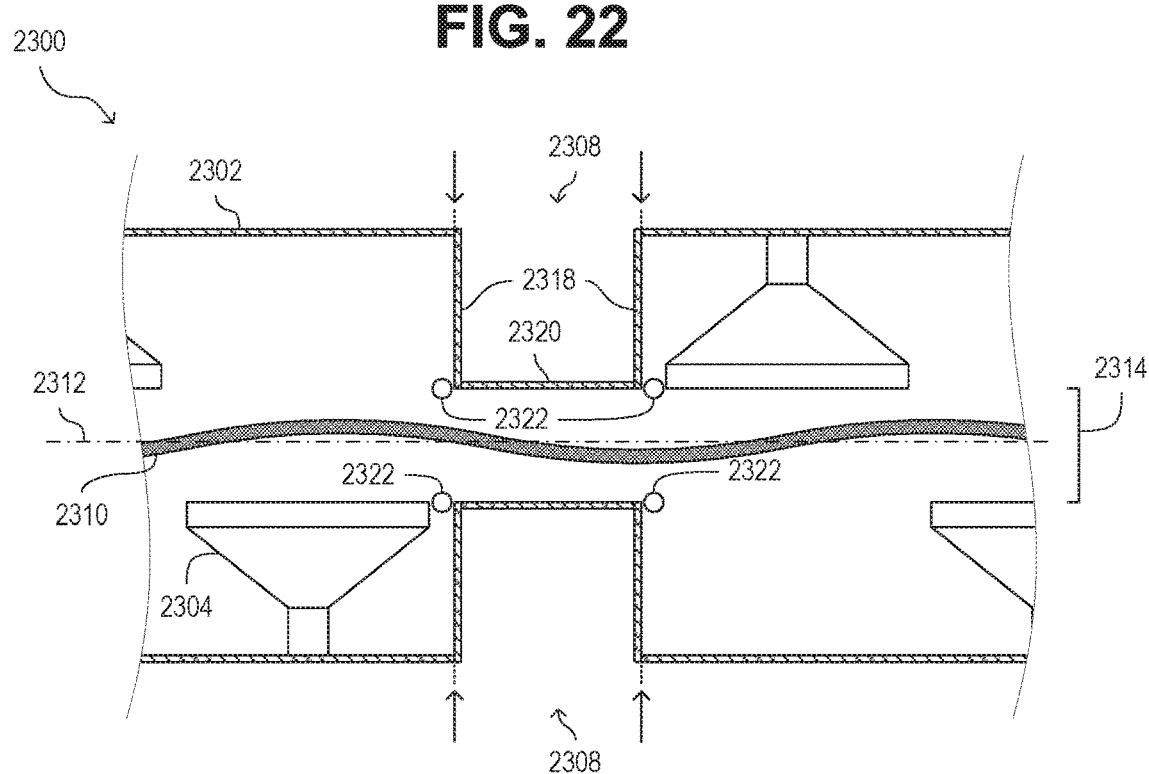
FIG. 23 is a cutaway side view of a furnace that has been modified to receive a magnetic rotor steering apparatus according to certain aspects of the present disclosure.
Figure 24:
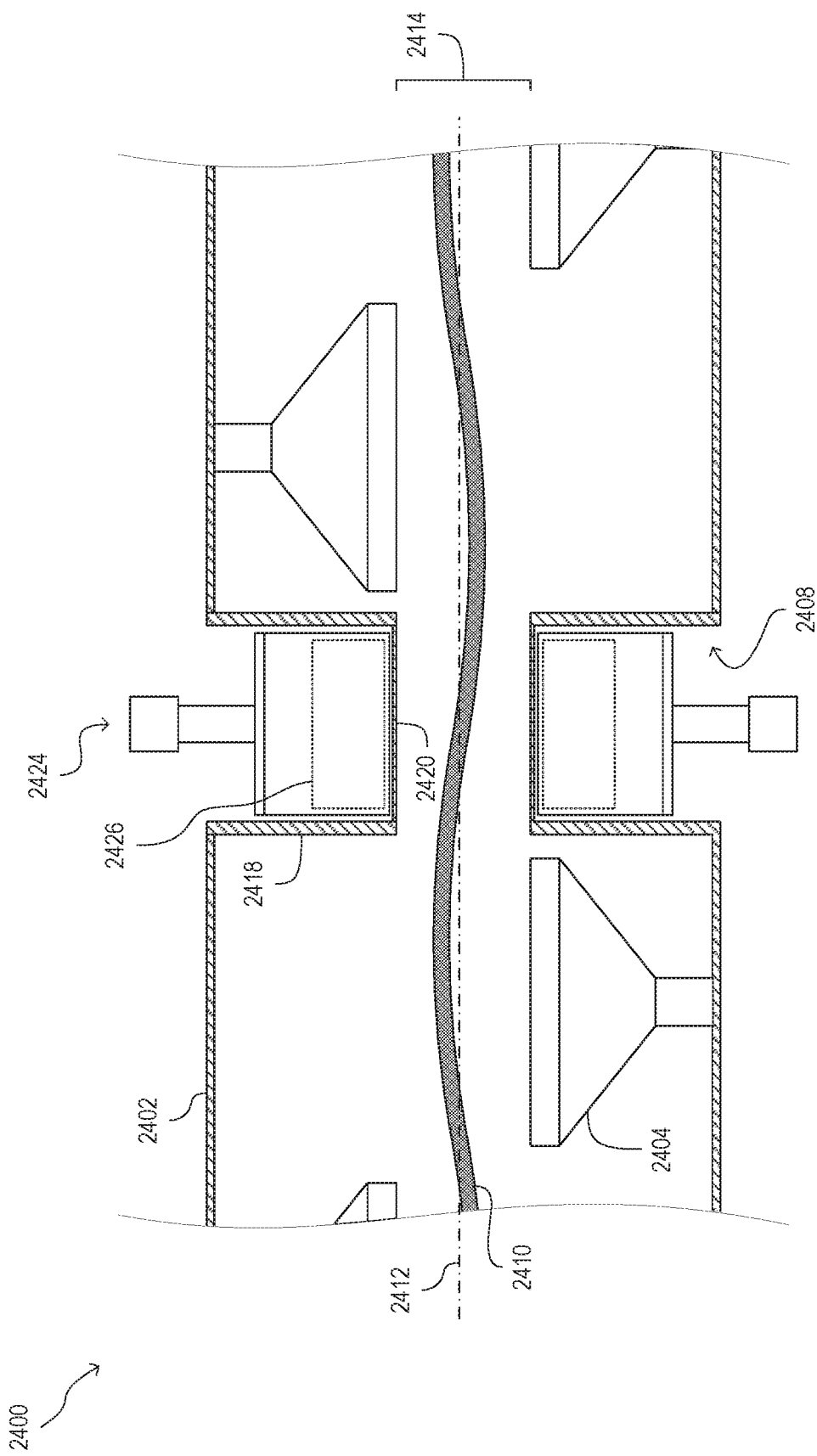
FIG. 24 is a cutaway side view depicting a magnetic rotor steering apparatus incorporated into a furnace according to certain aspects of the present disclosure.

FIG. 23 is a cutaway side view of a furnace 2300 that has been modified to receive a magnetic rotor steering apparatus. The outer walls 2202 have a recessed section 2308 installed where a section had been removed. The recessed section can include vertical walls 2318 and a horizontal wall 2320. The horizontal wall 2320 can be spaced apart from the vertical path 2312 of the desired passline by approximately the same distance as the end of the nozzles 2304, thus maintaining approximately the same passline gap 2314 as before modifications.

The walls 2318, 2320 of the recessed section 2308 can provide thermal insulation to maintain heat in the furnace 2300. In some cases, the vertical walls 2318 can provide more thermal insulation than the horizontal wall 2320. In some cases, the horizontal wall 2320 can be thinner than the vertical walls 2318, to allow the magnetic rotor steering device to be positioned close to the vertical path 2312 of the desired passline of the metal strip 2310 passing through the furnace 2300.

In some cases, optional rollers 2322 can be installed adjacent the recessed section 2308 within the passline gap 2314. The rollers 2322 can be free to rotate or can rotate at the speed of the metal strip 2310 moving through the furnace 2300 so that if the metal strip 2310 moves too far away from the vertical path 2312 of the desired passline, the metal strip 2310 will contact the roller 2322 instead of crashing into the recessed section 2308.

Once a furnace 2300 has been modified to include a recessed section 2308, a magnetic rotor steering device can be placed in the U space of the recessed section 2308, as seen in FIG. 24.

FIG. 24 is a cutaway side view depicting a magnetic rotor steering apparatus 2424 incorporated into a furnace 2400 according to certain aspects of the present disclosure. The furnace 2400 can include a recessed section 2408 in the outer walls 2402 of the furnace 2400. The recessed section 2408 can be originally built into the outer walls 2402 of the furnace 2400, or can be added to an existing furnace through modification, such as described above with reference to FIGS. 22-23. The metal strip 2410 can move through the furnace 2400 at or near a vertical path 2412 of the desired passline, between air nozzles 2404.

In some cases, the vertical walls 2418 of the recessed section 2408 can have a sufficient thickness or be made of a material sufficient to provide a high degree of thermal insulation, to maintain heat within the furnace 2400 and reduce the amount of heat transfer from the furnace 2400 to the magnetic rotor steering apparatus 2424. In some cases, the horizontal wall 2420 of the recessed section 2408 can be thinner than the vertical walls 2418 to allow the rotor 2426 of the magnetic rotor steering apparatus 2424 to be positioned as closely as possible to the metal strip 2410. In some cases, the horizontal wall 2420 of the recessed section 2408 can be made from a non-electrically conductive material. In some cases, the horizontal wall 2420 of the recessed section 2408 can be made from an electrically conductive material, optionally with slits for reducing eddy currents, as described above with reference to the rotor shield 120 of FIG. 5.

Figure 25:
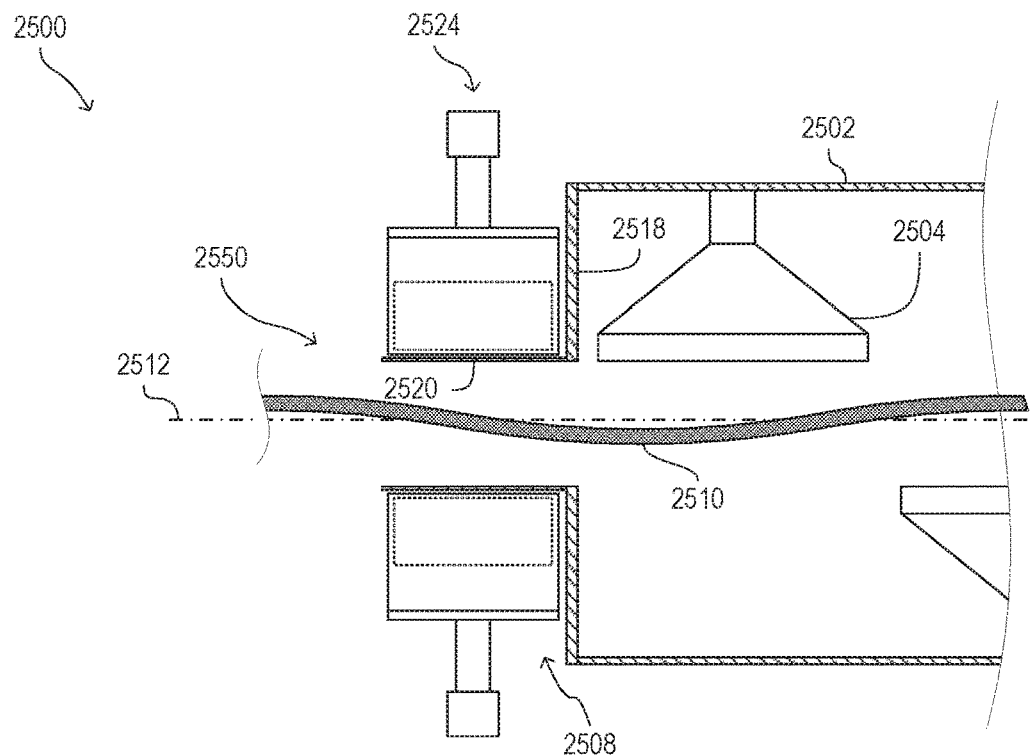
FIG. 25 is a cutaway side view depicting a magnetic rotor steering apparatus incorporated into a furnace at a furnace entrance according to certain aspects of the present disclosure.

FIG. 25 is a cutaway side view depicting a magnetic rotor steering apparatus 2524 incorporated into a furnace 2500 at a furnace entrance 2550 according to certain aspects of the present disclosure. The furnace 2500 can include a recessed section 2508 in the outer walls 2502 of the furnace 2500 at the furnace entrance 2550. The recessed section 2508 can be originally built into the outer walls 2502 of the furnace 2500, or can be added to an existing furnace through modification, such as described above with reference to FIGS. 22-23. The metal strip 2510 can move through the furnace 2500 at or near a vertical path 2512 of the desired passline, between air nozzles 2504.

When implemented at a furnace entrance 2550, the recessed section 2508 can include a vertical wall 2518 and a horizontal wall 2520. In some cases, the side opposite the horizontal wall 2520 from the vertical wall 2518 can be left open or semi-open (e.g., having a vertical wall section that is smaller than vertical wall 2518), allowing easier access to the magnetic rotor steering apparatus 2524.

Figure 26:
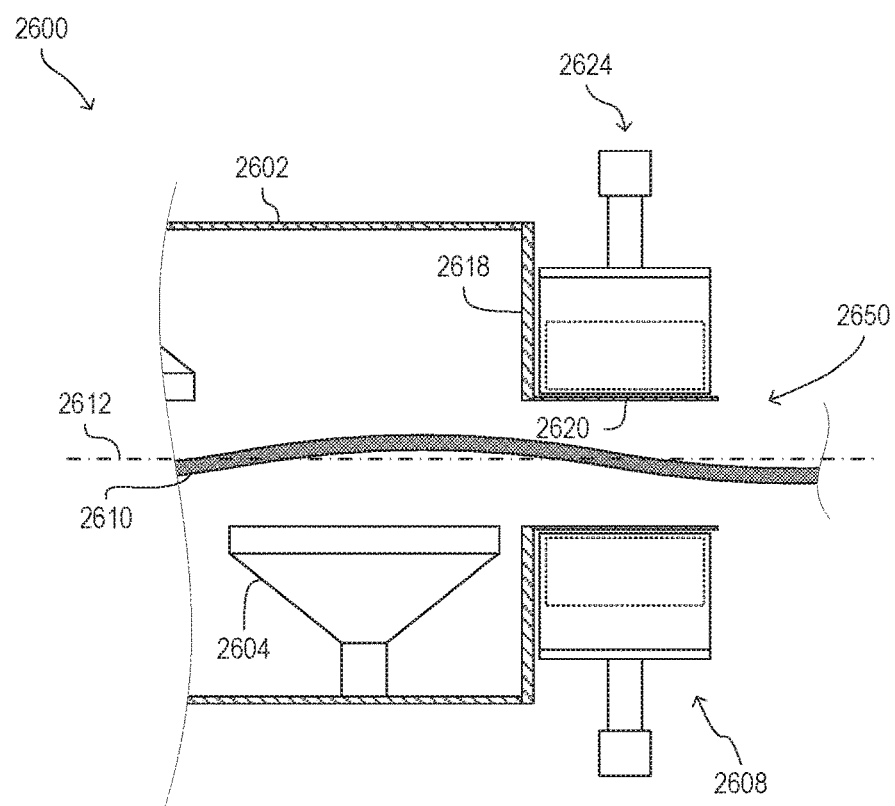
FIG. 26 is a cutaway side view depicting a magnetic rotor steering apparatus incorporated into a furnace at a furnace exit according to certain aspects of the present disclosure.

FIG. 26 is a cutaway side view depicting a magnetic rotor steering apparatus 2624 incorporated into a furnace 2600 at a furnace exit 2650 according to certain aspects of the present disclosure. The furnace 2600 can include a recessed section 2608 in the outer walls 2602 of the furnace 2600 at the furnace exit 2650. The recessed section 2608 can be originally built into the outer walls 2602 of the furnace 2600, or can be added to an existing furnace through modification, such as described above with reference to FIGS. 22-23. The metal strip 2610 can move through the furnace 2600 at or near a vertical path 2612 of the desired passline, between air nozzles 2604.

When implemented at a furnace exit 2650, the recessed section 2608 can include a vertical wall 2618 and a horizontal wall 2620. In some cases, the side opposite the horizontal wall 2620 from the vertical wall 2618 can be left open or semi-open (e.g., having a vertical wall section that is smaller than vertical wall 2618), allowing easier access to the magnetic rotor steering apparatus 2624.

Figure 27:
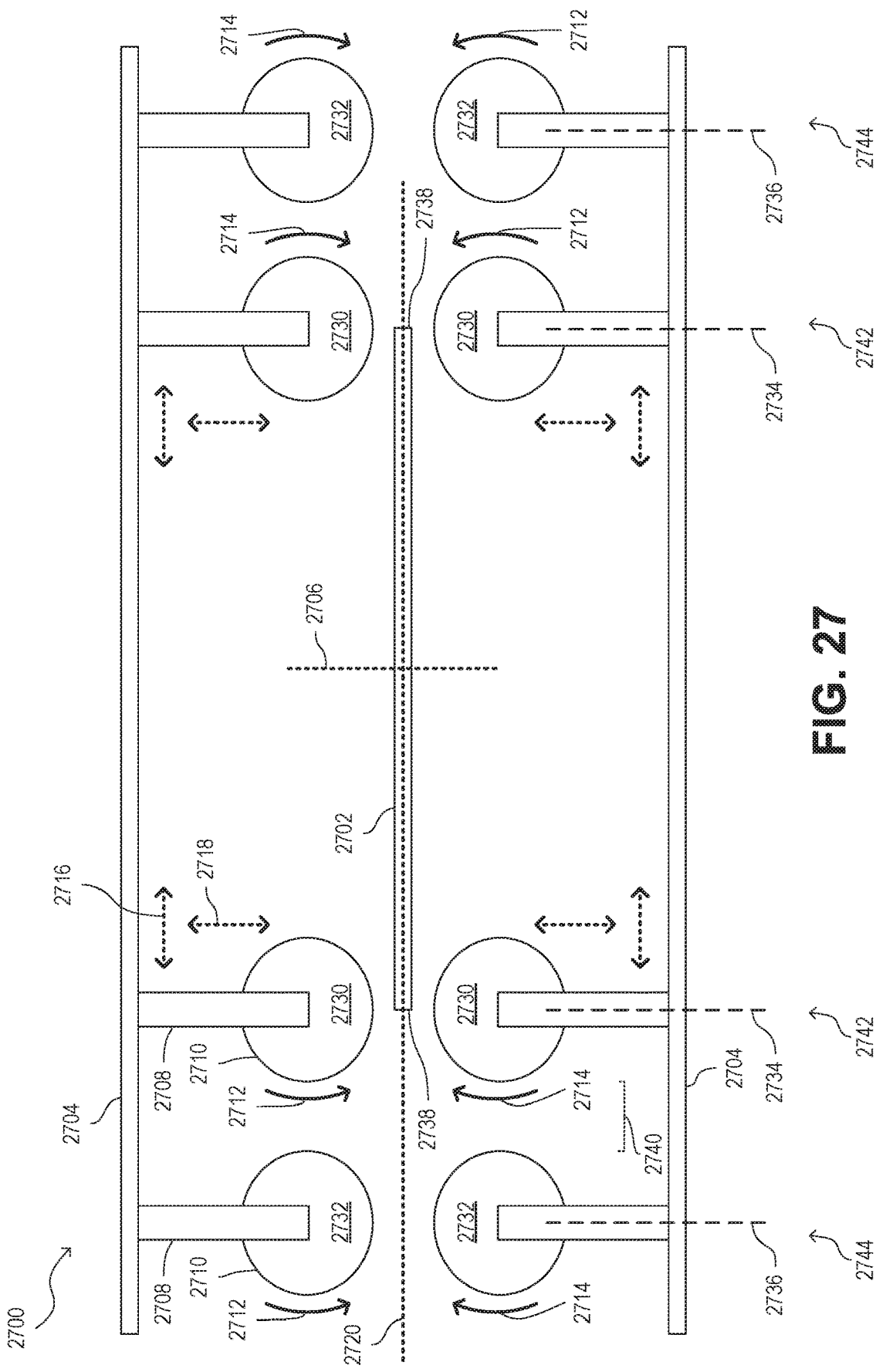
FIG. 27 is a front view of a magnetic rotor steering device having secondary rotors according to certain aspects of the present disclosure.

FIG. 27 is a front view of a magnetic rotor steering device 2700 having secondary rotors according to certain aspects of the present disclosure. The magnetic rotor steering device 2700 can include multiple rotors 2710 that are permanent magnet or electromagnet rotors, as disclosed herein. As depicted in FIG. 27, each rotor 2710 is mounted to horizontal supports 2704 located above and below the metal strip 2702 similar to FIG. 21. However, in some cases, rotors 2710 are mounted to vertical supports, such as depicted in FIG. 1. Rotors 2710 can be supported by rotors arms 2708.

The magnetic rotor steering device 2700 can include primary rotors 2730 and secondary rotors 2732. Primary rotors 2730 can be positioned closer to the lateral centerline 2706 of a desired passline than the secondary rotors 2732. Secondary rotors 2732 can be spaced a distance 2740 apart from the primary rotors 2730. The distance 2740 can be sufficient to avoid magnetic interference between the adjacent rotors 2710 (e.g., such that rotation of a secondary rotor 2732 adjacent a primary rotor 2730 reduces the efficiency of rotation of the primary rotor 2730 by at least less than 20%, 15%, 10%, 9%, 8%, 7%, 6%, 5%, 4%, 3%, 2%, or 1%). If any of the primary rotors 2730 fail to maintain the metal strip 2702 laterally aligned with the lateral centerline 2706 of a desired passline or within a desired lateral offset therefrom (e.g., due to failure of the primary rotor 2730 or any motor attached thereto or due to overwhelmingly strong lateral forces imposed on the metal strip 2702 by other factors), the secondary rotors 2732 can provide additional force to urge the metal strip 2702 towards the lateral centerline 2706 of a desired passline.

As depicted in FIG. 27, each of the secondary rotors 2732 is supported by rotor arms 2708 separate from the primary rotors 2730, however that need not be the case. In some cases, a secondary rotor 2732 can be coupled to the rotor arm 2708 of a primary rotor 2730. Primary rotors 2730 and secondary rotors 2732 can be powered or rotated by separate motors, however that need not be the case. In some cases, a single motor can power or rotate both a secondary rotor 2732 and a primary rotor 2730.

Each primary rotor 2730 can be positioned along a primary rotor plane 2734 (e.g., such that the primary rotor 2730 rotates around an axis of rotation found on the primary rotor plane 2734). Each secondary rotor 2732 can be positioned along a secondary rotor plane 2736 (e.g., such that the secondary rotor 2732 rotates around an axis of rotation found on the secondary rotor plane 2736). Therefore, the secondary rotor planes 2736 are located opposite the primary rotor planes 2734 from the lateral centerline of a desired passline of the metal strip 2702 (e.g., the secondary rotor planes 2736 are spaced a distance apart from the primary rotor planes 2734 away from the lateral centerline of a desired passline of the metal strip 2702). A primary rotor set 2742 can include one or more primary rotors 2730 located on a single primary rotor plane 2734. A secondary rotor set 2744 can include one or more secondary rotors 2732 located on a single secondary rotor plane 2736. FIG. 27 depicts two primary rotors sets 2742 and two secondary rotor sets 2744, each having two rotors 2710 (e.g., a top rotor 2710 positioned above the metal strip 2702 and a bottom rotor 2710 positioned below the metal strip 2702).

The primary rotor planes 2734 and secondary rotor planes 2736 can be adjustable by adjusting the rotor arms 2708 along the horizontal supports 2704. In some cases, the primary rotor planes 2734 and secondary rotor planes 2736 can be fixed. As depicted in FIG. 27, the primary rotor planes 2734 can be located (e.g., fixed or adjustable) at or around the lateral edges 2738 of the metal strip 2702. As used herein, reference to a distance of a rotor plane from a lateral edge may refer to the distance between the rotor plane and a lateral edge of a metal strip passing with its lateral centerline aligned to the lateral centerline of the desired passline. In some cases, the primary rotor planes 2734 can be located within a rotor's radius of the lateral edges 2738. In some cases, the primary rotor plane 2734 can be distally spaced (e.g., away from the lateral centerline 2706 of the desired passline) a distance apart from the lateral edge 2738, such as less than a rotor's radius, approximately a rotor's radius, or more than a rotor's radius.

The primary rotors 2730 and secondary rotors 2732 can operate continuously, with a motor or other driver rotating each rotor 2710 in a clockwise 2714 or counterclockwise 2712 direction. In some cases, secondary rotors 2732 can spin up and operate only once the metal strip 2702 has laterally moved away from the lateral centerline 2706 of the desired passline sufficiently.

In some cases, the motor or other driver can rotate the rotors 2710 in an appropriate direction such that the surface of each rotor nearest the vertical centerline 2720 of the desired passline moves towards the lateral centerline 2706 of the desired passline. In other words, starting at the top left and continuing clockwise as depicted in FIG. 27, the first, second, fifth and sixth rotors 2710 can spin in a counterclockwise direction 2712, while the third, fourth, seventh, and eighth rotors 2710 spin in a clockwise direction 2714.

The motor or other driver can be or can include a variable speed driver for providing adjustment to the rotational speed of the rotor 2710. For example, a variable frequency driver can be used to adjust speed of an alternating current (AC) motor. Rotational speed may be controlled using preset values or through feedback from feedback sensors. In some cases, the motor or other driver may provide a steady force to rotate the rotor 2710, without the need for any variable speed controls or sensor feedback.

Secondary rotors 2732 and primary rotors 2734 can be the same or differently sized and can include the same or different levels of magnetization (e.g., by selecting the number, sizes, and types of magnets within the rotor). Secondary rotors 2732 and primary rotors 2734 can operate at the same or different rotational speeds. In some cases, the secondary rotors 2732 can operate at speeds greater than the speeds of the primary rotors 2730.

While FIG. 27 depicts primary rotors 2730 and secondary rotors 2732, a magnetic rotor steering device 2700 can include any number of further laterally spaced apart rotors, such as tertiary, quaternary, and the like.

Figure 28:
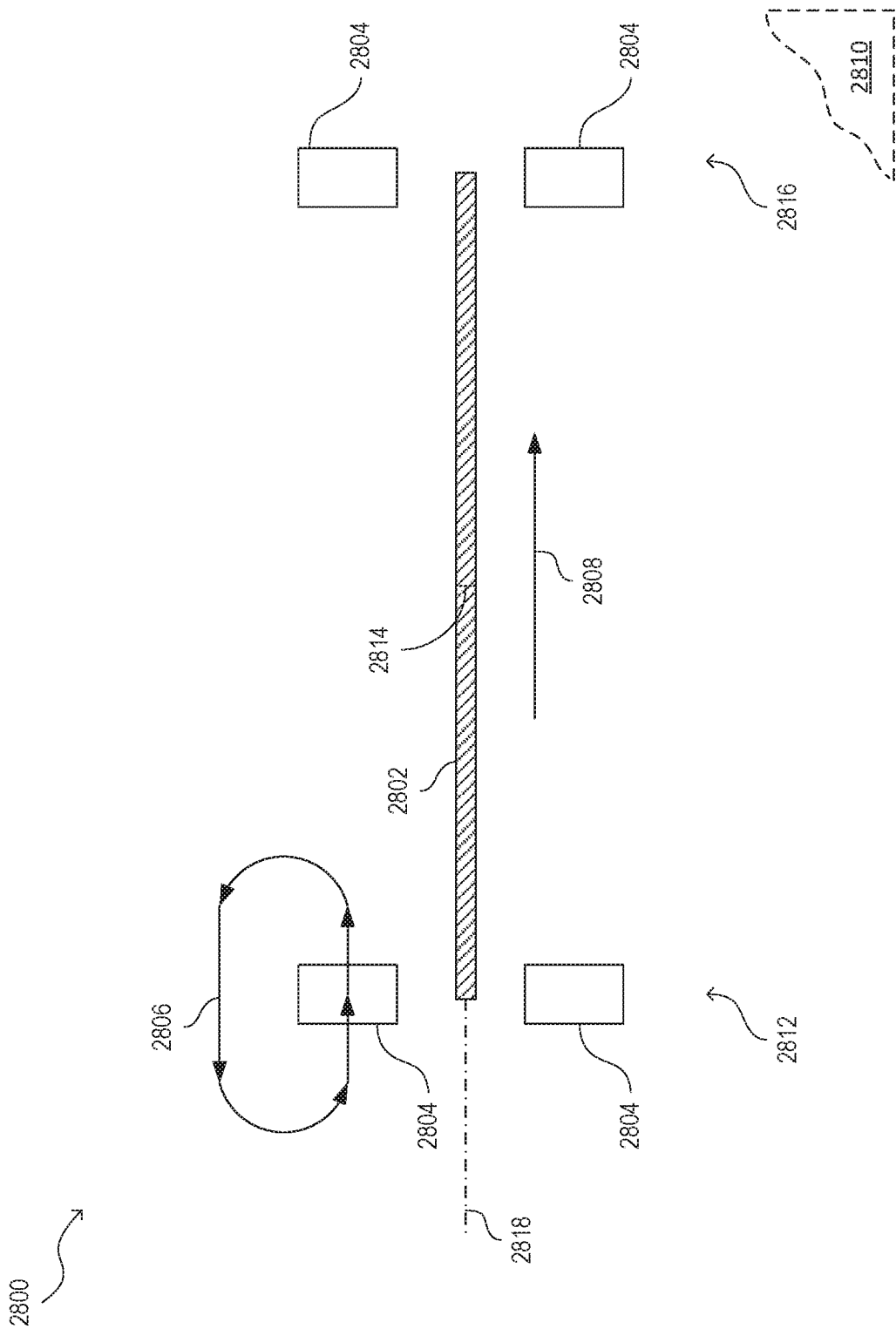
FIG. 28 is a front view of a magnetic steering device for steering a metal strip according to certain aspects of the present disclosure.

FIG. 28 is a front view of a magnetic steering device 2800 for steering a metal strip 2802 according to certain aspects of the present disclosure. The metal strip 2802 can be moving in a strip travel direction that is perpendicular to plane 2810 (e.g., towards the viewer of FIG. 28). One or more magnets 2804 (e.g., permanent magnets or electromagnets) can be positioned above and/or below the metal strip 2802. In some cases, the one or more magnets 2804 includes a first set of magnets 2812 positioned opposite a centerline 2814 of the metal strip 2802 from a second set of magnets 2816. Magnets 2804 can all be located in a common plane 2810.

The magnets 2804 can be moved and/or translated in various directions within the plane 2810. Suitable actuators (e.g., linear actuators) and/or linkages can be used to move the magnets 2804 along a path 2806 forming a closed loop. The path 2806 can be of any suitable shape, including circular, ellipsoidal, ovoid, generally rectangular, or otherwise. The path 2806 can include a section close to a center, horizontal plane 2818 of the metal strip and a section spaced further apart from that plane 2818, such that the magnet 2804 is closer to the metal strip 2802 when moving in a first lateral direction (e.g., left to right) and further from the metal strip 2802 when moving in an opposite lateral direction (e.g., right to left). The movement of the magnet 2804 when closest the metal strip 2802 can create a force urging the metal strip 2802 to move laterally (e.g., in the direction of the movement of the magnet 2804 when closest the metal strip 2802).

In some cases where electromagnets are used, a path 2806 can be a linear, arcuate, or curved path between two points. Since such a path between two points (e.g., not a closed loop) may involve the magnet 2804 passing closest to the metal strip 2802 in both a first direction and an opposite direction, the electromagnet can be actuated to turn on when passing in a first direction and turn off or be mostly attenuated when passing in the opposite direction, thus inducing a net force in the first direction.

Magnetic steering device 2800 can be used with sensors, controllers, and other elements similar to those described herein with reference to magnetic rotors, as appropriate.

The foregoing description of the examples, including illustrated examples, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a magnetic steering apparatus, comprising: a first rotor set comprising at least a first magnetic rotor that rotates about a respective first axis of rotation; a second rotor set comprising at least a second magnetic rotor that rotates about a respective second axis of rotation, wherein the first axis of rotation is not collinear with the second axis of rotation, wherein each magnetic rotor of the first and second rotor sets intersects a plane perpendicular to a direction of travel of a moving metal strip, and wherein each of the first axis of rotation and the second axis of rotation are offset from a lateral centerline of the moving metal strip at the plane, and; one or more rotor motors coupled to the first and second magnetic rotors to rotate the magnetic rotors and induce changing magnetic fields proximate the magnetic rotors, wherein at least one of the changing magnetic fields generates a force in the moving metal strip to steer the moving metal strip as the moving metal strip passes through the at least one moving magnetic field.

Example 2 is the apparatus of example 1, wherein each of the magnetic rotors includes one or more permanent magnets.

Example 3 is the apparatus of examples 1 or 2, wherein the first axis of rotation is positionable opposite the lateral centerline of the moving metal strip from the second axis of rotation, and wherein the first and the second axes of rotation are laterally spaced apart by a distance that is greater than a width of the moving metal strip.

Example 4 is the apparatus of examples 1-3, wherein the first rotor set comprises a third magnetic rotor and the second rotor set comprises a fourth magnetic rotor, wherein the first and third magnetic rotors are positioned horizontally opposite the lateral centerline of the moving metal strip from the second and fourth magnetic rotors, wherein the first and third magnetic rotors are vertically spaced apart from one another, and wherein the second and fourth magnetic rotors are vertically spaced apart from one another.

Example 5 is the apparatus of examples 1-4, further comprising: one or more actuators coupled to one or more magnetic rotors of the first rotor set and the second rotor set to adjust vertical, horizontal, or vertical and horizontal positioning of the one or more magnetic rotors.

Example 6 is the apparatus of example 5, further comprising a controller coupled to a sensor and the one or more actuators to adjust the vertical, horizontal, or vertical and horizontal positioning of the one or more magnetic rotors in response to a signal from the sensor.

Example 7 is the apparatus of examples 1-6, further comprising, for each magnetic rotor of the first rotor set and the second rotor set, a rotor shield surrounding the magnetic rotor, wherein the rotor shield defines an enclosed space.

Example 8 is the apparatus of example 7, further comprising, for each magnetic rotor of the first rotor set and the second rotor set, a source of coolant fluidly coupled to the enclosed space for removing heat from the magnetic rotor.

Example 9 is the apparatus of examples 1-8, further comprising: a third rotor set having at least one additional magnetic rotor that rotates about a respective additional axis of rotation and intersects the plane, wherein the additional axis of rotation of each additional magnetic rotor of the third rotor set is laterally offset from each of the first axis of rotation and the second axis of rotation at the plane.

Example 10 is a magnetic steering apparatus, comprising: a first rotor set including a first top rotor positioned vertically opposite a desired passline from a first bottom rotor, wherein each of the first top rotor and the first bottom rotor includes one or more permanent magnets, and wherein each of the first top rotor and the first bottom rotor includes a motor coupled to the rotor for rotating the rotor to induce a changing magnetic field proximate the rotor; a second rotor set including a second top rotor positioned vertically opposite the desired passline from a second bottom rotor, wherein each of the second top rotor and the second bottom rotor includes one or more permanent magnets, wherein each of the second top rotor and the second bottom rotor includes a motor coupled to the rotor to induce a changing magnetic field proximate the rotor, and wherein axes of rotation of the first top rotor and first bottom rotor are laterally spaced apart from and located opposite a centerline of a desired passline from axes of rotation of the second top rotor and second bottom rotor such that one or more of the changing magnetic fields generate force in a moving metal strip traveling proximate the first rotor set and the second rotor set to steer a centerline of the moving metal strip towards the centerline of the desired passline.

Example 11 is the apparatus of example 10, wherein: the first top rotor and the first bottom rotor are coupled to a first vertical support; the second top rotor and the second bottom rotor are coupled to a second vertical support; and the first vertical support and second vertical support are both horizontally positionable along a horizontal support.

Example 12 is the apparatus of examples 10 or 11, wherein the first top rotor and the second top rotor are horizontally positionable along a top horizontal support, and wherein the first bottom rotor and the second bottom rotor are horizontally positionable along a bottom horizontal support.

Example 13 is the apparatus of example 12, wherein the first top rotor and the second top rotor are vertically positionable with respect to the top horizontal support, and wherein the first bottom rotor and the second bottom rotor are vertically positionable with respect to the bottom horizontal support.

Example 14 is the apparatus of examples 10-13, further comprising, for each rotor of the first rotor set and the second rotor set, a rotor shield surrounding the rotor, wherein the rotor shield defines an enclosed space.

Example 15 is the apparatus of example 14, further comprising, for each rotor of the first rotor set and the second rotor set, a source of coolant fluidly coupled to the enclosed space for removing heat from the rotor.

Example 16 is the apparatus of examples 10-15, wherein a lateral distance between the axes of rotation of the first top rotor and first bottom rotor and the axes of rotation of the second top rotor and second bottom rotor is within a 5% deviation of a width of the metal strip.

Example 17 is the apparatus of examples 10-16, wherein the lateral distance between the axes of rotation of the first top rotor and first bottom rotor and the axes of rotation of the second top rotor and second bottom rotor is greater than a width of the metal strip.

Example 18 is the apparatus of example 17, wherein the lateral distance between the axes of rotation of the first top rotor and first bottom rotor and the axes of rotation of the second top rotor and second bottom rotor is greater than a width of the metal strip by at least a sum of the radii of the first top rotor and the second top rotor.

Example 19 is the apparatus of example 17, wherein the lateral distance between the axes of rotation of the first top rotor and first bottom rotor and the axes of rotation of the second top rotor and second bottom rotor is greater than a width of the metal strip by at least half of the width of the metal strip.

Example 20 is the apparatus of examples 10-19, wherein the centerline of the metal strip is a lateral centerline of the metal strip; and wherein the centerline of the desired passline is a lateral centerline of the desired passline.

Example 21 is a metal processing system, comprising: processing equipment for receiving a moving metal strip, the processing equipment having a desired passline; and a magnetic rotor steering device positionable proximate the moving metal strip, the magnetic rotor steering device comprising at least one magnetic rotor, the at least one magnetic rotor being rotatable to induce a changing magnetic field at the moving metal strip suitable to generate a force in the moving metal strip to steer a lateral centerline of the moving metal strip towards a lateral centerline of the desired passline of the processing equipment.

Example 22 is the system of example 21, wherein the processing equipment is selected from a furnace zone and a cooling zone of a continuous annealing line.

Example 23 is the system of examples 21 or 22, wherein the magnetic rotor steering device is positioned adjacent at least one of an entrance of the processing equipment and an exit of the processing equipment.

Example 24 is the system of examples 21 or 22, wherein the magnetic rotor steering device is positioned between an entrance of the processing equipment and an exit of the processing equipment.

Example 25 is the system of examples 21-24, wherein the processing equipment includes an outer wall having a recessed section, wherein the magnetic rotor steering device is positioned at least partially within the recessed section.

Example 26 is the system of examples 21-25, further comprising: one or more actuators coupled to the at least one magnetic rotor to adjust vertical, horizontal, or vertical and horizontal positioning of the at least one magnetic rotor; and a controller coupled to a sensor and the one or more actuators to adjust the vertical, horizontal, or vertical and horizontal positioning of the at least one magnetic rotors in response to a signal from the sensor.

Example 27 is the system of examples 21-26, wherein each of the at least one magnetic rotor includes one or more permanent magnets.

Example 28 is the system of examples 21-27, wherein the at least one magnetic rotor includes a first set of rotors adjacent a first edge of the moving metal strip and a second set of rotors adjacent a second edge of the moving metal strip, wherein the first edge is located opposite a lateral centerline of the moving metal strip from the second edge.

Example 29 is the system of example 28, wherein one of the first set of rotors is positioned opposite the moving metal strip from another of the first set of rotors, and wherein one of the second set of rotors is positioned opposite the moving metal strip from another of the second set of rotors.

Example 30 is the system of examples 21-29, wherein the moving metal strip is unsupported by a physically contacting support for a section of the processing equipment, and wherein the magnetic rotor steering device is positioned within the section.

Example 31 is the apparatus of examples 21-30, wherein the centerline of the metal strip is a lateral centerline of the metal strip; and wherein the centerline of the desired passline is a lateral centerline of the desired passline.

Example 32 is a method of steering a moving metal strip, comprising: passing a metal strip adjacent at least one magnetic rotor, the at least one magnetic rotor being spaced apart from a surface of the metal strip; rotating the at least one magnetic rotor to induce a changing magnetic field at the moving metal strip; and generating a force in the moving metal strip in response to inducing the changing magnetic field.

Example 33 is the method of example 32, further comprising: sensing a position of the metal strip; and controlling an actuator coupled to the at least one magnetic rotor based on the sensed position, wherein controlling the actuator includes adjusting at least one of a horizontal or a vertical position of the at least one magnetic rotor.

Example 34 is the method of examples 32 or 33, further comprising: accessing a pre-determined parameter of the strip; and controlling an actuator coupled to the at least one magnetic rotor based on the pre-determined parameter, wherein controlling the actuator includes adjusting at least one of a horizontal or a vertical position of the at least one magnetic rotor.

Example 35 is the method of example 34, wherein accessing the pre-determined parameter of the strip includes accessing at least one selected from the group consisting of strip width, strip thickness, and location of a lateral centerline of a desired passline.

Example 36 is the method of examples 32-35, further comprising: sensing a position of the metal strip; and controlling a speed of rotation of the at least one magnetic rotor coupled based on the sensed position.

Example 37 is the method of examples 32-36, wherein passing the metal strip includes passing the metal strip at a tension at or below 40 Mpa.

Example 38 is the method of examples 32-37, wherein passing the metal strip includes passing the metal strip at a tension at or below 5 Mpa.

Example 39 is a method of modifying processing equipment for magnetic rotor steering, the method comprising: removing a section of outer wall from the processing equipment; replacing the section of outer wall with a recessed section having a horizontal wall and at least one vertical wall; and positioning a magnetic rotor of a magnetic rotor steering device within the recessed section such that the magnetic rotor is opposite the horizontal wall from an interior of the processing equipment.

Example 40 is the method of example 39, further comprising: rotating the magnetic rotor to induce a changing magnetic field within the interior of the processing equipment, wherein the changing magnetic field is sufficient to generate a force in a metal strip moving through the interior of the processing equipment.

Example 41 is the method of examples 39-40, wherein the horizontal wall has a smaller thickness than a thickness of a vertical wall.

Example 42 is the method of examples 39-41, further comprising identifying the section of the outer wall, wherein identifying the section includes determining a distance of outer wall longitudinally offset from one or more adjacent nozzles.

Example 43 is an applied-current magnetic steering apparatus, comprising: a current source for applying a direct current to a metal strip; a pair of electrodes coupled to the current source and biased towards a surface of the metal strip to apply the direct current through the metal strip; and a permanent magnet positioned proximate the metal strip to induce a magnetic field through the metal strip in a direction perpendicular the direction of the direct current passing through the metal strip.

Example 44 is the apparatus of example 43, further comprising: a second current source for applying a second direct current to the metal strip; a second pair of electrodes coupled to the second current source and biased towards a second edge of the metal strip to apply the second direct current through the metal strip, wherein the pair of electrodes is biased towards a first edge of the metal strip opposite the second edge of the metal strip; and a second permanent magnet positioned proximate the metal strip to induce a second magnetic field through the metal strip in a direction perpendicular a direction of the second direct current passing through the metal strip.

Example 45 is the apparatus of example 43, further comprising: a second current source for applying a second direct current to the metal strip; and a second pair of electrodes coupled to the second current source and biased towards a second edge of the metal strip to apply the second direct current through the metal strip, wherein the pair of electrodes is biased towards a first edge of the metal strip opposite the second edge of the metal strip, and wherein the permanent magnet extends laterally across a width of the metal strip such that the magnetic field is induced in a direction perpendicular the direction of the second direct current passing through the metal strip.

Example 46 is a method of steering metal, comprising: applying direct current along edges of a moving metal strip in a direction parallel a direction of travel of the moving metal strip; and applying at least one magnetic field along the edges of the moving metal strip such that the at least one applied magnetic field perpendicularly intersects the applied direct current.

Example 47 is the method of example 46, wherein applying at least one magnetic field comprises applying a first magnetic field along a first edge of the moving metal strip and applying a second magnetic field along a second edge of the moving metal strip.

Example 48 is the method of examples 46 or 47, wherein applying the direct current along the edges of the moving metal strip comprises: completing a first circuit between a first set of electrodes, a first current source, and a first edge of the moving metal strip; and completing a second circuit between a second set of electrodes, a second current source, and a second edge of the moving metal strip.

What is claimed is:

1. A method of steering a moving metal strip, comprising:
    passing a metal strip in a direction of travel along a desired passline of processing equipment, the metal strip adjacent to first and second rotors laterally offset from a centerline of the metal strip and spaced apart from a surface of the metal strip;
    rotating each of the first and second rotors about respective first and second axes of rotation to induce a changing magnetic field at the moving metal strip, the first and second axes of rotation being non-collinear and intersecting a plane perpendicular to the direction of travel of the metal strip; and
    generating a force in the moving metal strip in response to the changing magnetic fields to steer the centerline of the metal strip towards a centerline of the desired passline of the processing equipment.

2. The method of claim 1, further comprising:
    sensing a position of the metal strip; and
    controlling an actuator coupled to at least one of the first and second rotors based on the sensed position, wherein controlling the actuator includes adjusting at least one of a horizontal or a vertical position of the at least one of the first and second rotors.

3. The method of claim 1, further comprising:
    accessing a pre-determined parameter of the strip; and
    controlling an actuator coupled to at least one of the first and second rotors based on the pre-determined parameter, wherein controlling the actuator includes adjusting at least one of a horizontal or a vertical position of the at least one of the first and second rotors.

4. The method of claim 3, wherein accessing the pre-determined parameter of the strip includes accessing at least one selected from the group consisting of strip width, strip thickness, and location of the centerline of the desired passline.

5. The method of claim 1, further comprising:
sensing a position of the metal strip; and
controlling a speed of rotation of at least one of the first and second rotors based on the sensed position.

6. The method of claim 1, wherein passing the metal strip includes passing the metal strip at a tension at or below 40 Mpa.

7. The method of claim 1, wherein passing the metal strip includes passing the metal strip at a tension at or below 5 Mpa.

8. A metal processing system, comprising:
processing equipment for receiving a moving metal strip, the processing equipment having a desired passline; and
a magnetic rotor steering device positionable proximate the moving metal strip, the magnetic rotor steering device comprising first and second rotors that rotate about respective first and second axes of rotation, wherein the first and second axes of rotation are non-collinear, intersect a plane perpendicular to a direction of travel of the moving metal strip, and are laterally offset from a centerline of the moving metal strip at the plane, and wherein each of the first and second rotors are rotatable to induce a changing magnetic field at the moving metal strip to generate a force in the moving metal strip to steer the centerline of the moving metal strip towards a centerline of the desired passline of the processing equipment.

9. The system of claim 8, wherein the processing equipment is selected from a furnace zone and a cooling zone of a continuous annealing line.

10. The system of claim 8, wherein the magnetic rotor steering device is positioned adjacent at least one of an entrance of the processing equipment and an exit of the processing equipment.

11. The system of claim 8, wherein the magnetic rotor steering device is positioned between an entrance of the processing equipment and an exit of the processing equipment.

12. The system of claim 8, wherein the processing equipment includes an outer wall having a recessed section, wherein the magnetic rotor steering device is positioned at least partially within the recessed section.

13. The system of claim 8, further comprising:
one or more actuators coupled to at least one of the first and second rotors to adjust vertical, horizontal, or vertical and horizontal positioning of the at least one of the first and second rotors; and
a controller coupled to a sensor and the one or more actuators to adjust the vertical, horizontal, or vertical and horizontal positioning of the at least one of the first and second rotors in response to a signal from the sensor.

14. The system of claim 8, wherein at least one of the first and second rotors includes one or more permanent magnets.

15. The system of claim 8, wherein the first rotor is adjacent a first edge of the moving metal strip and the second rotor is adjacent a second edge of the moving metal strip, wherein the first edge is located opposite the centerline of the moving metal strip from the second edge.

16. The system of claim 8, wherein the moving metal strip is unsupported by a physically contacting support for a section of the processing equipment, and wherein the magnetic rotor steering device is positioned within the section.

* * * * *